(12) United States Patent
Beshai et al.

(10) Patent No.: US 7,187,654 B1
(45) Date of Patent: Mar. 6, 2007

(54) RATE-CONTROLLED OPTICAL BURST SWITCHING

(75) Inventors: Maged E. Beshai, Stittsville (CA); Bilel N. Jamoussi, Nashua, NH (US)

(73) Assignee: Nortel Networks Limited (CA)

( * ) Notice: Subject to any disclaimer, the term of this patent is extended or adjusted under 35 U.S.C. 154(b) by 1056 days.

(21) Appl. No.: 10/054,512

(22) Filed: Nov. 13, 2001

(51) Int. Cl.
*G01R 31/08* (2006.01)
(52) U.S. Cl. ..................... 370/251; 370/230
(58) Field of Classification Search ............ 370/230, 370/231, 232, 236, 235, 240, 229, 251
See application file for complete search history.

(56) References Cited

U.S. PATENT DOCUMENTS

| | | | | |
|---|---|---|---|---|
| 5,966,346 | A * | 10/1999 | Arai .......................... | 368/263 |
| 6,118,762 | A * | 9/2000 | Nomura et al. ............. | 370/230 |
| 6,226,327 | B1 * | 5/2001 | Igarashi et al. ......... | 375/240.14 |
| 6,405,257 | B1 * | 6/2002 | Gersht et al. ............... | 709/235 |
| 6,529,571 | B1 * | 3/2003 | Gaudet ....................... | 375/363 |
| 6,671,256 | B1 * | 12/2003 | Xiong et al. ................ | 370/230 |
| 6,721,271 | B1 * | 4/2004 | Beshai et al. ............... | 370/232 |
| 6,907,002 | B2 * | 6/2005 | Beshai et al. ............... | 370/230 |
| 6,963,654 | B2 * | 11/2005 | Sotme et al. ............... | 381/431 |

\* cited by examiner

*Primary Examiner*—Doris H. To
*Assistant Examiner*—Steve Blount
(74) *Attorney, Agent, or Firm*—McGuinness & Manaras LLP

(57) ABSTRACT

A method and apparatus are provided for low latency loss-free burst switching. Burst schedules are initiated by controllers of bufferless core nodes and distributed to respective edge nodes. In a composite-star network, the burst schedules are initiated by any of a plurality of bufferless core nodes and distributed to respective edge nodes. Burst formation takes place at source nodes and a burst size is determined according to an allocated bitrate of a burst stream to which the burst belongs. An allocated bitrate of a burst stream may be modified according to observed usage of scheduled bursts of a burst stream. A method of control-burst exchange between each of a plurality of edge nodes and each of a plurality of bufferless core nodes enables burst scheduling, time coordination, and loss-free burst switching. Both the payload bursts and control bursts are carried by optical channels connecting the edge nodes and the core nodes. A method and a circuit are provided for generating burst descriptors wherein each burst is associated with a burst stream and each burst stream is allocated a service bitrate. The generated burst descriptors are used in each master controller in each core node to create the burst schedules. In a conventional burst-scheduling process, the burst queues at a master controller of an optical switch receives burst descriptors from the source nodes and schedules the burst switching times. In a distinct departure, according to the present invention, the burst descriptors are generated by a master controller of an optical switch in a core node, the switching times of the corresponding bursts are scheduled, and the schedules are distributed to the respective edge nodes. The burst-descriptor generation is based on burst-stream bitrate-allocation defined by the source nodes.

4 Claims, 34 Drawing Sheets

RATE-CONTROLLED OPTICAL BURST SWITCHING

FIELD OF THE INVENTION

The present invention relates to data networks and, in particular, to burst switching in an optical-core network.

BACKGROUND OF THE INVENTION

A data network comprises a number of source nodes, each source node receiving traffic from numerous traffic sources, and a number of sink nodes, each sink node delivering data to numerous traffic sinks. The source nodes can be connected to the sink nodes directly or through core nodes. Source nodes and sink nodes are often paired to form edge nodes, where a source node and sink node of an edge node share memory and control.

Each link between two nodes may comprise multiple channels. An optical multi-channel link uses Wavelength Division Multiplexing (WDM). WDM allows a given optical link to be divided into multiple channels, where a distinct stream of data may be transmitted on each channel and a different wavelength of light is used as a carrier wave to form each of the multiple channels within the optical link.

The performance, efficiency, and scalability of a telecommunications network depend heavily on the nodal degree and the directly related network diameter. The degree of a specific node is a measure of the number of nodes to which the specific node directly connects. The term topological reach is used herein to refer to the number of sink nodes that a source node can reach directly or through the network core. The diameter of a network is a measure of the maximum number of hops along the shortest path between any two nodes. For a given network capacity, the higher the nodal degree, the smaller the network diameter becomes, and a small network diameter generally yields high performance and high efficiency. On the other hand, for a given nodal degree, scalability generally increases with the network diameter, but to the detriment of network efficiency. It is therefore advantageous to increase the nodal degree to the highest limit that technology permits.

In a network based on channel switching, a source node connects to destination sink nodes through channels, each channel being associated with a wavelength. The topological reach of a source node, i.e., the number of destination sink nodes that the source node can reach without switching at an intermediate edge node, is then limited by the number of channels emanating from the source node, which is typically significantly smaller than the number of edge nodes in the network. Time-sharing enables fine switching granularity and, hence, a high topological reach. Effective time-sharing in a bufferless-core network requires that the edge nodes be time-locked to the core nodes, that all nodes be fast-switching, and that a path between two edge nodes traverses a single optical core node. A node X is said to be time-locked to a node Y if, at any instant of time, the reading of a time-counter at node X equals the sum of a reading of an identical time-counter at node Y and the propagation time from node X to node Y, where the time counters at nodes X and Y have the same period, and the propagation delay is measured relative to said period. Thus, if each of several edge nodes transmits a pulse, when its time-counter reading is σ, to a specific core node, the pulses from the edge nodes arrive at the core node when the time-counter reading of the core node is also σ.

TDM (time-division-multiplexing) and burst switching are two modes of network time sharing. In TDM, data is organized in a time-slotted frame of a predefined duration and a path from a source node to a sink node may be allocated one or more time slots. In burst switching, data packets are aggregated into bursts, generally of different sizes, and the bursts are switched in the core towards destination sink nodes, where each burst is disassembled into constituent packets. Both TDM and burst switching can be exploited to increase the nodal degree, hence reduce the network diameter. The application of TDM in an optical-core network is described in Applicant's U.S. patent application Ser. No. 09/960,959, filed on Sep. 25, 2001 and titled "Switched channel-band Network," which is incorporated herein by reference.

Prior-art burst switching has attractive features but has two main drawbacks: burst-transfer latency and burst loss. In a closed-loop scheme, a source node sends a request to a core node for transferring a burst, the request including a destination and size of the burst, and waits for a message from the core node, where the message acknowledges that the optical switch in the core node is properly configured, before sending the burst. In an open-loop scheme, the burst follows the burst transfer request after a predetermined time period, presumably sufficient to schedule the burst transfer across the core, and it is expected that, when the burst arrives at the core node, the optical switch will have been properly configured by a controller of a core node. It is noted that even if a very long time gap is kept between a burst-transfer request and the data burst itself, the lack of buffers at the core node may result in burst loss and a significant idle time.

In the closed-loop scheme, the time delay involved in sending a burst transfer request and receiving an acceptance before sending a burst may be unacceptably high, leading to idle waiting periods and low network utilization in addition to requiring large storage at the edge nodes.

In the open-loop scheme, a burst may arrive at a core node before the optical switch can be configured to switch the burst and the burst may be lost. Furthermore, the fact that the burst has been lost at the core node remains unknown to the source node for some time and a lost burst would have to be sent again after a predefined interval of time.

In a wide-coverage network, the round-trip propagation delay from an edge node, comprising a paired source node and a sink node, to a core node can be of the order of tens of milliseconds. This renders closed-loop burst scheduling inappropriate. In closed-loop switching, a source node and a core node must exchange messages to determine the transmission time of each burst. The high round-trip delay requires that the source node have a sizeable buffer storage. On the other hand, open-loop burst scheduling, which overcomes the delay problem, can result in substantial burst loss due to unresolved contention at the core nodes. It is desirable that data bursts formation at the source nodes and subsequent transfer to respective optical core nodes be performed with low delay, and that burst transfer across the core be strictly loss-free. It is also desirable that the processing effort and transport overhead be negligibly small.

A burst scheduling method and a mechanism for burst transfer in a composite-star network is described in the applicant's U.S. patent application Ser. No. 09/750,071, filed on Dec. 29, 2000, and titled "Burst Switching in a High-Capacity Network", the contents of which are incorporated herein by reference. According to the method, a burst-transfer request is sent to a controller of a core node after a burst has been formed at a source node. High efficiency is, however, maintained by burst scheduling and burst-transfer pipelining. The burst transfer across the optical-core is loss-free. However, a burst has to wait at its source node for a period of time slightly exceeding a round-trip delay between the source node and a selected core node. In a network of global coverage, the burst-transfer latency may exceed a high value, 20 milliseconds for example, for a significant proportion of the traffic.

SUMMARY OF THE INVENTION

In a network having electronic edge nodes and optical core nodes, each core node has a capability to switch data bursts of variable sizes. The data bursts received at a core node are generated at source nodes generally having substantially different propagation delays to the core node and the present invention provides a burst-switching method and apparatus to enable a high-performance burst-switching mode.

In accordance with an aspect of the present invention, a method is provided for burst communications wherein a core node of the network distributes timed burst transfer permits to edge nodes, and each edge node assembles data into bursts as indicated by respective permits and transmits the bursts according to the permits schedule. In a related aspect, the burst sizes and burst transfer rates are determined as functions of bitrate allocations for burst streams.

In accordance with another aspect of the present invention, a method is provided for burst specification and scheduling wherein burst schedules are initiated by a bufferless core node and distributed to respective edge nodes. In a related aspect, there is provided a method for burst switching in which bursts are initiated by any of a plurality of bufferless core nodes and distributed to respective edge nodes.

In accordance with a further aspect of the present invention there is provided a method of burst generation wherein a burst size is determined according to an allocated bitrate of a respective burst stream. In a related aspect, an allocated bitrate of a burst stream is modified according to observed usage of scheduled bursts of said burst stream.

In accordance with yet another aspect of the present invention there is provided a method of control-burst exchange between each of a plurality of edge nodes and each of a plurality of bufferless core nodes. Both payload bursts and control bursts share the optical channels connecting the edge nodes and the core nodes.

In accordance with a further aspect of the present invention there is provided a method of time locking a source node to a core node in a burst-switching network. In a related aspect, control bursts include timing data that are exchanged between a source node and a core node.

In accordance with a further aspect, there is provided a core node having a plurality of optical switches, each optical switch including a plurality of input ports and a plurality of output ports, wherein said core node receives data traffic from each of a plurality of source nodes through a number of input ports of which at least one is operated in a burst mode. In a supplementary aspect, said number of input ports can belong to any number of said plurality of optical switches.

BRIEF DESCRIPTION OF THE DRAWINGS

In the figures which illustrate example embodiments of this invention.

DETAILED DESCRIPTION

Figure 1:
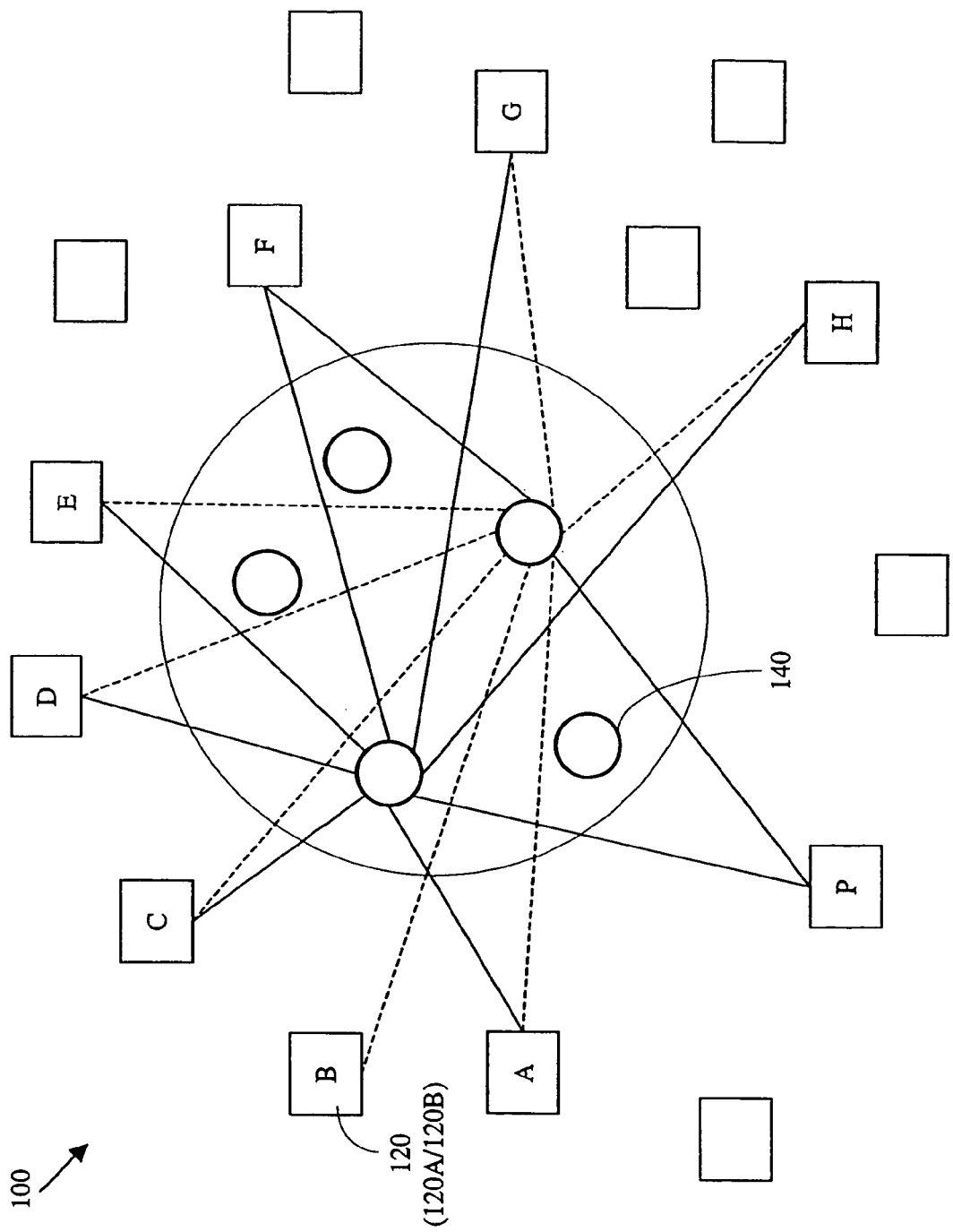
FIG. 1 illustrates a composite-star network for use with an embodiment of the present invention.

A star network's main attraction is its high performance and simplicity of control. However, it is suitable only for limited geographic or topological coverage. A composite star network 100, illustrated in FIG. 1, may be viewed as a superposition of several star networks which are merged only at the edge nodes 120 while the core nodes 140 can be widely distributed and independent. An edge node 120 comprises a source node 120A and an associated sink node 120-B. Hereinafter, reference to an edge node 120 also implies reference to the source node 120A and the sink node 120B that constitute the edge node 120. Similarly, reference to a source node 120A or a sink node 120B implies reference to the edge node 120 to which either belongs. The core nodes 140 of a composite-star network are not connected to each other. The composite-star network 100 retains the attractive properties of a star network while providing a wide geographic and topological coverage. The composite-star network 100 will be used for the purpose of describing embodiments of the present invention. A star network is treated as a component of a composite-star network. Unless otherwise stated, reference to a connection from a source node to a sink node excludes an internal connection within an edge node, i.e., from a source node to its associated sink node. Hereinafter, an upstream data burst is defined as a burst sent from a source node to a core node, and a downstream data burst is a burst sent from a core node to a sink node. Likewise, the flow of data bursts from a source node to a core node is called a burst upstream and the flow of data bursts from a core node to a sink node is called a burst downstream.

Hereinafter, any two edge nodes are said to constitute a node pair. A node pair is directed so that data traffic flows from the source node 120A of a first edge node 120 to the sink node 120B of a second edge node. The term node-pair traffic refers to the total traffic demand, expressed in bits per second, that a first edge node (source node) intends to transfer to a second edge node (sink node). A burst stream is defined by a source node 120A, a sink node 120B, and a path from said source node 120A to said sink node 120B. A burst stream, from a source node to a sink node comprises a burst upstream and a burst downstream. Where the burst traffic from a source node 120A of a first edge node 120 is transferred to a sink node 120B of a second edge node 120B through two or more paths, each of said two or more paths defines a separate burst stream. The node-pair burst traffic from a source node 120A to a sink node 120B can be divided into multiple burst streams due to the vacancy distribution in a plurality of paths or if the bitrate requirement of said burst traffic exceeds the capacity of a single path.

Each burst stream may comprise several individual connections of different bitrate requirements. Each connection is defined by a data source served by a source node 120A and a data sink served by a sink node 120B. The connections within a bust stream may have distinctly different bitrate and service requirements.

The spectral capacity (the bandwidth) of an optical fiber link can be divided into channels each corresponding to a modulated carrier wavelength. For brevity, a carrier wavelength is often referenced simply as a wavelength. A channel may have a capacity of 10 Gb/s for example. A modulated wavelength gives rise to a channel. A channel occupies a spectral band, however, it is customary to also refer to a channel simply as a wavelength.

Figure 2:
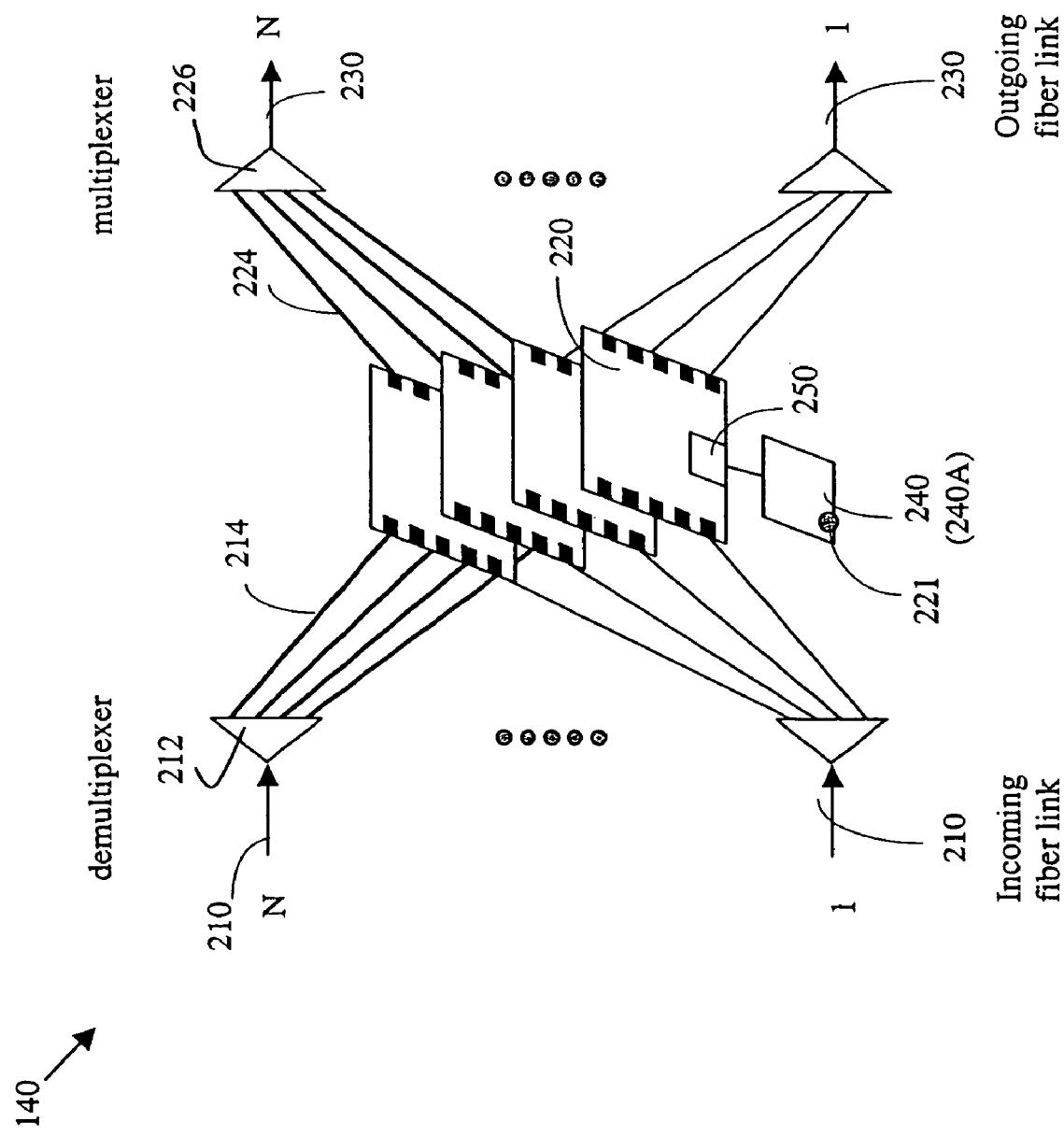
FIG. 2 illustrates a parallel-plane optical core node for use with an embodiment of the present invention.

The preferred core node 140 of a composite-star network 100 comprises parallel space switches 220, as illustrated in FIG. 2. A space switch 220 has a bufferless fabric which may be electronic or photonic. The core node 140 switches channels of upstream WDM links 210 to channels of downstream WDM links 230. Each optical switch 220 is operated to switch channels of the same wavelength. A data burst from a source node 120A to a sink node 120B may be transferred through any optical switch 220 in any core node 140 connecting the source node to the sink node. Hereinafter, the terms optical switch and optical space switch are used interchangeably.

It is noted that conventional WDM demultiplexers 212 and WDM multiplexers 226 need be used at the input and output of each multi-plane core node. They are not further described, their use being well-known in the art.

There are several core nodes 140 in the network of FIG. 1, and the core nodes operate totally independently. The parallel optical switches 220 in the core node 140 of FIG. 2 also operate independently. Initially, each source node 120A selects at least one of the core nodes 140 through which traffic destined to a given sink node 120B is routed. To select a path to a destination sink node 120B, a source node 120A selects a core node for a connection in such a way that promotes load balancing while taking into account the propagation delay of the path. A composite index calculated as a function of both a path vacancy and the path's propagation delay can be used to distribute the traffic load.

The traffic directed to a specific sink node 120B may be carried by any of the channels of the multi-channel link 210 (WDM fiber link) from the source node 120A to the selected core node 140. A load-balancing algorithm to balance the traffic load among the links 210 and 230 can be used to increase the throughput. Successive bursts to the same sink node 120B may use different channels (different wavelengths), and hence be switched in different optical switches 220 in a core node 140. It is preferable, however, to distribute burst-switched connections evenly among optical switches 220 of an optical core node 140 in such a way that the bursts of each connection use the same optical switch 220.

In a prior art burst-scheduling process, a controller of an optical switch receives burst descriptor from the source nodes and schedules the burst switching times. In a distinct departure, according to an embodiment of the present invention, the burst descriptors are generated by a master controller 240 of an optical switch 220, the switching times of the corresponding bursts are scheduled, and edge-node-specific burst-transfer permits are distributed to the respective edge nodes 120. The burst-descriptor generation is based on burst-stream bitrate-allocation defined by the source nodes 120A. A source node 120A determines the bitrate requirement for burst streams either according to explicit specification by the traffic sources or by an adaptive means based on monitoring usage and/or observing the occupancy fluctuation of data burst buffers.

Figure 3:
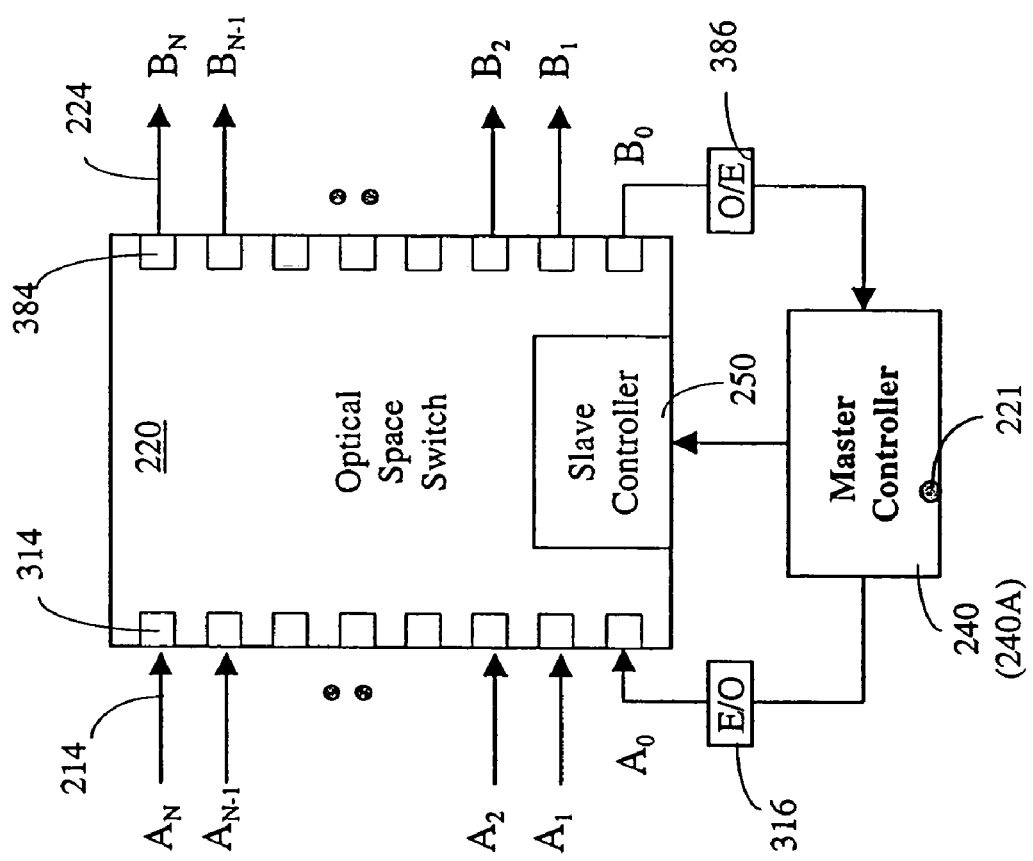
FIG. 3 illustrates an optical switch with associated master controller and slave controller for use with an embodiment of the present invention.

FIG. 3 illustrates a space switch having N input ports 314 and N output ports 384, N>1. This represents one of the optical switches 220 of the multiple-plane optical core node 140 of FIG. 2. Each input port 314 has a receiver and each output port 384 has a transmitter. The input ports 314 receive data from source nodes (not illustrated) through incoming WDM links 210, which are demultiplexed into channels 214, and the output ports 384 transmit data to sink nodes (not illustrated) through channels 224. The interconnection of input ports 314 to output ports 384 is effected by a slave controller 250 associated with the optical switch 220. A master controller 240 determines the connectivity pattern of input ports 314 to output ports 384 and communicates the connectivity pattern to a slave controller 250. Each source node 120A has at least one time counter and the master controller 240 has a master time counter. All time counters have the same period of the master time counter. Both the master controller 240 and slave controller 250 are predominantly hardware operated to realize high-speed control. In a core node 140 having several optical switches 220, as illustrated in FIG. 2, preferably each optical switch should have its own master controller 240 and slave controller 250. Also, as will be described later with reference to time-locking requirements, a source node 120A may be time-locked separately to each of the plurality of optical switches 220, because of the different propagation delays experienced by channels of different wavelengths in a link 210 connecting a source node 120A to a core node 140.

Each input port 314 has a receiver operable to receive an optical signal from an optical channel and each output port 384 has a transmitter which is operable to transmit an optical signal through an optical channel. The N input ports 314 of an optical switch 220 can simultaneously receive N optical signals and the N output ports 384 of an optical switch 220 can simultaneously transmit N optical signals.

The optical switch 220 has input ports 314 labeled $A_0$ to $A_N$ and output ports 384 labeled $B_0$ to $B_N$ where input port $A_0$ is a control input port and output port $B_0$ is a control output port while the rest of the ports $A_1$ to $A_N$ and $B_1$ to $B_N$ are payload ports. The master controller sends control messages to any of output ports $B_1$ to $B_N$ through an E/O (electrical-to-optical) interface 316, control input port $A_0$ and the optical switch 220. The master controller receives control messages from input ports $A_1$ to $A_N$ through the optical switch 220, control output port $B_0$ and an O/E (optical-to-electrical) interface 386.

Data bursts are received from any upstream link 210, each data burst is destined to a specified output port $B_x$, $1 \leq x \leq N$. Some bursts, hereinafter called control bursts, are destined to the master controller 240. The control bursts carried by the N incoming channels 214 are staggered so that the master controller 240 receives, through control output port $B_0$, the content of each control burst one at a time. The control bursts are preferably of equal size. It is noted that the upstream control bursts constitute one of the burst streams for which a bitrate is allocated. A control burst is likely to be much shorter than a typical payload burst.

Figure 4:
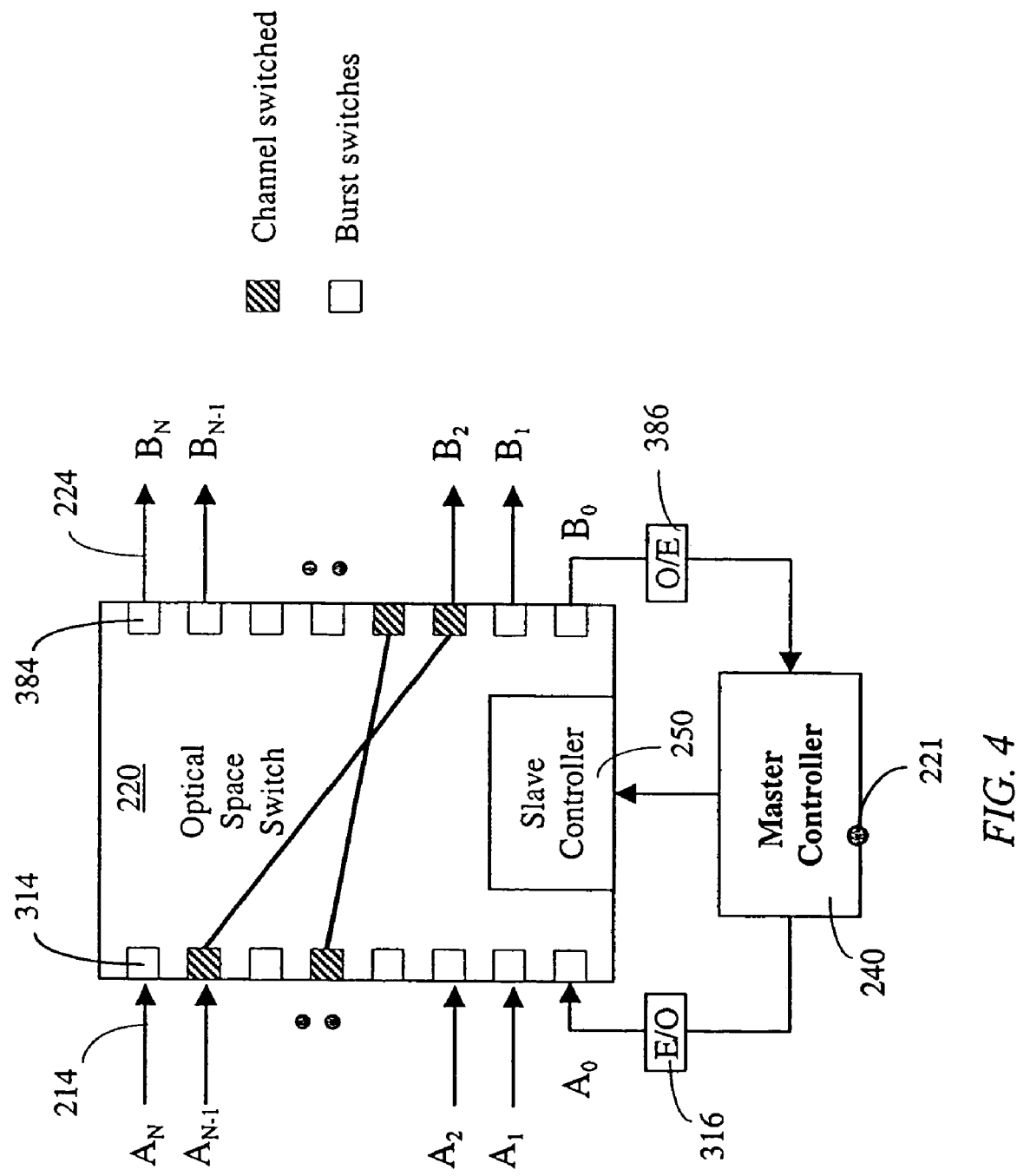
FIG. 4 illustrates the coexistence of channel and burst switching in the optical switch illustrated in FIG. 3 for use with an embodiment of the present invention.

FIG. 4 illustrates the space switch of FIG. 3 with channel switching applied to some pairs of input and output ports 314/384 and burst switching applied to the other input-output pairs 314/384. The node-pair bitrate requirements received at a core node 140 may have a large variance where a node pair may require a capacity of several channels while another node pair may require a small fraction of the capacity of a channel. The bitrate requirements may also change considerably with time. It is preferable, therefore, to establish a mixture of channel paths and burst paths within the same optical switch and to provide means, at respective edge nodes 120, for rapidly modifying the paths' granularities, from burst-to-channel or vice versa, as the traffic pattern changes. Although all input ports 314 can be identical, an input port 314 through which a channel is switched to an output port in a unicast transfer, or multiple output ports in a multicast transfer, is called a channel-mode input port and an input port 314 through which individual bursts are switched to a plurality of output ports is called a burst-mode input port.

A master controller 240 of one of the optical switches 220 of a core node 140 is designated to function as a core-node controller 240A, in addition to its function as a master controller for its optical switch 220. The core-node controller 240A collects all the bitrate-allocation requests from all source nodes 120A to which the core node 140 is connected and produces a bitrate allocation matrix, having N×N entries, that contains all the bitrate requirements from source nodes 120A to sink nodes 120B. Each row in the matrix corresponds to a source node, each column corresponds to a sink node, and the sum of any column in the matrix must not exceed the capacity of the paths from the core node to the corresponding sink node. Satisfying this condition may result in adjusting or rejecting some of the bitrate allocation requests as will be described below. The selection of entries to be adjusted or rejected is a matter of network-management policy.

The master controllers 240 of the optical switches 220 of a given core node 140 are interconnected by an internal bus (not illustrated). Each master controller 240 has at least one dual port 221 (FIG. 2) that includes a sender and a receiver to enable communications with other master controllers through said internal bus. In a given core node 140, the master controller 240 designated as a core-node controller 240A receives the bitrate-allocation requests from each edge node 120 that connects to the core node 140.

Each source node 120A determines the required bitrate allocation for its traffic destined to each sink node 120A, selects a core node 140, and sends a bitrate-allocation request to the core-node controller 240A, of the selected core node 140, which verifies the availability or otherwise of paths having a sufficient vacancy to accommodate the required bitrate and sends a reply to the edge node. A path between a source node 120A and a sink node 120B is defined by a selected space switch 220 in a selected core node 140. A core-node controller 240A may divide the bitrate requirement of a node pair among several space switches 220 of the core node 140. If the bit-rate allocation request is accepted, the reply includes, directly or indirectly, the identity of the space switch 220 selected to define a burst stream to the destination sink node.

The core-node controller 240A performs the function of admission control by ensuring that the total bitrate allocation for each output port 384 in each of the optical switches 220 of the core node 140 does not exceed the capacity of the output port 384 or the capacity of the downstream channel 224 emanating from the output port 384. The core-node controller 240A selects at least one optical switch 220 then communicates bitrate allocations to respective master controllers 240.

The bitrate allocations of each master controller 240 are used to generate burst descriptors. A burst descriptor includes a burst size and an inter-burst interval. Both the burst-size and the inter-burst interval are determined according to the required bitrate allocation. The generated burst descriptors are placed in a buffer where they wait to be scheduled for switching as will be described with reference to FIGS. 22 to 24. A scheduling algorithm is exercised at a master controller 240 of an optical switch 220 to determine the time at which each burst must be received at its respective input port in the optical switch 220. With time-locking, as will be described in detail below, an indication of the relative time at which the start of a burst is received at a specific port is identical to an indication of the relative time at which the start of the burst is transmitted from the respective source node 120A. The time schedules of the bursts over a given interval, called the scheduling interval, are communicated to respective edge nodes 120. These are communicated in the form of burst-transfer permits that are derived from the generated schedule. The duration of the scheduling interval is dictated by the execution time of the scheduling algorithm used. The interval between successive schedule computations is called a reconfiguration interval. The minimum reconfiguration interval equals the scheduling interval. In order to reduce the processing effort, as will be described later with reference to FIGS. 26 and 27, the reconfiguration interval may exceed, and preferably be an integer multiple of, the scheduling interval.

Figure 5:
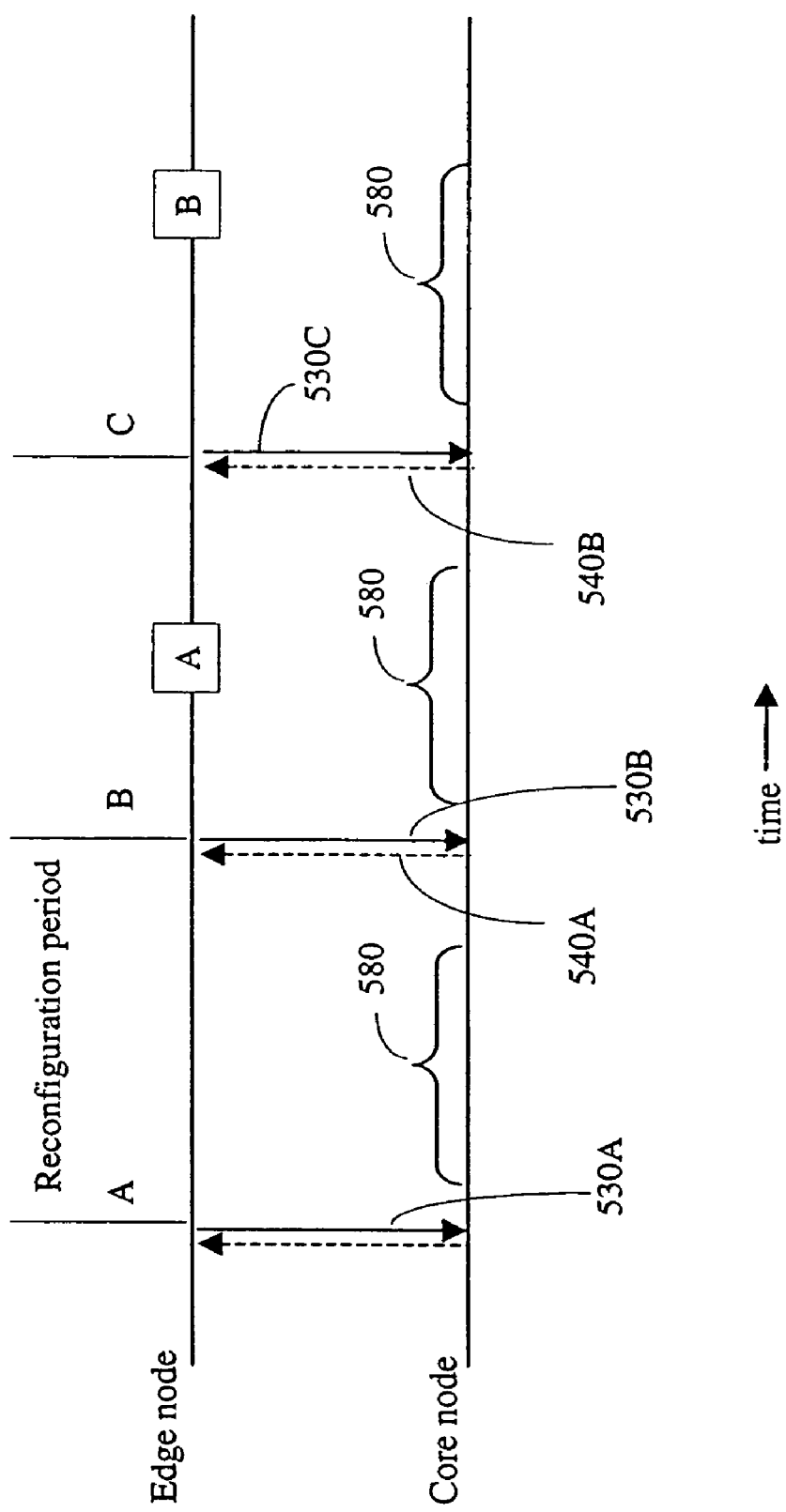
FIG. 5 illustrates the exchange of messages between an edge node and a core node in the network illustrated in FIG. 1 for burst-schedule generation, according to an embodiment of the present invention.

FIG. 5 illustrates the message exchange between one of a plurality of edge nodes 120 and a core node 140 in order to generate edge-node-specific burst-transfer permits. An edge node 120 sends a vector having N entries, N being the number of ports of the optical switch 220, each entry corresponding to a sink node 120B and contains a required bitrate allocation for the aggregate burst traffic from the source node 120A to a respective sink node 120B through a core node 140. The edge node 120 ensures that the sum of the vector entries do not exceed the capacity of the paths from the source node to the core node.

The message exchange illustrated in FIG. 5 relates to a case where the edge nodes are collocated with a core node, thus forming a high-capacity burst-switch in which the propagation delays among edge nodes 120 and core nodes 140 are negligible. Each edge node requests a bitrate allocation to other edge nodes. A requested bitrate allocation is granted only if paths having a sufficient vacancy are found.

An edge node 120 sends a message 530 to a core node 140. The message 530 is embedded in an upstream control burst indicating a required bitrate as will be described below with reference to FIG. 10 and FIG. 13. The core node 140 replies with a message 540 that includes burst-transfer permits to be described below with reference to FIG. 14. Each edge-node-specific burst-transfer permit includes a burst size, a transfer time, and a destination sink node. The reply 540 follows the request message 530 after a period of time that exceeds a scheduling period 580. The duration of the scheduling period 580 is determined by the master controller 240 of the optical switch 220 selected to route the burst data.

Figure 6:
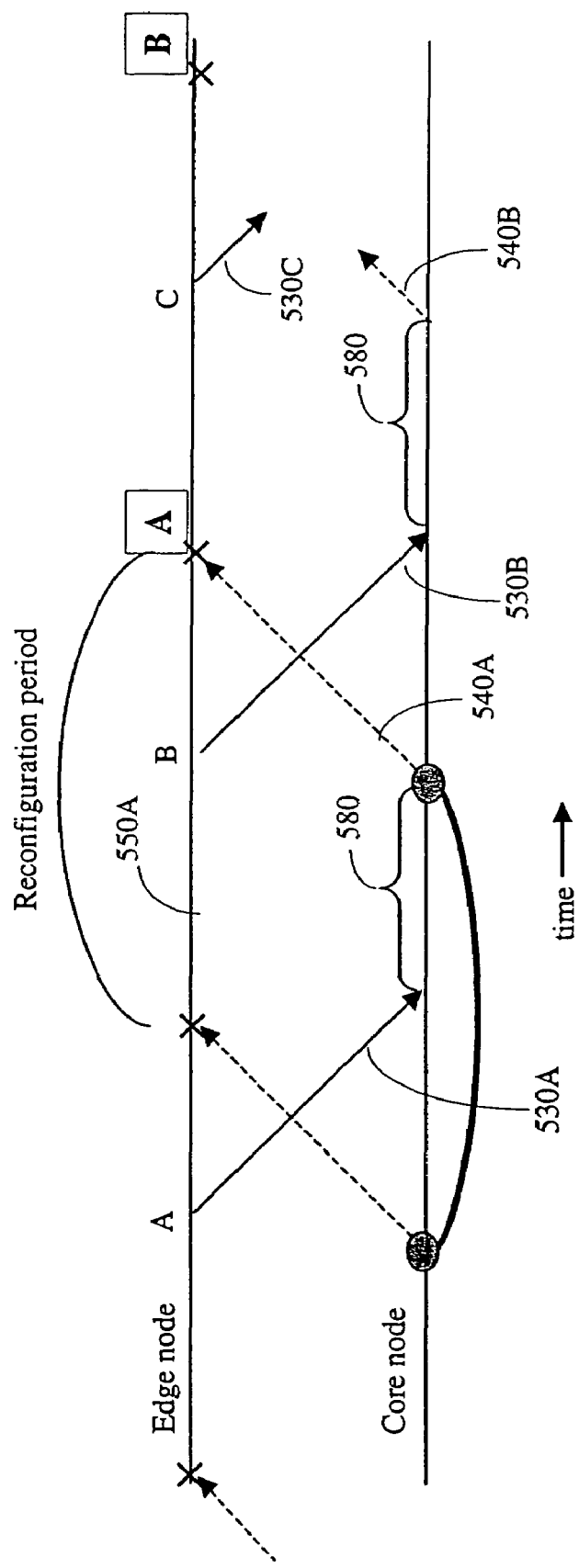
FIG. 6 illustrates the exchange of messages between an edge node and a core node in the network illustrated in FIG. 1 for burst-schedule generation, according to an embodiment of the present invention.

In a distributed network, the edge nodes may be geographically dispersed with varying propagation delays to the core node. FIG. 6 illustrates a case where there is a significant propagation delay between an edge node 120 and a core node 140. The edge node 120 sends new bitrate-allocation requests 530 periodically to a master controller 240 and the master controller 240 sends burst-transfer permits 540 to the edge node 120. The requested bitrate allocations may be modified due to output contention at the optical switches 220. Due to the propagation delay, the upstream control bursts and downstream control bursts may be concurrent as indicated in FIG. 6, where a request 530B and a reply 540A to a previous request 530A propagate through the network simultaneously.

Figure 7:
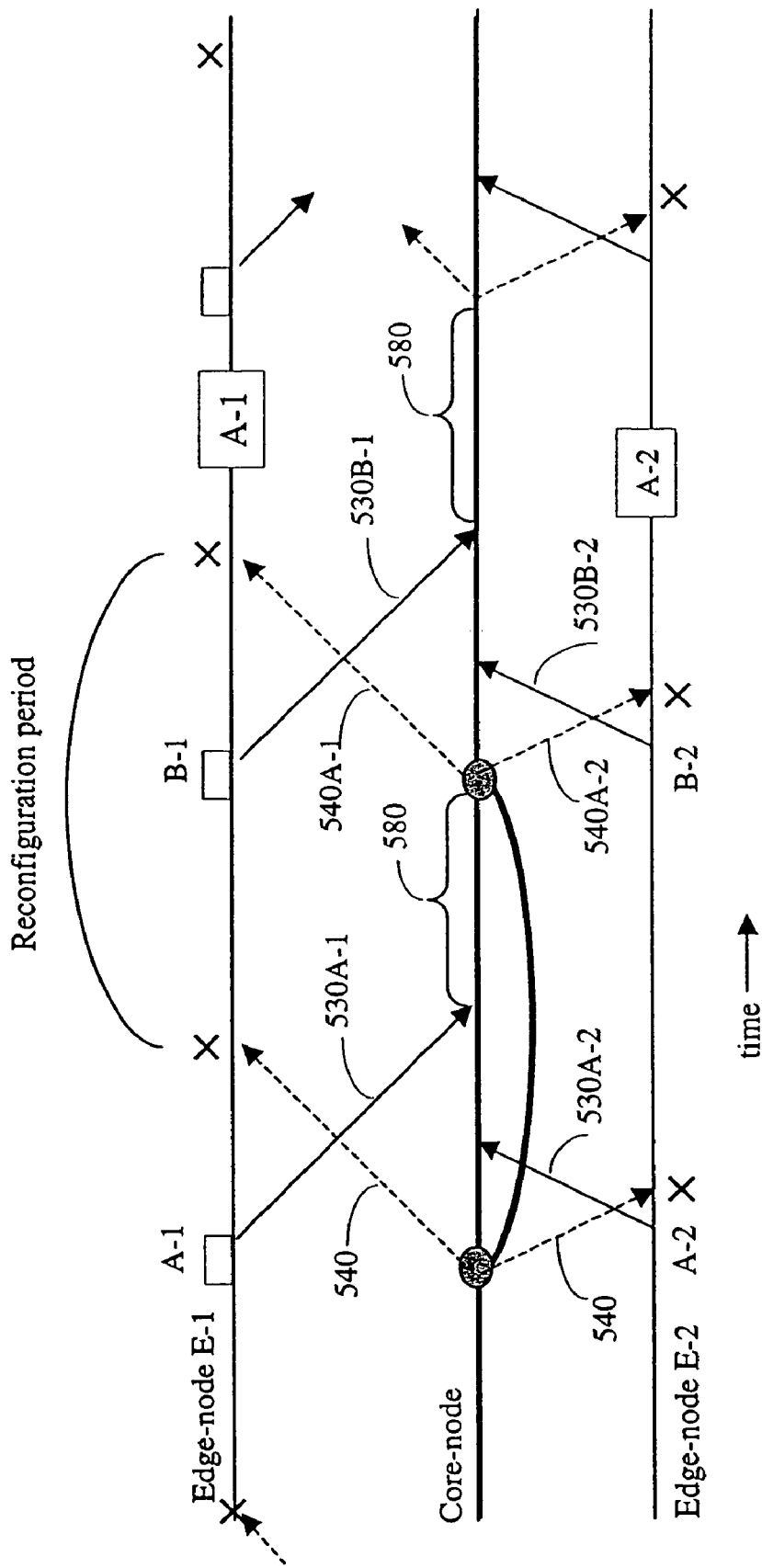
FIG. 7 illustrates the exchange of messages between two edge nodes and a core node in the network illustrated in FIG. 1 for burst-schedule generation, according to an embodiment of the present invention.

FIG. 7 illustrates the exchange of messages between a master controller 240 and two edge nodes 120 in order to enable core reconfiguration. The need for core reconfiguration is preferably assessed periodically. As indicated in FIG. 7, edge node 120 labeled E-1 sends a bitrate-request vector to a core-node controller 240A of a core node 140. The bit-rate request vector has one entry for each bitrate-allocation request emanating from edge-node E-1.

As described above, the aggregate traffic for a node pair may be divided into several burst streams, and a burst stream may constitute several connections defined by a data source and a data sink. A data stream may also constitute several sub-streams distinguished by some property, such as burstiness, or an attribute such as a service class. The number of data sub-streams may exceed the number of sink nodes, where several data sub-streams may be sent from edge node E-1 to a single sink node. For the purpose of illustrating the methods of the present invention, a master controller 240 need not be aware of such a division and only the aggregate bitrate allocation requests from edge node E-1 to each output port 384 of the optical switch 220 need be considered.

If the core-node controller 240A of a core node 140 decides to allocate a bitrate lower than the bitrate requested by a node pair, it is the duty of the edge node 120 to determine which of a plurality of individual connections that constitute the aggregate node-pair traffic should be affected. Similarly, an edge node E-2 sends its bitrate-request vector to the master controller 240.

The timing of sending the bitrate-request vectors from each of the plurality of edge nodes (source nodes) should be coordinated so that all the requests arrive at the master controller before the start of the reconfiguration process by a relatively short time, as illustrated in FIG. 7. This would ensure that the reconfiguration, i.e., the generation of new burst-transfer permits, is conducted according to the most recent bitrate requests. In order to realize this coordination, each edge node (E-1, E-2, etc.) must be time-locked to the optical switch 220, as will be detailed below in conjunction with FIGS. 10–13, and the core-node controller 240A must send to each edge node a time-counter reading at which all edge nodes should start sending their bitrate-allocation requests.

To produce edge-node-specific burst-transfer permits, the generated burst descriptors need be scheduled. The scheduler at a master controller 240 of an optical switch 220 in an optical core 140 processes the bitrate allocations, as determined by the core-node controller 240A, at the beginning of each schedule-computation period. In order to base the schedule on the most recent bitrate-allocation requests, each source node 120A should set the time of transmitting its bitrate-allocation request vector so that it would arrive at the core node 140 shortly (a few microseconds) before the start of the schedule-computation period.

Burst Formation

The packet data at each output port (not illustrated) of a source node are sorted into queues according to destination sink nodes and the packet data of each queue are aggregated into bursts as will be described below with reference to FIG. 31 and FIG. 32.

A burst-formation period (burst-formation delay) is defined hereinafter as the time required to assemble a burst at a queue in an output port of the source node 120A where data is dequeued at a speed specific to the queue. The channel-access delay is the time required to transmit a burst through an optical channel.

Figure 8:
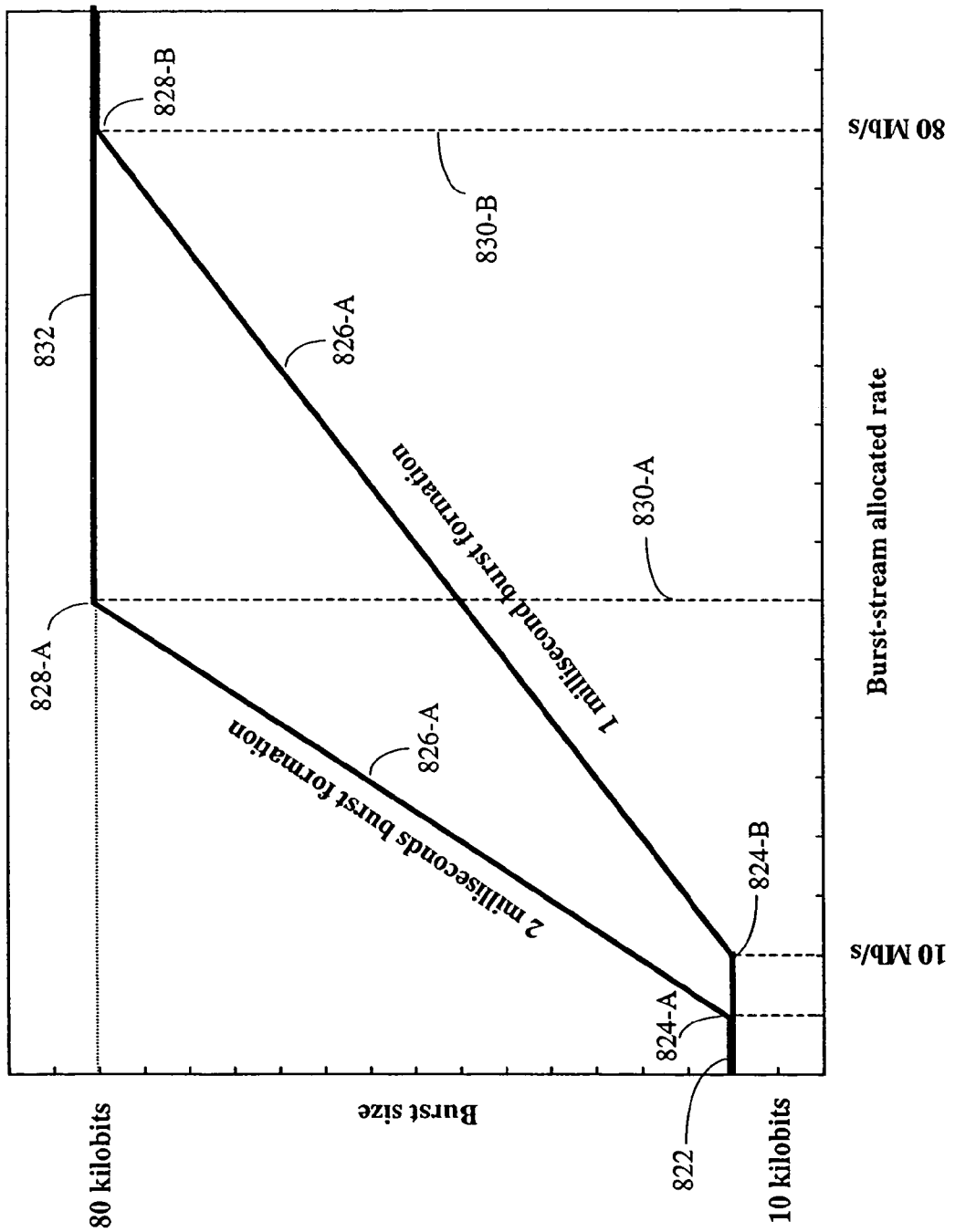
FIG. 8 illustrates the dependence of a preferred burst size on a bitrate allocation of a respective burst-stream, according to an embodiment of the present invention.

FIG. 8 illustrates the relation between the preferred burst size and the bitrate of a burst stream. An upper bound 832 of a burst size is selected to avoid high delay in accessing an optical channel 214 from an output port of a source node 120A to an optical switch 220 in the optical core node 140. Selecting a maximum burst duration in an optical channel of a nominal capacity of 10 Gb/s to be 32 microseconds, for example, yields a maximum burst size of 320 kilobits (40 kilobytes). The burst duration is limited in order to limit the delay jitter. At a source node 120A, a burst is formed at an output port (not illustrated) where data is sorted into queues each of which corresponding to a destination sink node. With a combined bitrate of all data at an output port of 10 Gb/s, for example, the bitrate allocation for a specific queue may vary between zero and 10 Gb/s. For a queue allocated a bitrate of r bits/second, a burst size b, would require a burst formation period, d=b/r. With b=320,000 bits and r=1 megabits/second, the burst-formation period would be 320 milliseconds, which is considered excessive. If the permissible maximum burst formation period, hereinafter denoted $D_0$, is selected to be 1 millisecond, then the burst size, b, should not exceed 1000 bits (b=r×$D_0$). With a 10 Gb/s optical channel 214, the channel-access duration of a 1000-bit burst is only 0.1 microseconds, which may be too small considering the switching latency within the optical switch 220 and potential timing imperfection in the process of time-coordination of a source node 120A and an optical switch 220, as will be described in more detail below. A more appropriate minimum burst size 822 would be 10 kilobits, which corresponds to a channel-access duration of one microsecond, for a 10 Gb/s channel. Selecting an upper bound of the burst-formation period to be one millisecond, the burst size for a burst stream allocated 8 Gb/s, for example, would be limited to b=8 megabits. This corresponds to a channel-access duration of 800 microseconds, for channel speed of 10 Gb/s. Such a high channel-access duration may result in delay jitter, as is well known from simple queueing analysis.

The selection of the upper bound $D_0$ of burst-formation delay can be determined according to a specified class of service. For example, the value of $D_0$ may be 10 milliseconds for a delay-tolerant burst stream but 0.5 milliseconds for a delay-sensitive burst stream. The value of $D_0$ influences the selection of burst-size as described above.

Thus, the minimum burst size 822 should be selected so that a burst's optical-channel access duration is larger than a threshold $D_1$, which is selected to be an order of magnitude larger than the sum of switching latency in the optical switch 220 and timing error where a signal arrival time deviates from a designated arrival time at a core node. The selection of $D_1$ is also influenced by the need to reduce processing effort. The maximum burst size should be selected so as not to result in exceeding a specified upper bound, $D_2$, of the optical-channel access duration, or an upper bound, $D_0$, of the burst-formation period. A reasonable value for $D_2$ would be 32 microseconds. It is noted that $D_0$ is allowed to be much higher than $D_2$ because the formation delay of a burst does not affect other bursts while a large $D_2$ causes delay jitter to subsequent bursts. Delay jitter occurs when a burst waiting in a queue at an input of a channel has to wait for a large period of time for another burst accessing the channel. FIG. 8 indicates the preferable burst sizes for two cases 826A and 826B where in one case, 826A, the upper bound, $D_0$, of the burst-formation period is assigned one millisecond and in the other case, 826B, it is assigned two milliseconds, with $D_1$=1 microsecond and $D_2$=8 microseconds in both cases. A large burst-formation period generally increases the mean burst size, and, hence, increases the buffer-size requirement at a source node. On the other hand, a large mean burst size reduces the transport overhead and the processing effort.

In summary, at a source node 120A, a burst size has a lower limit 822 determined by a prescribed minimum burst duration $D_1$ in the optical channel connecting the source node to the core node, and an upper limit 832 determined by either a permissible burst-formation delay $D_0$ or a permissible maximum burst duration $D_2$ in the optical channel connecting a source node to the core node.

Denoting the lower-bound and upper-bound of the burst size, b, as $B_1$ and $B_2$ respectively, i.e., $B_1 \leq b \leq B_2$, then $B_1$=R×$D_1$, $B_2$=R×$D_2$ and the allocated bitrate r for a burst stream must exceed a lower bound: $r \geq R \times D_1/D_0$, R being the channel capacity in bits per second.

Consider, for example the case where R=10 Gb/s, $D_0$=1 millisecond, $D_{1=1}$ microsecond, $D_2$=32 microseconds, and a specified r=1 Mb/s. The value of r must be selected to be at least equal to R×$D_1$/$D_0$=10 Mb/s. Thus, to meet the formation delay upper bound, a queue can not be served at a bitrate less than 10 Mb/s. If the value of $D_0$ is set equal to 10 milliseconds instead of 1 millisecond, then a value of r=1 Mb/s would be permissible. The permissible burst size then lies between 10 kilobits and 320 kilobits.

Figure 9:
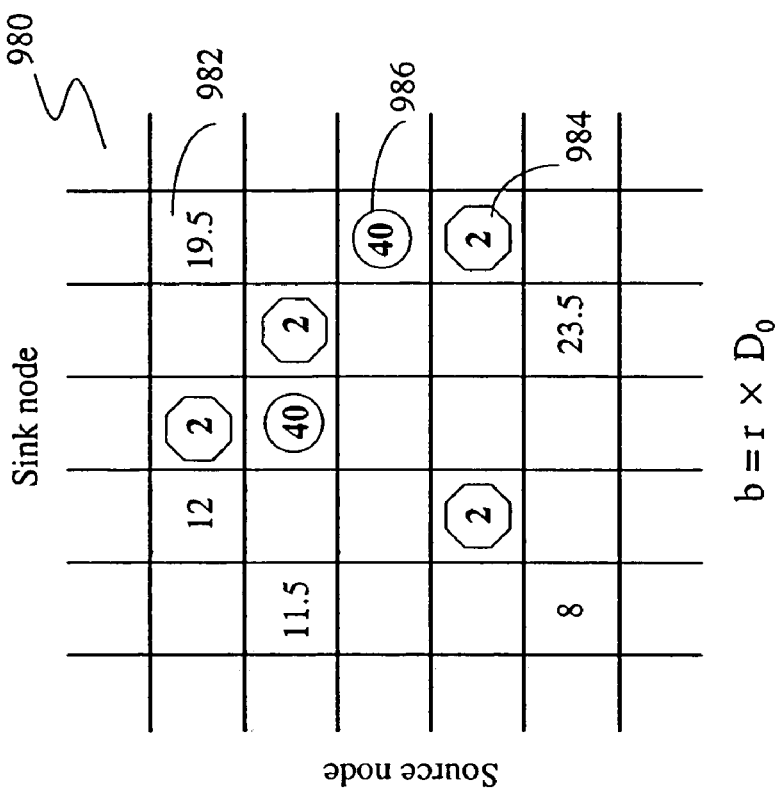
FIG. 9 is an example of preferred burst-sizes corresponding to different bitrate allocations, according to an embodiment of the present invention.
Figure 9:
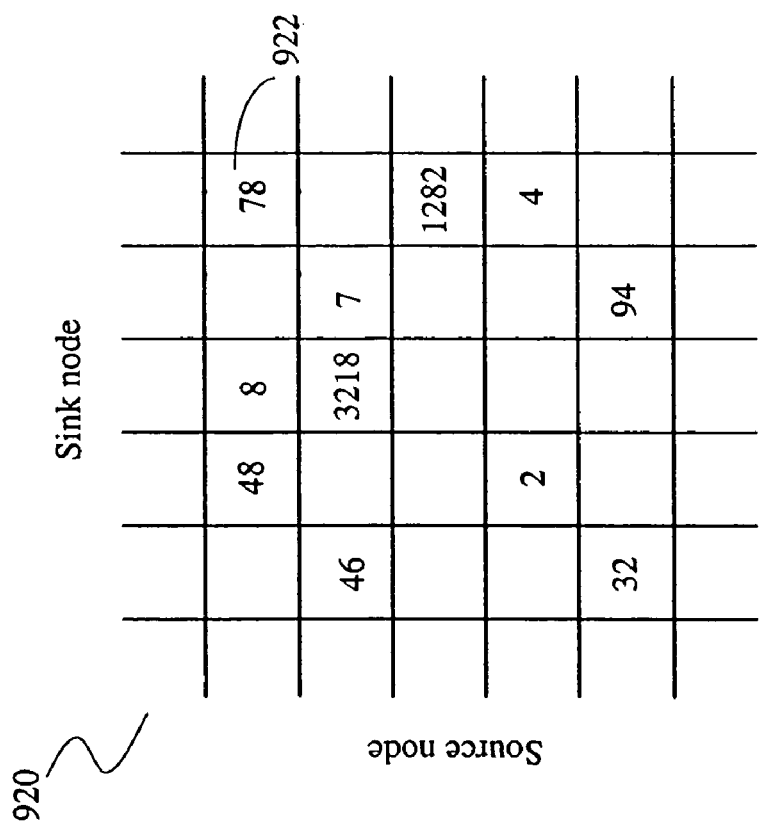

FIG. 9 illustrates an example of burst-size calculation. The bitrate-allocation requirements are represented by an N×N matrix, N being the number of edge nodes 120. The computed burst sizes are represented by an N×N matrix. Corresponding sub-matrices are illustrated in FIG. 9. The sub-matrix 920 containing bitrate allocations 922 for a subset of node pairs shows a wide variance of bitrate-allocation requests, with values ranging from 2 Mb/s to 3218 Mb/s. In this example, the permissible burst-formation delay $D_0$ is set equal to 2 milliseconds, the minimum burst duration, $D_1$, and a maximum burst duration, $D_2$, are set at 1.6 and 32 microseconds, respectively, and the capacity (speed) of the optical channel is 10 Gb/s. This results in a minimum burst size $B_1$ of 2 kilobytes and a maximum burst size $B_2$ of 40 Kilobytes. It is noted that, under the constraint of the maximum burst formation delay of 2 milliseconds, a bitrate of 2 Mb/s would result in a burst size of only 500 bytes and a bitrate of 3218 Mb/s would result in a burst size of about 800 Kilobytes. With the $D_1$ and $D_2$ constraints, these sizes are adjusted to 2 kilobytes and 40 kilobytes respectively. The burst sizes corresponding to the bitrate allocations of sub-matrix 920 are given in sub-matrix 980.

Time-Locking in a Burst-Switching Composite-Star Network

In a wide-coverage network comprising electronic edge nodes interconnected by bufferless core nodes, where each edge node comprises a source node and a sink node, both sharing an edge-node controller and having means for data storage and managing data buffers, the transfer of data bursts from source nodes to sink nodes via the core nodes requires precise time coordination to prevent contention at the bufferless core nodes. A core node preferably comprises a plurality of optical switches each of which may switch entire channels or individual bursts.

As described earlier, a first node X is said to be time locked to a second node Y along a given path, if, at any instant of time, the reading of a time-counter at node X equals the sum of a reading of an identical time-counter at node Y and the propagation time, normalized to the time-counter period, along the given path from node X to node Y, where the time counters at nodes X and Y have the same period. There may be several paths connecting the first node to the second node, and the paths may be defined by individual wavelengths in a fiber link or several fiber links. Due to the difference in propagation delays of different paths connecting the same node pair, time locking may be realized for the different paths individually. Due to dispersion, time locking of individual paths may be required even for paths defined by wavelengths in the same fiber link. When a first node is time locked to a second node along a given path, said given path is said to be time-locked.

In order to be able to switch bursts arriving at a core node 140 from different source nodes 120A having different propagation delays to the core nodes, without contention or the need for burst storage at the core node 140, the edge nodes 120 must be time-locked to each optical switch 220 at a core node 140. A time-locking technique, also called time-coordination, is described in applicant's U.S. patent application Ser. No. 09/286,431, filed on Apr. 6, 1999, and titled SELF-CONFIGURING DISTRIBUTED SWITCH, the specification of which is incorporated herein by reference. With time locking, the scheduling method in accordance with the present invention guarantees that bursts arrive to already free respective input-output ports of the optical switch 220. The time-locking in application Ser. No. 09/286,431 referenced above uses pre-assigned optical channels. In the present application, the method is adapted to burst-switching mode.

Each source node has at least one time counter and each core node has at least one time counter. All time counters have the same period and time-coordination can be realized through an exchange of time-counter readings between each source node and its adjacent core node, i.e., the core node to which the source node is connected. The time-counter readings are carried in-band, alongside payload data bursts destined to sink nodes, and each must be timed to arrive at a corresponding core node during a designated time interval. The difficulty of securing time-coordination arises from two interdependent requirements. The first is that communicating a time-counter reading from a controller of a source node to a controller of a core node requires that the source node be time-locked to the core node, and the second is that time-locking a source node to a core node necessitates that a controller of the core node be able to receive a time-counter reading from the source-node controller during a designated interval of time. To initiate or restore time locking, a secondary mechanism is therefore required for directing upstream signals received from source nodes toward said master controller.

In a network where the edge nodes 120 and the core nodes 140 are collocated in a relatively small area, the propagation delay between any edge node 120 and a core node 140 can be substantially equalized, by equalizing the lengths of fiber links for example. In a network of wide geographic coverage, each edge node must adaptively time lock to the core nodes to which it connects. Time locking enables conflict-free switching at a bufferless core node 140 of data bursts transmitted by a plurality of edge nodes 120 having widely varying propagation delays to the bufferless core node 140.

Figure 10:
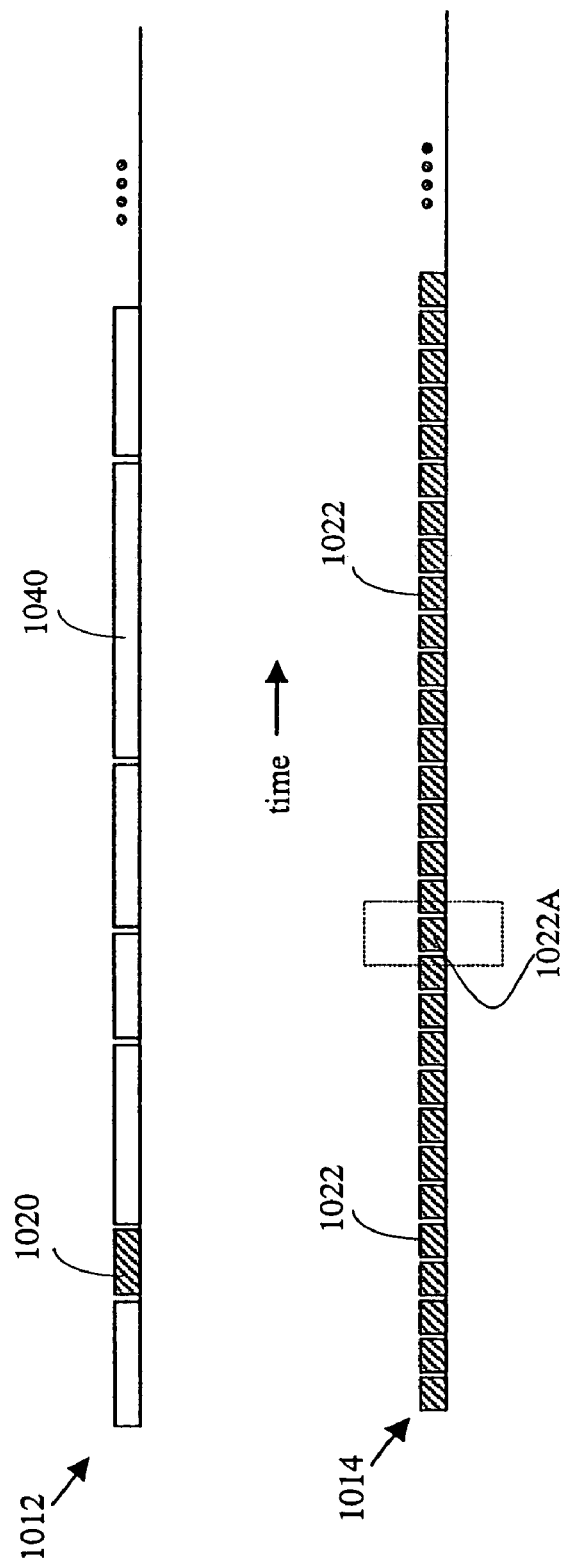
FIG. 10 illustrates two upstream burst sequences sent by an edge node, the first sequence is sent under normal conditions and the second sequence is sent during a time-locking recovery phase, in accordance with one of the embodiments of the present invention.

FIG. 10 illustrates a burst stream 1012 sent by an edge node 120 under normal operation. The burst stream comprises upstream control bursts 1020, one of which is indicated, and payload data bursts 1040, generally of different sizes. The bursts are formed by a source node 120A according to burst-transfer permits said source node receives after a predefined reconfiguration interval. As described with reference to FIG. 12, a new burst transfer schedule may be generated during each reconfiguration interval. An upstream control burst 1020 generally contains timing data as well as other control data and it includes the bitrate-allocation requests 530 described with reference to FIGS. 5 to 7. The size of the timing data would typically be much smaller than the size of the other control data carried by a control burst. During a time-locking recovery phase, the edge node 120 sends only a continuous stream 1014 of control bursts 1022. Due to loss of time coordination, an upstream control burst is naturally shortened because it includes only timing data, and the duration of an upstream control burst would be less than half the time interval designated for receiving a control burst at control output port $B_0$. Thus, as indicated in FIG. 10, a control burst 1022, which is shorter than control burst 1020, can be acquired. It is noted that this time-locking acquisition method allows optical signals from several input ports to be processed in successive time slots allocated to control bursts. During a period of time equal to the duration of an upstream control burst 1020, control output port $B_0$ (FIG. 3) receives and acquires at least one complete shortened upstream control burst 1022, as indicated in FIG. 10 for shortened control burst 1022A.

Figure 11:
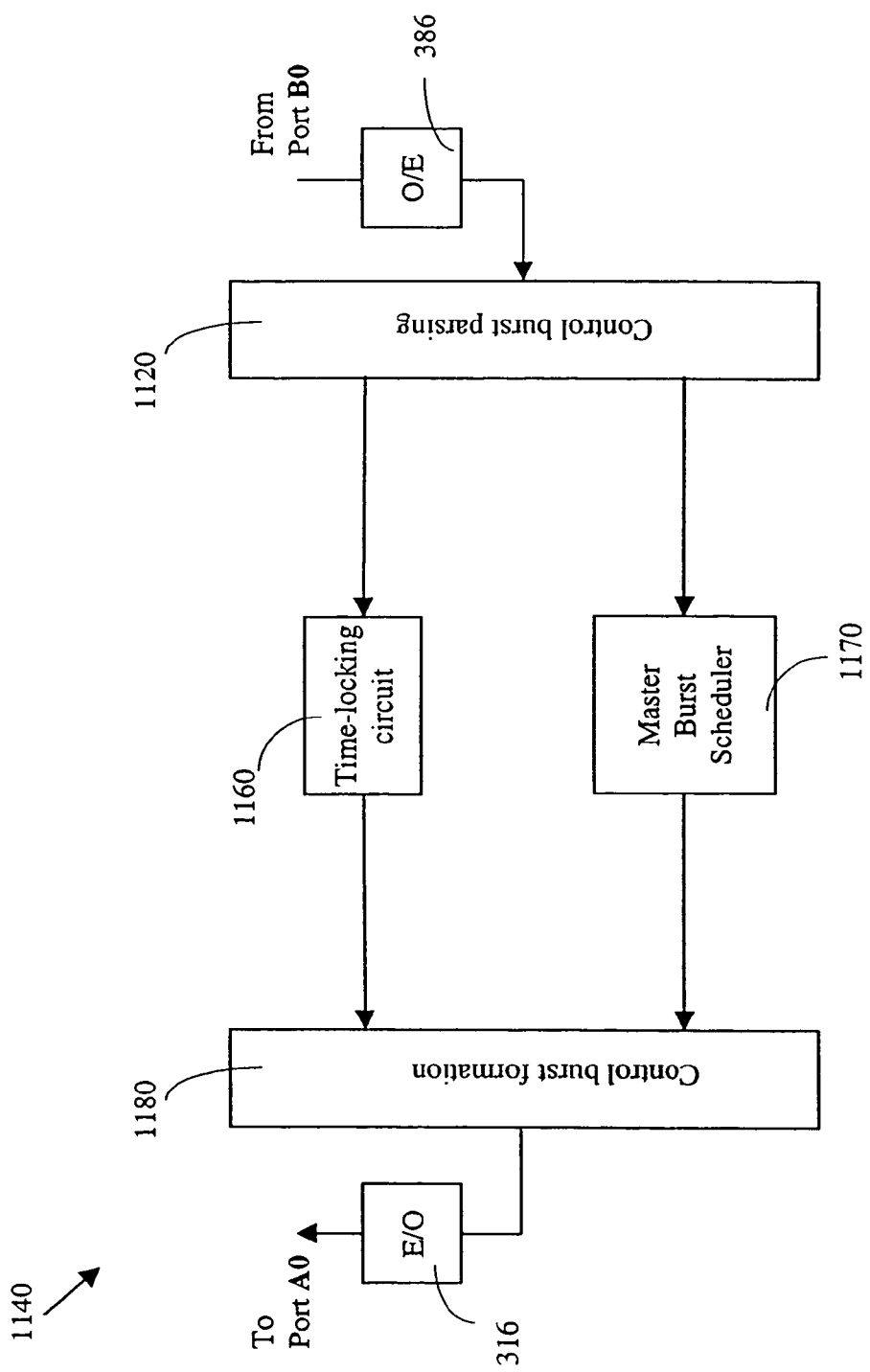
FIG. 11 illustrates two main control elements, specifically a time-locking circuit and a master burst scheduler, within the master controller of an optical space switch, according to an embodiment of the present invention.

FIG. 11 shows control components of a master controller 240. The main two components are a time-locking circuit 1160 and a master burst scheduler 1170. A control burst, which contains timing data is scheduled like any other burst. The master burst scheduler 1170 is described below with reference to FIGS. 21 to 24.

The master controller 240 of an optical switch 220 includes a master time counter. The period of the master time counter is hereinafter called a master cycle. Each edge node also has a time counter that has the same period of the master cycle.

The edge nodes 120 communicating with optical switch 220 in a core node 140 are time-locked to the master time counter of the optical switch 220. The burst-transfer schedules transmitted by the optical-switch master controllers 240 to the edge nodes 120 must be based on the time indication of the master time counter. The schedule period must, therefore, be locked to the master time counter. The selection of the master cycle period and the schedule period are important design choices. As described earlier, the master cycle period exceeds the round-trip propagation delay between any two edge nodes 120. Thus, the maximum round-trip propagation delay dictates the master-cycle duration. In determining a lower bound of the master cycle duration, a time period, of one millisecond or so, would be added to the maximum round-trip propagation delay to account for other delays along a round-trip path. With a time counter of W bits, the duration of the time-counter cycle is $2^W$ multiplied by a clock period. With W=32, and a clock period of 16 nanoseconds, for example, the number of counter states is about 4.29 billions and the time counter period is more than 68 seconds. This is orders of magnitude higher than the round-trip propagation delay between any two edge nodes 120.

The master controller includes a detector operative to detect loss of time locking of any upstream optical signal and secondary means for initiating and recovering time locking. In one implementation, said secondary means includes a device for sampling a succession of timing data delivered to the master controller through said space switch, as will be described with reference to FIG. 15. In another implementation, said secondary means includes a controller switch that diverts an upstream optical signal away from said space switch and towards the master controller, as will be described with reference to FIGS. 16 and 17.

A time-counter cycle is standardized across the network 100 so that each time counter, whether it resides at an edge node 120 or a core node 140, has the same wordlength (number of bits) and all are driven at the same clock rate. Some variation of the clock rate and wordlength can be accommodated.

The schedule period must exceed the duration of the longest burst received at a core node. In order to simplify time coordination between a core node and an edge node, it is preferable that a time-counter cycle period (master cycle period) be an integer multiple J of the schedule period. Furthermore, it is preferable that the integer multiple J be a power of two.

Figure 12:
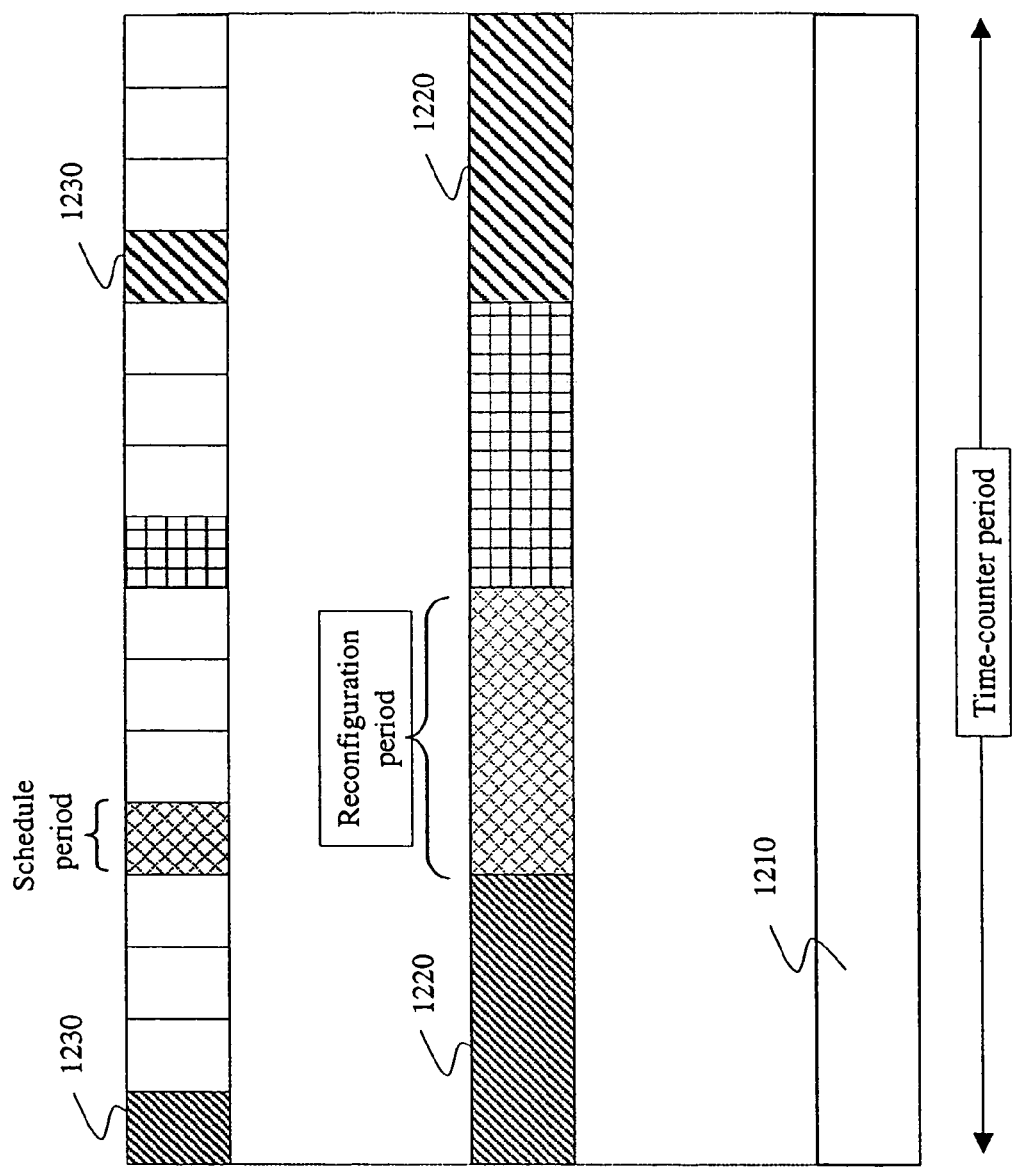
FIG. 12 illustrates a time-counter period, a reconfiguration period, and a schedule period, according to an embodiment of the present invention.

FIG. 12 depicts a master-cycle period 1210, a reconfiguration period 1220, and a schedule period 1230 for an exemplary case of a master-cycle period that is exactly four times a reconfiguration period, and the reconfiguration period is exactly four times the schedule period. As described above, the master-cycle period must exceed the round-trip delay between any two edge-nodes. Preferably, the master-cycle period should be of the order of one second, and the reconfiguration period is preferably of the order of 100 milliseconds. The reconfiguration period must be sufficient to compute a burst-transfer schedule corresponding to a designated burst-transfer period. For an optical switch having a large number of nodes, the computation period 580 (FIG. 5) of a burst-transfer schedule may significantly exceed the designated schedule period. The reconfiguration period 1220 exceeds the period 580 and is selected to be an integer multiple, preferably a power of 2, of the designated schedule period. For example, if the schedule period 1230 is selected to be 2 milliseconds and it is estimated that the computation period 580 (FIGS. 5 to 7) is 11 milliseconds, i.e., 5.5 times the schedule period, then the reconfiguration period 1220 must be selected to be at least 12 milliseconds and the preferred reconfiguration period is 16 milliseconds (8 times the schedule period). Time alignment of the schedule cycle and the master cycle is essential as indicated in FIG. 12. The number of schedule periods per reconfiguration period and the number of reconfiguration periods per master-cycle period are design options.

The alignment of the reconfiguration cycles with the master cycle is realized by selecting the master-cycle period to be an integer multiple of the reconfiguration period. The alignment is further simplified if said integer multiple is a power of 2. For example, if the period of the master cycle is represented by W bits and the reconfiguration period is represented by V bits, V<W, then each reconfiguration cycle should start when the least-significant V bits of the master counter become all zeros.

Each output port of a source node 120A has a time counter, and the time counters of the output ports of a given source node 120A are independently time locked to respective optical switches 220 and, hence, may have different readings at any instant of time. Thus, the start time of a time counter in a source node 120A is output-port specific and adapts to an associated space switch 220. All time counters in the entire network 100 have the same period.

Figure 13:
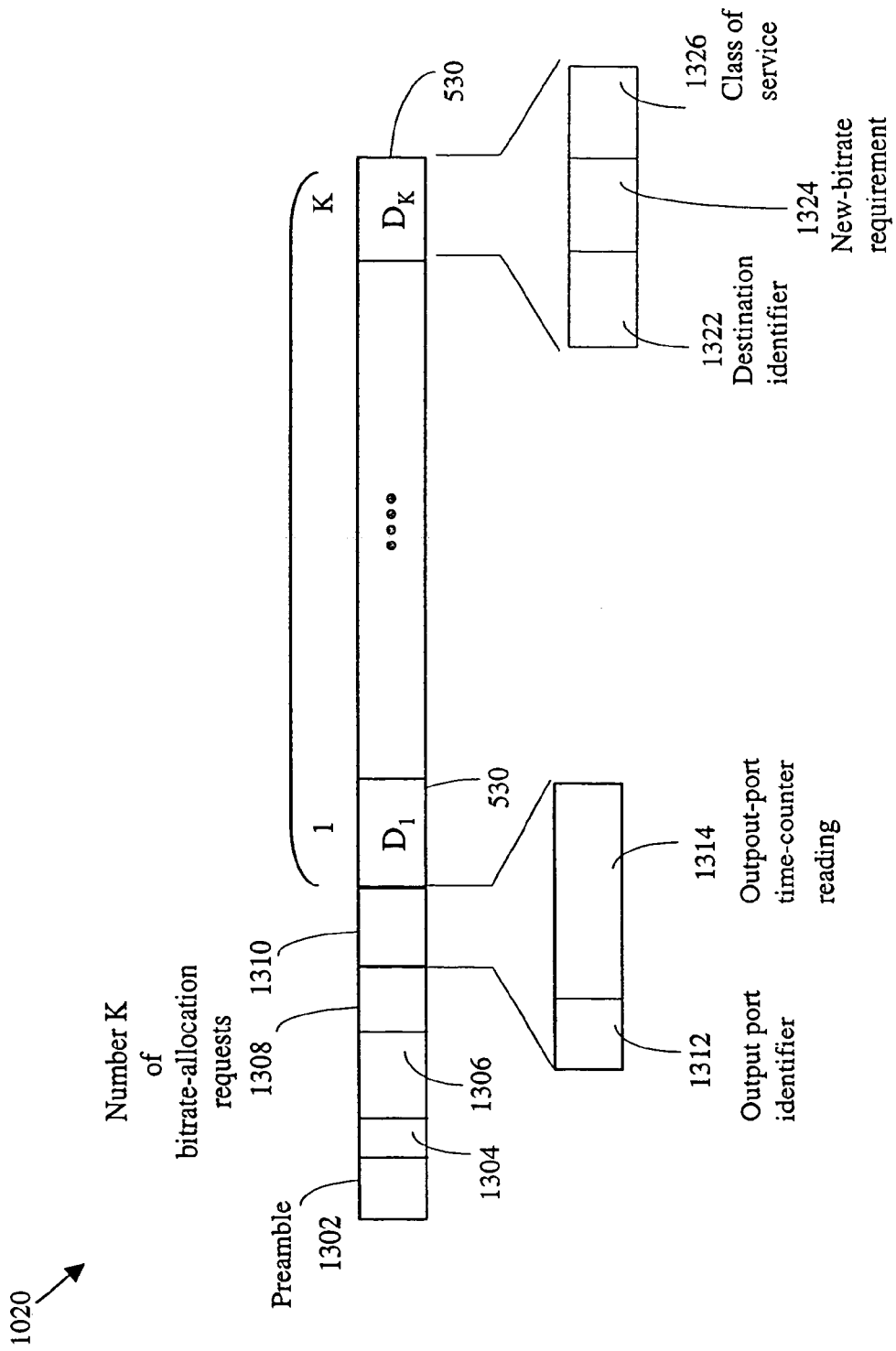
FIG. 13 illustrates an upstream control burst, according to an embodiment of the present invention.

An upstream control burst 1020 sent from an output port of a source node 120A to an optical switch 220 is illustrated in FIG. 13. The upstream control burst 1020 may have several purposes such as conveying timing data and bitrate allocation requests. The upstream control burst 1020 includes a conventional preamble 1302, typically of several bytes, to be used for message identification and acquisition, followed a field 1304 that defines the purpose of the burst 1020. Field 1304 is preferably 4-bit wide, thus identifying 16 different functions of the upstream control burst 1020. Field 1306 contains a cyclic serial number which can be used for verification and further control functions. This is followed by a field 1308 indicating the size of the control burst. Field 1308 indicates the number K of subsequent bitrate-allocation requests included within the upstream control burst 1020, each bitrate allocation request corresponds to a sink node 120B. Record 1310 has two fields 1312 and 1314. Field 1312 is an identifier of an output port of the source node. This would normally be the output port number in the respective source node 120A that formed the upstream control burst 1020. Field 1314 is a time measurement determined as the reading of the time counter of the output port of the source node from which the upstream control burst 1020 is sent to the optical switch 220. The K bitrate-allocation requirements are organized in records 530 (see FIGS. 5, 6, and 7), where each record 530 corresponds to a destination sink node 120B. Each record 530 contains three fields. A field 1322 contains an identifier of a destination sink node 120B, a field 1324 indicates a new bitrate-allocation requirement corresponding to the destination indicated in field 1322, and a field 1326 indicates a class of service. The destination identifier in field 1322 may either be associated with a current bitrate-allocation request or be defining a new one. The bitrate allocation requests 530 are processed by a core-node controller 240A of a core node. An upstream control burst 1020 that carries bitrate-allocation requests 530 from a source node 120A is preferably sent directly to a core-node controller 240A. However, it can be sent to the master controller 240 of any optical switch 220 of the core node 140 because all the master controllers 240 of a core node 140, including the one functioning as a core-node controller 240A, are interconnected.

Each upstream control burst 1020 or 1022 must include fields 1302, 1308, 1312, and 1314. An upstream control burst 1020 that is also used for bitrate allocations, and preferably communicated directly to a core-node controller 240A of a core node 140, includes a number of bitrate allocation requests 530. As described earlier, each of the optical switches 220 of a core node 140 has a master controller 240 and a designated master controller functions as a core-node controller 240A and performs the bitrate-allocation control for all the space switches 220 of the core node 140. Each master controller 240 has a means for recording the reading of its own time-counter at the instant at which it receives an upstream control burst 1020 or 1022.

Figure 14:
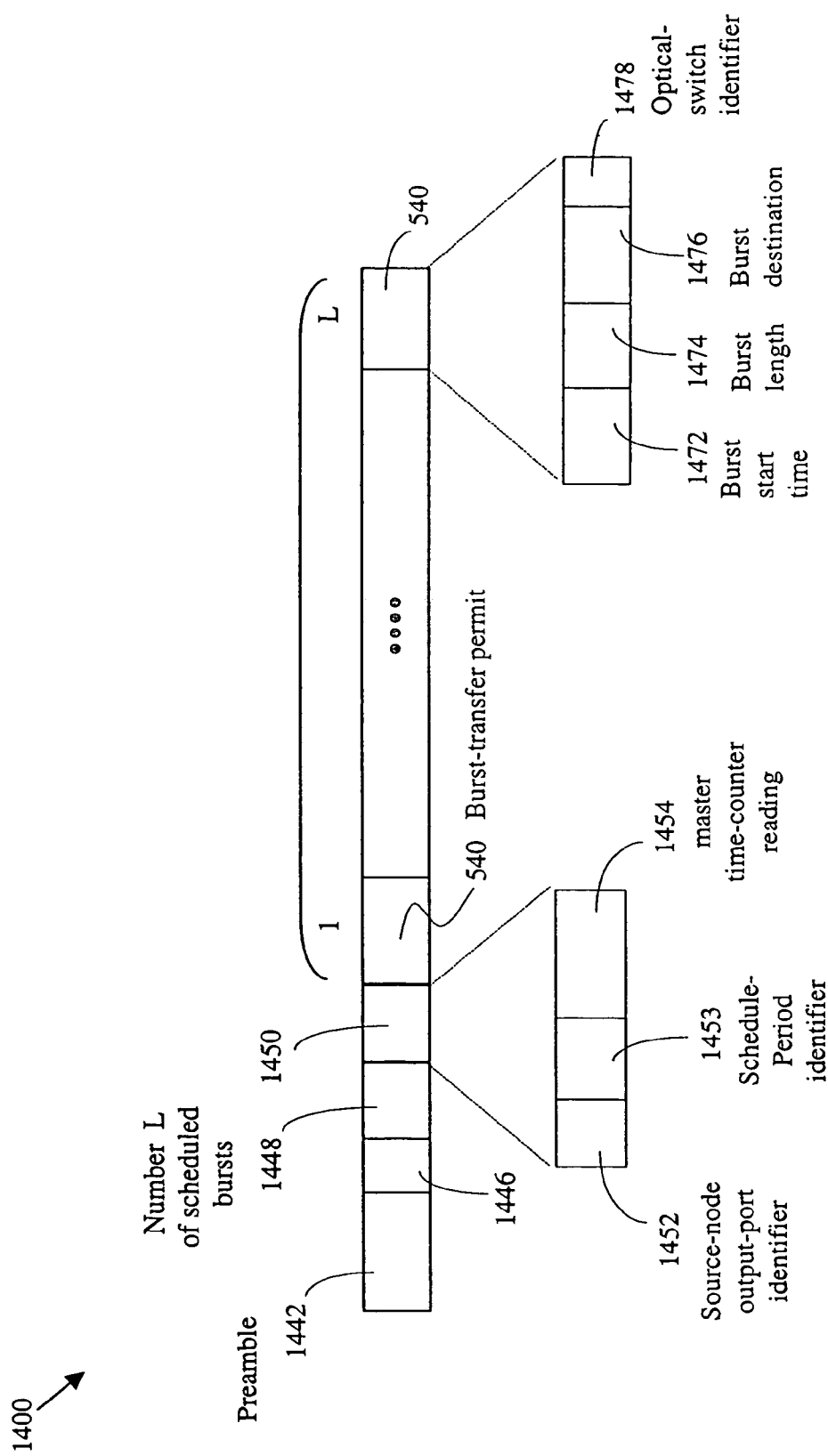
FIG. 14 illustrates a downstream control burst, according to an embodiment of the present invention.

FIG. 14 shows a format of a downstream control burst 1400 that a master controller 240 sends to a sink node 120B in response to an upstream control burst 1020. The first field 1442 is a conventional preamble. Field 1446, preferably 4-bit wide, defines the function of the downstream control burst 1400 which may carry timing data and burst-transfer permits, among other control data. The field 1448 indicates the number L of scheduled bursts reported in the downstream control burst 1400. A record 1450 contains a timing response that has at least three fields. The first field, 1452, contains an identifier of an output port of the source node associated with the upstream control burst 1020. The second field, 1453 contains the schedule-period number associated with the control burst 1020. The third field 1454 contains the time at which the upstream control burst 1020 was received at the master controller 240 of optical switch 220. Each of the L records 540 (FIGS. 5, 6, and 7) has three fields. The first field 1472 indicates a burst start time relative to the schedule period. The second field 1474 indicates the burst length. The third field 1476 indicates the burst destination sink node 120B. A fourth field 1478 is optional and may be used to indicate to an edge node 120 receiving a downstream control burst 1400 an identifier of an optical switch 220 to which a burst is to be directed. Note that there is a one-to-one correspondence between an optical switch 220 and a port of the edge node 120. Field 1478 is optional because a controller of an edge node 120 receiving the downstream control burst 1400 can associate the input port at which the edge node 120 receives the downstream control burst with an optical switch 220 of a core node 140.

Node-Pair Time-Locking

The time-locking process in a time-shared network is described with the help of a two-node model. To realize time locking of a first node to a second node in a network, the first node is provided with a first controller that includes a first time counter and the second node is provided with a slave controller and a master controller that includes a master time counter. The second node has several input ports and output ports and the master controller is connected to one of the input ports and one of the output ports. The first controller sends an upstream control burst to an input port of said second node during a designated time interval, said upstream control burst including a reading of the first time counter. The upstream control burst is sent in-band, together with payload data bursts destined to output ports of the second nodes. The slave controller must be able to direct said upstream control burst to said master controller during a pre-scheduled time interval. The master controller has a device for acquiring and parsing upstream control bursts. The master controller compares the reading of the first time counter with a reading of the master time counter. An agreement of the two readings, or a negligible discrepancy, ascertains time alignment.

In the absence of time alignment, a time-locking recovery procedure must be initiated. The master controller sends a downstream control burst to said first controller to indicate the absence of time alignment. In response, the first node sends a succession of upstream control bursts each including a reading of said first time counter. Meanwhile, the slave controller directs a sample of said upstream control bursts to said master controller during a pre-scheduled time interval and the master controller acquires at least one upstream control burst from said sample and sends an identifier of an acquired upstream burst and a corresponding reading of the master time counter to the first controller. The identifier may be a serial number of the upstream burst, or a reading of the first time counter included in the upstream control burst. The first controller then resets the first time counter accordingly to restore the required time locking. During this recovery phase, the slave controller, which controls the connectivity of input ports to output ports of the second node, disconnects all paths to all output ports from the input port of the second node that connects to the first node.

The application of the time-locking process, described in the above two-node model, to the network of FIG. 1 is described below. Each edge node 120 assumes the role of the first node and each core node 140 assumes the role of the second node. A core node 140 may have several optical switches 220, and an upstream WDM link 210 from a source node 120A may switch burst streams through more than one optical switch 220. The source node 120A may lose its time-locking to one of the space switches 220 while still being time locked to the remaining space switches 220 of the core node 140.

Hereinafter, any mention of time-locking in a network of electronic edge nodes 120 and bufferless core nodes 140 each having a plurality of space switches (optical switches) 220 implies time locking of a port of a source node 120A of an edge node 120 to a space switch (optical switch) 220 of a core node 140.

Each scheduled control burst received at an optical switch 220 corresponds to a source node 120A and the master controller 240 of said optical switch 220 parses the control burst to determine the source node and source node's time counter reading. In the notation used hereinafter, an edge node 120, labeled Ex, connects to an input port $A_x$ and to an output port $B_x$ of an optical switch 220, $1 \leq x \leq N$. When the master controller 240 determines that the edge node $E_x$ that connects to a port $A_x$ is not time-locked to the optical switch, it instructs the slave controller 250 to discontinue burst transfer from input port $A_x$ (314) to all output ports (384) $B_1$ to $B_N$. The slave controller 250 continues to direct upstream control bursts 1020 received at port $A_x$ to control output port $B_0$ during designated time intervals. The master controller 240 also sends a downstream control burst 1400 through input control port $A_0$ and output port $B_x$ instructing edge node $E_x$ to send a continuous sequence of control bursts each including a reading of the time-counter of edge node $E_x$.

During the periods scheduled for receiving, at control output port $B_0$, upstream control bursts 1020 from edge node $E_x$, the master controller 240 reads each control burst to acquire a time-counter reading (a time measurement) 1314 of a respective edge node. Once the time-counter reading 1314 from edge node $E_x$ is detected, the master controller 240 sends a corresponding reading 1454 of the master time counter to edge node $E_x$. When the master controller 240 determines that edge node $E_x$ is time locked to the master time counter, the master controller 240 instructs edge node $E_x$ to resume sending payload data bursts starting at a predefined instant of time in the master cycle, and the master controller also instructs the slave controller to resume transferring data bursts from input port $E_x$ at a corresponding instant of time, typically the start of a subsequent master cycle.

The method described above is illustrated in the block diagram of FIG. 15, which includes the main steps of time-locking acquisition for each edge-core node pair. The master controller 240 receives an upstream control burst 1020 from each edge node 120 through control output port $B_0$ (FIG. 3) as indicated in step 1510 of FIG. 15. The control burst is parsed to acquire a timing message in record 1310 that includes an identifier 1312 of an output port of an edge node 120 and the reading 1314 of the time-counter of said edge node 120 as indicated in step 1520. There is a one-to-one correspondence between an output port of a source node 120A connecting to the optical switch 220 and an input port 314 of the optical switch 220. There is also a one-to-one correspondence between each output port 384 of the optical switch 220 and an input port of a sink node 120B connecting to the optical switch 220.

In step 1520, if the master controller 240 fails to acquire the timing message from an input port 314, as determined in step 1530, it initiates a time-locking recovery process and control is transferred to step 1532. If the input port 314 is already in a recovery mode, as determined in step 1532, then control is transferred to step 1510 to process a control burst from another input port 314. Otherwise, a time-locking recovery process is initiated. This requires executing the two main steps 1540 and 1550 to be described below, and the input port 314 through which the burst control message is received is marked as being in a recovery mode. Control is then transferred to step 1510.

In step 1520, if the master controller 240 succeeds in acquiring the timing message, as determined in step 1530, then control is transferred to step 1560 where the master controller verifies the operational state of the input port 314 through which the control burst has been received. If the input port 314 was operational in the previous verification, then nothing need be done and control is transferred to step 1510. If, however, the input port was marked as being in the recovery mode, i.e., the input port 314 has just completed a recovery process, then, in step 1570, the input port 314 is marked as operational and the master controller 240 also instructs a respective edge node 120, in step 1570, to return to normal operation by sending payload data bursts and control bursts according to current burst-transfer permits. In step 1580, the master controller 240 instructs the slave controller 250 to restore switching from the recovered input port 314 to control output port $B_0$ and output ports $B_1$ to $B_N$.

In step 1540, the master controller 240 instructs the affected edge node 120, i.e., the edge node connecting to the affected input port $A_x$ of the optical switch 220, to send a continuous stream 1014 (FIG. 10) of upstream control bursts 1022, each including a cyclic serial number 1306 and a timing message (record 1310 of FIG. 13). An upstream control burst 1022 is a shortened form of an upstream control burst 1020. The number K of bitrate allocation requests (FIG. 13) is zero and, hence, records 530 are omitted. The serial number can be used to identify a corresponding reading 1314 of the time counter of the edge node. The duration of each control bursts should be less than half the time interval designated for receiving a control burst as illustrated in FIG. 10. The affected edge node then refrains from sending payload data bursts, i.e., bursts which would otherwise be directed to output ports $B_1$ to $B_N$, during the recovery phase.

In step 1550, the slave controller 250 starts a recovery process by discontinuing the transfer of bursts from the affected input port 314 to the output ports $B_1$ to $B_N$. The affected input port 314 is switched to the control output port $B_0$ during a time interval specified by the switching schedule of space switch 220. The signal received at control output port $B_0$ during the time interval designated for the affected input port is now suspected to contain data other than the required timing data. However, since the edge node 120 is now sending a continuous stream 1014 of control bursts of appropriate width, the master controller 240 can acquire at least one of the upstream control bursts 1022, determine its serial number and the corresponding reading of the time counter of the edge node. The master controller then replies to the affected edge node 120, indicating the serial number of the control burst and the reading of the master time counter at the instant the selected control burst was acquired. Alternatively, instead of communicating a serial number of the control burst, the reply may include the time-counter reading received from the edge node and the corresponding reading of the master time counter of master controller 240. The edge node 120 can then adjust its time counter according to the timing data of the reply.

Figure 16:
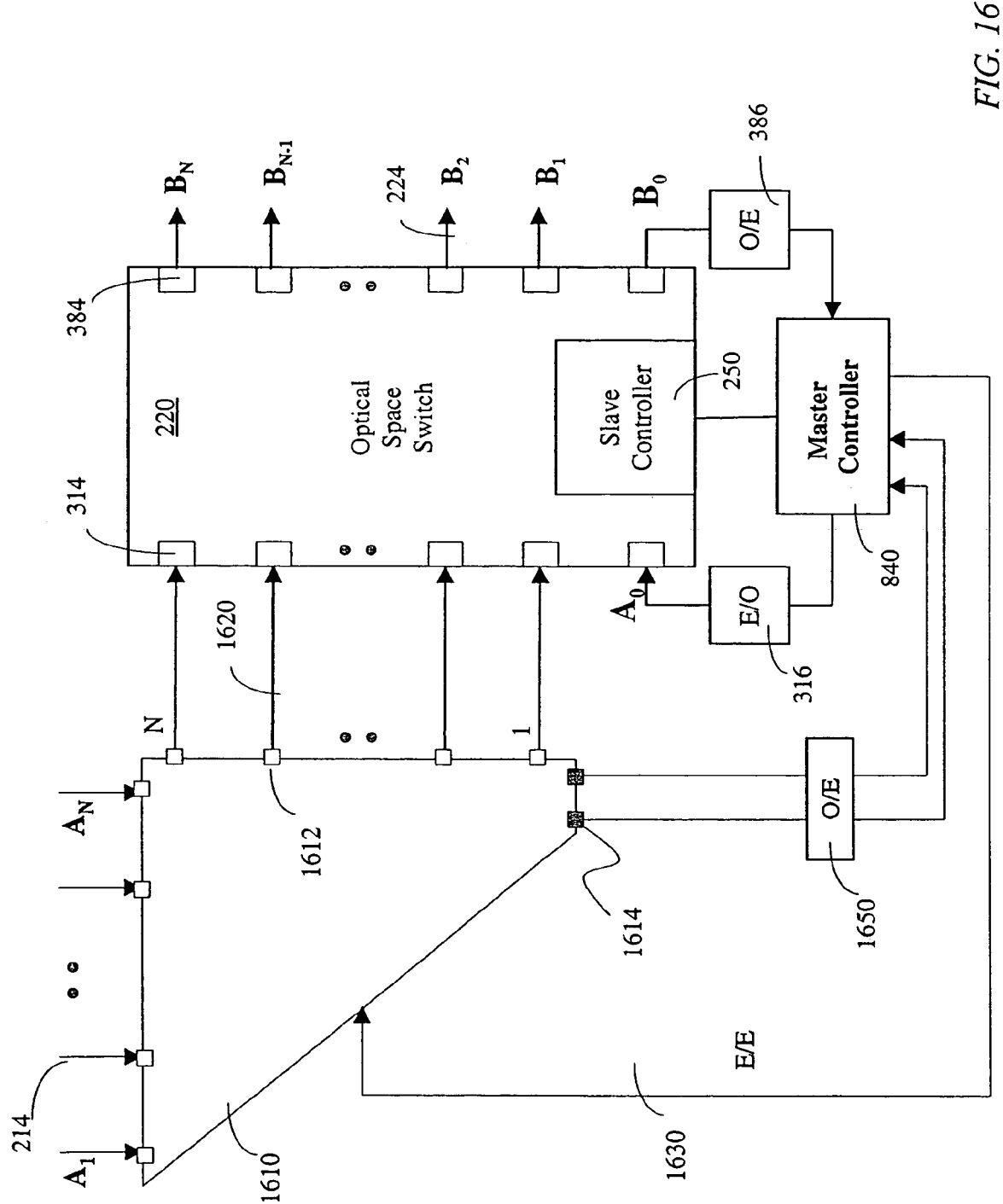
FIG. 16 illustrates an alternative arrangement for initiating and recovering time-locking between edge nodes and an optical switch in a core node, in accordance with one of the embodiments of the present invention.

An alternate method of securing and maintaining time locking is to provide an access stage to the optical switch. The access stage can divert an incoming channel directly to the master controller 240 under certain conditions. FIG. 16 illustrates an optical switch having input ports $A_0$ to $A_N$ and output ports $B_0$ to $B_N$ where input port $A_0$ is a control input port and output port $B_0$ is a control output port. The master controller 240 sends downstream control bursts 1400 to any of output ports $B_1$ to $B_N$ through an E/O interface 316, control input port $A_0$, and the optical switch 220, and the master controller 240 receives upstream control bursts 1020 from input ports $A_1$ to $A_N$ through a control switch 1610, the optical switch 220, control output port $B_0$, and an O/E interface 386.

The control switch 1610 has N receiving ports $A_1$ to $A_N$ and N sending ports 1612 connecting to N input ports of the optical switch. The control switch 1610 also has a number, $n \leq N$, of ports 1614 connecting to the master controller through an O/E interface 1650. Typically n is much smaller than N. The purpose of the control switch 1610 is to selectively divert an optical signal received at any of ports $A_1$ to $A_N$ to the master controller 240. At most n such signals can be diverted simultaneously.

A master controller 240 of an optical switch 220 detects loss of time locking of an edge node to the optical switch by comparing a received reading of a time counter of an output port of the edge node to the reading of a master time counter of master controller 240. The two readings should be identical, or be within an acceptable deviation from each other. When the master controller 240 determines that the source node 120A of a signal received at a port $A_x$ is not time-locked to the optical switch 220, it instructs the control switch 1610 to divert the signal to one of n input ports of the master controller. The master controller 240 reads the signal to identify an upstream control burst 1020 and, meanwhile, it sends a downstream control burst 1400 to the associated sink node of said source node to indicate the loss of time-locking. The downstream control burst 1400 is sent through the E/O interface 316, control input port $A_0$, the optical switch 220, and a downstream channel 224 from output port $B_x$. When the time-counter reading 1314 is detected, the master controller 240 sends the edge node $E_x$ a downstream control burst 1400 including a corresponding reading of the master time counter. When the master controller 240 determines that the edge node $E_x$ is time locked to the master time counter, i.e., when the received reading of the time counter of the edge node equals the reading of the master time counter, or is within an acceptable tolerance, the master controller 240 instructs the control switch 1610 to connect port $A_x$ to the optical switch 220 and communication from edge node $E_x$ is restored. It is noted that the signals sent on link 1630 from the master controller 240 to a connectivity controller (not illustrated) of the collocated control switch 1610 are electrical signals.

Figure 17:
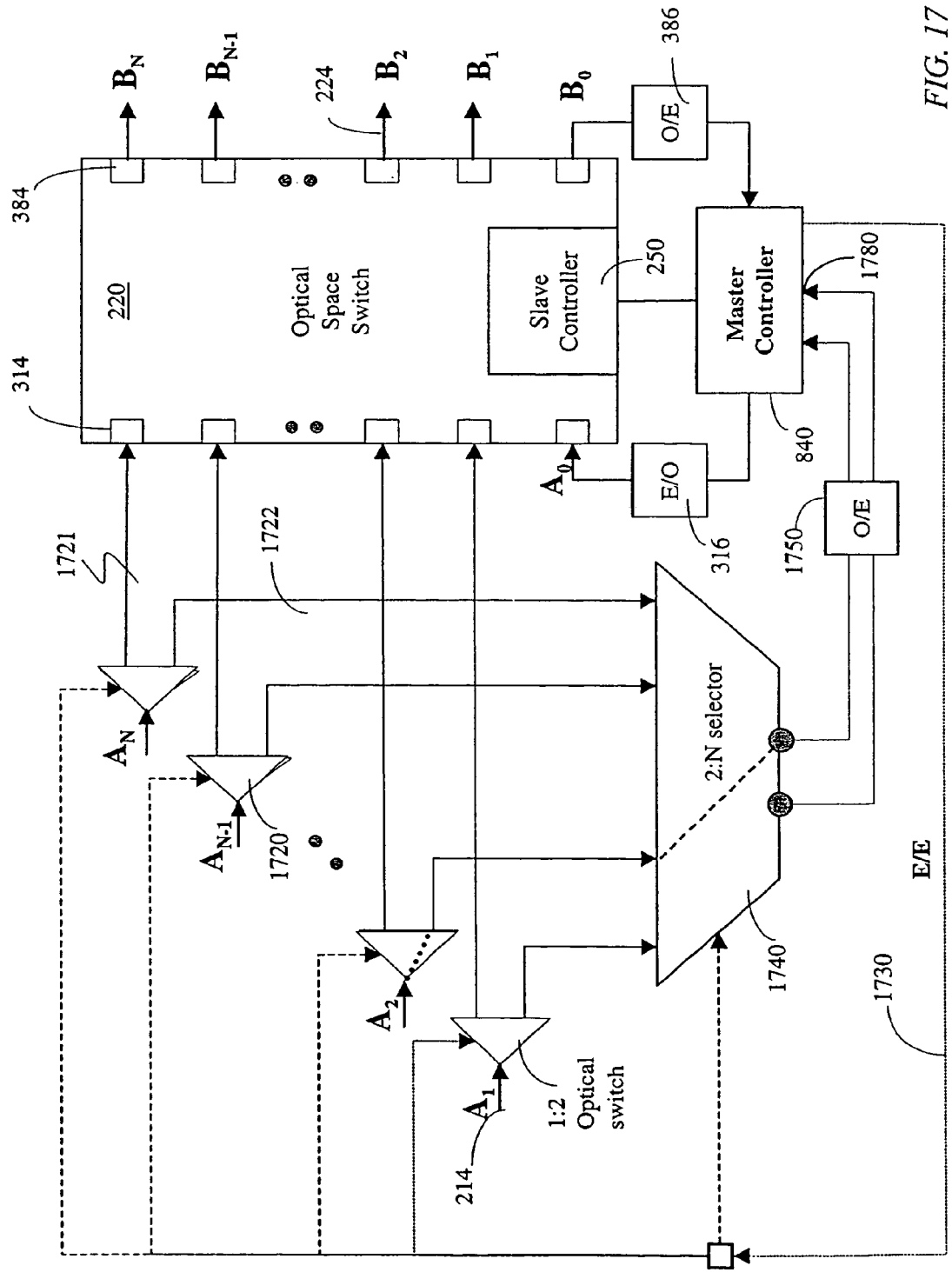
FIG. 17 illustrates an implementation of the arrangement of FIG. 16.

FIG. 17 illustrates the time-locking arrangement of FIG. 16 with a specific implementation of the control switch 1610. The control switch 1610 includes a number, N, of 1:2 optical switches 1720 with N outputs 1721 connecting to the input ports of the optical switch 220 and N outputs 1722 connecting to an n: N selector 1740. As mentioned above, the number n of control ports connecting directly to the master controller would be substantially less than N. For example, with N=256, two direct control ports (n=2) would suffice. In the event that more than n source nodes lose time-locking to the master time counter, the recovery process described above can be applied sequentially.

The master controller 240 of the optical switch 220 creates a schedule for receiving control bursts from each input port. According to the schedule, each of the source nodes 120A sending a burst stream to one of the input ports $A_x$ must send control bursts at time instants indicated in the schedule. In order to send the control bursts precisely at the time determined from the schedule, each of the source nodes 120A connecting to a core node 140 must be time-locked to the specific optical switch 220 to which it is connected. Before time locking can be achieved for a given source node 120A, the source node sends a first timing message, indicating a reading of its time counter, to the master controller 240 of said specific optical switch 220, and obtains a reply message indicating the corresponding time-counter reading at the master controller 240 at the instant of receiving the first timing message. The reply message is initiated by the master controller 240 which sends a downstream message to a specific edge node. The first timing message is included in an upstream control burst 1020 and the reply message is included in a downstream control burst 1400. Time-locking is not required for downstream communications because the edge node (the sink nodes) can buffer the data it receives. The downstream message commands the edge node (the source node) to send a time-counter reading of a respective output port of the source node. This reading is basically an indication of the start of the time-counter (the zero reading). An edge node 120 provides a time counter in each of its output ports that connect to core nodes 140. Referring to FIG. 17, the master controller 240 simultaneously sets a respective 1:2 optical switch 1720 and the optical selector 1740 so that the optical signal received from the source node is directed to an auxiliary port 1780 of the master controller 240. The optical signal is first converted to the electrical domain in O/E unit 1750 and the electrical signal is parsed to obtain the required timing data. Once the master controller 240 receives the timing data, it replies with the corresponding master time-counter reading 1454 within a downstream control burst 1400. The time-counter at a corresponding output port of the source node is adjusted accordingly and time-locking is then realized. With n=1, for example, and when several source nodes are not time-locked to an optical switch 220 of a core node 140, the time-locking process just described is executed sequentially, one source node at a time.

Figure 18:
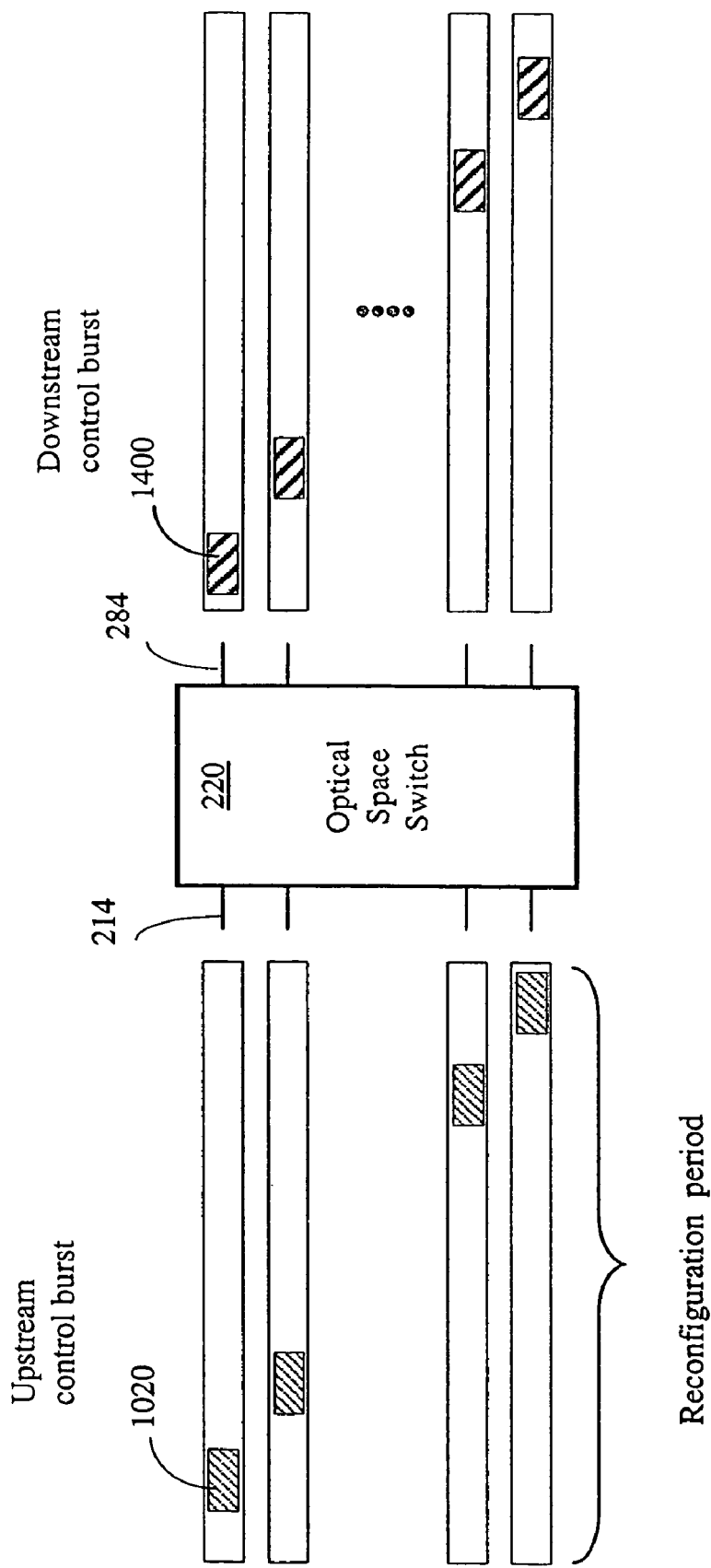
FIG. 18 illustrates the temporal arrangement of upstream and downstream control bursts in optical channels, according to an embodiment of the present invention.

FIG. 18 illustrates the required spacing of the upstream control bursts 1020 received at the N ports of an optical switch 220 so that control output port $B_0$ receives one control burst at a time. The spacing of upstream control bursts is required to ensure that there is no contention in accessing the master controller through control output port $B_0$ (FIG. 3). Downstream control bursts 1400 are naturally spaced because they are switched from a control input port $A_0$ to output ports $B_1$ to $B_N$ in consecutive time intervals. Because upstream control bursts 1020 carry control data of a predefined format, as indicated in FIG. 13, the upstream control bursts 1020, for different edge nodes, are preferably of the same size. Similarly, the downstream control bursts 1400 are preferably of the same size. This size uniformity facilitates the scheduling of the control bursts. It is emphasized that all schedules are produced, in the form of edge-node-specific burst-transfer permits 540 (FIG. 14), by the master controller 240 of the optical switch 220.

Figure 19:
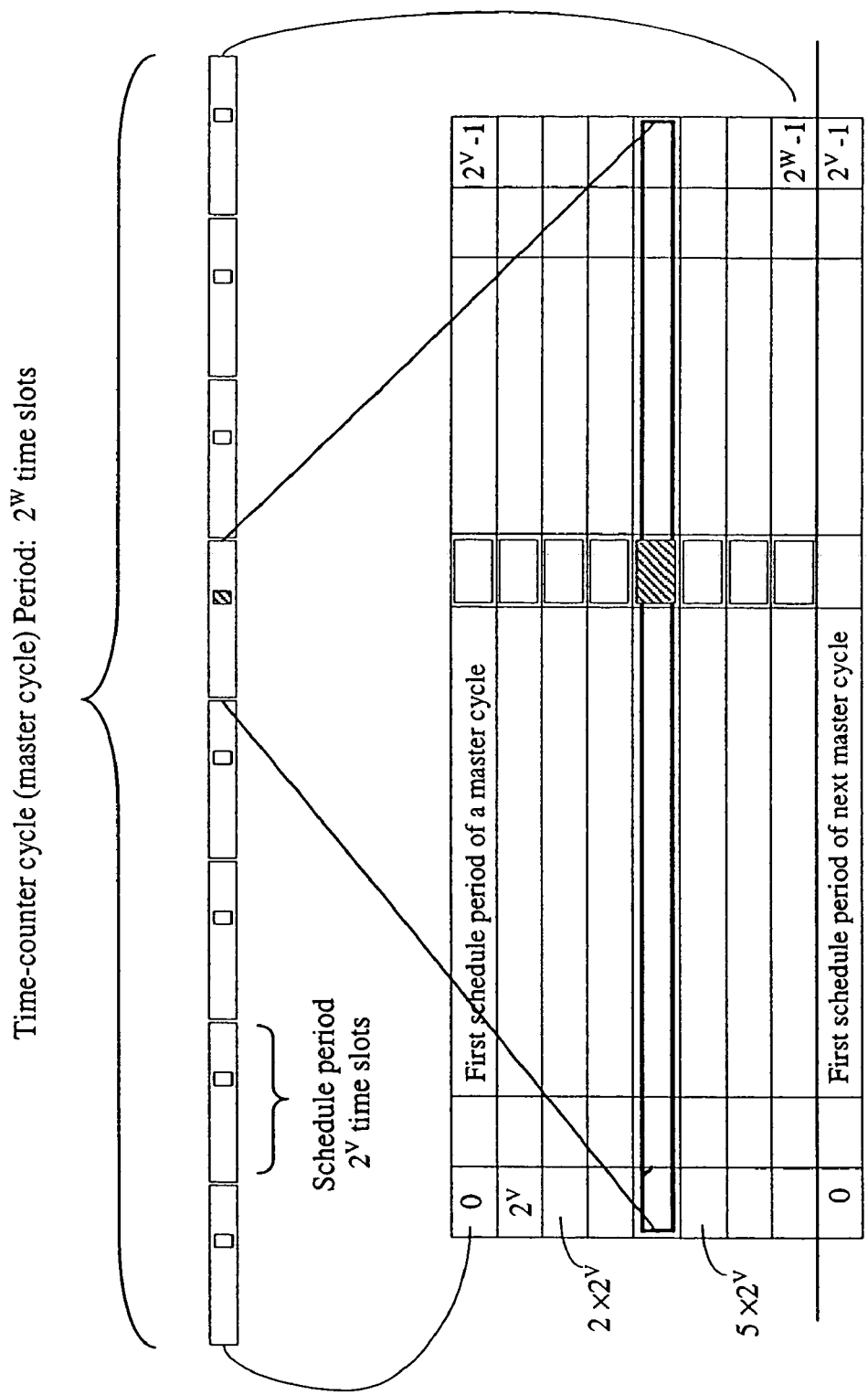
FIG. 19 illustrates the relative position of a timing control burst within a time-counter cycle, according to an embodiment of the present invention.

FIG. 19 illustrates the positioning of the control bursts within the scheduling cycles. To facilitate the scheduling, each control burst is placed at corresponding cyclic times in consecutive scheduling cycles. Only one timing control-burst is normally required per time-counter cycle (master cycle). Any of the scheduling cycles within the master cycle may contain the timing control burst. A case where each reconfiguration period 1220 equals a schedule period 1230 (FIG. 12) and a time-counter cycle (master cycle) period 1210 includes eight scheduling periods, and where the fifth schedule period within a master cycle period contains a control burst 1020 that includes timing data, is indicated in FIG. 19. The control bursts in the remaining scheduling cycles are used for communicating control data between the edge-node controllers (not illustrated) and the master controller 240 of the optical switch 220. The reconfiguration period, in this example, is represented by V bits, the reconfiguration period equals the schedule period, and the master cycle period is represented by W bits, with W−V=3. The duration of the schedule period is $2^V$ clock periods and the duration of the master cycle is $2^W$ clock periods.

Figure 20:
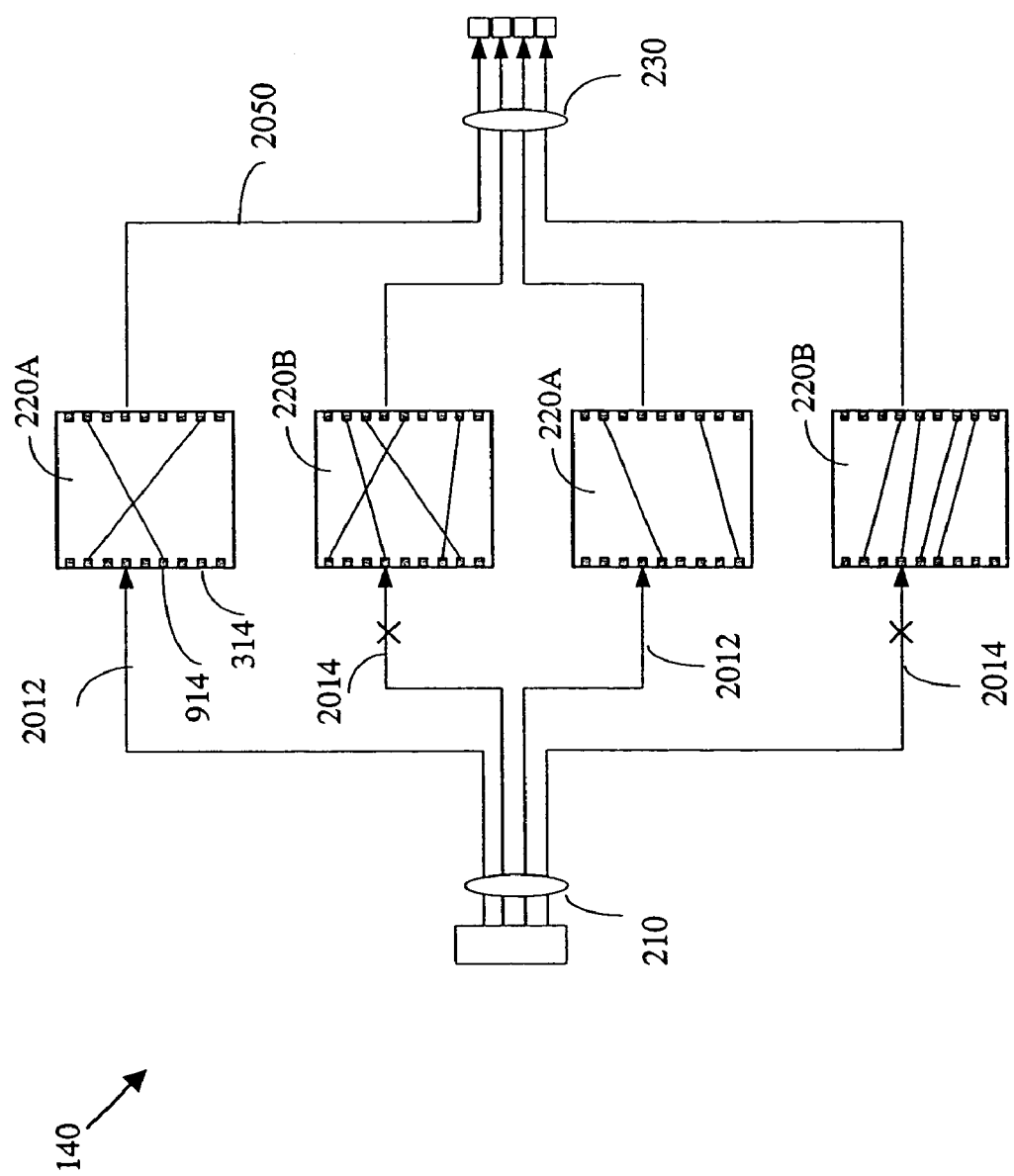
FIG. 20 illustrates an optical node having four optical switches where some input ports in each optical switch are operated in a channel-switching mode and others are operated in a burst-switching mode, according to an embodiment of the present invention.

FIG. 20 illustrates a core node 140 having four optical switches 220 where some input ports in each optical switch 220 operate in a channel-switching mode and the remaining input ports operate in a burst-switching mode. An incoming fiber link 210 carries four wavelengths that are demultiplexed and carried by internal fiber links 2012/2014 to input ports 314 of the optical switches 220. Two of the four wavelengths, referenced as 2014, are channel-switched to corresponding output ports of respective optical switches 220 and the other two wavelengths, referenced as 2012, carry data bursts that are individually switched to arbitrary output ports of respective optical switches 220, said arbitrary output ports excluding output ports that receive switched channels. When the channel-switched connections are evenly distributed among the optical switches, the burst-scheduling computational effort is evenly distributed among the master controllers 240 of the optical switches 220.

Each burst-mode input port switches a succession of data bursts to several output ports. A channel-mode input port switches a succession of data units of any format to a single output port in a unicast connection, or to several designated output ports in a multicast connection. Basically, a channel is set up and retained for an extended period of time. Channel scheduling in the arrangement of FIG. 20 is preferably performed according to a packing process where the search for an optical switch 220 that can accommodate a required path starts from the same optical switch 220 in a core node 140. It is known that such a packing discipline increases network utilization by increasing the opportunity of matching a free input channel 2014 in an upstream link 210 to a free output channel 2050 in a multi-channel link 230. In contrast, burst-mode connections are preferably allocated equitably among the optical switches 220 of each core node 140. The reason is that the bottleneck in burst switching can be the burst-scheduling effort. While packing increases utilization, it also increases the scheduling effort. The scheduling effort is, however, relatively insignificant in channel switching in comparison with burst switching. The use of packing for channel switching must be constrained, so that the number of channels connections per optical switch 220 is limited, to permit a balanced distribution of burst-switched connections among the optical switches 220 of a core node 140.

Figure 15:
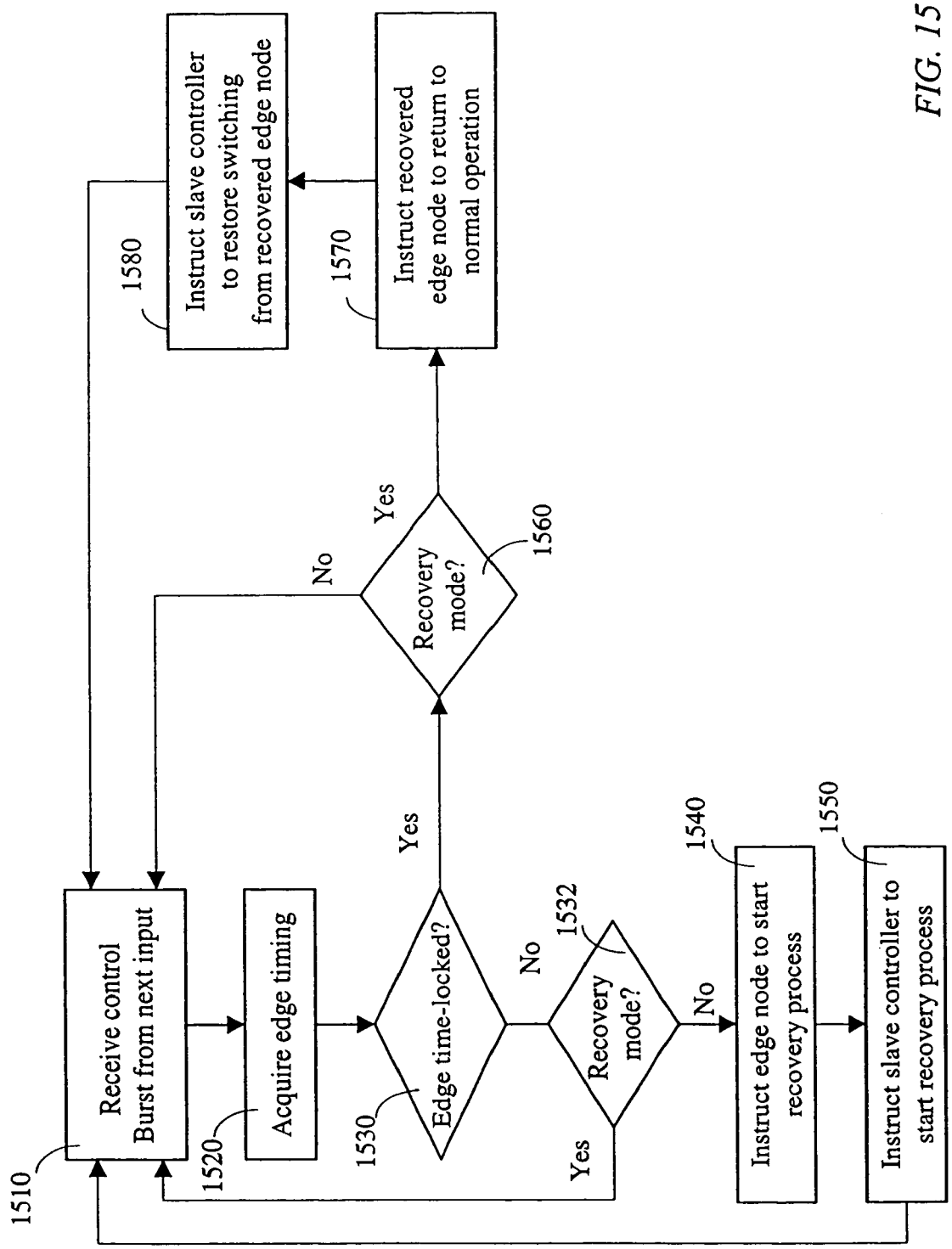
FIG. 15 is a flow chart illustrating the main steps of time-locking recovery, in accordance with one of the embodiments of the present invention.

In order to enable burst switching, a time-locking process is applied as described with reference to FIG. 15 or FIGS. 16 and 17. Channel switching does not require time-locking if the switching pattern is not modified frequently. Without time locking, channel switching requires that the corresponding source node refrain from sending data over a period of time sufficient to exchange messages with a respective optical switch 220 and implement the switching change at the optical switch 220. For example, if the switching pattern changes every hour, then allowing an idle period of about 80 milliseconds for reconfiguration result in a relatively-low waste. However, for adaptive channel switching, where the switching pattern changes at a relatively high rate, every 100 milliseconds for example, a guard time of 80 milliseconds would be excessive and a guard time of only a few microseconds would be permissible between successive switching changes. Scheduling switching-pattern changes with a small guard time requires that the edge nodes be time-locked to the optical space switches 220 to which they are connected.

Due to the varying propagation speeds for different wavelengths, the propagation delay difference between wavelengths within the same WDM link may be significant and strict time locking would be required for each wavelength that is switched at a burst-mode port in an optical switch 220. Time-locking of a single wavelength channel is enabled by upstream control bursts 1020 (FIG. 13) and downstream control burst 1400 (FIG. 14). This applies only to channels 2012 which operate in the burst-switching mode. A wavelength channel that is switched in its entirety in an optical switch 220 of core node 140 can not access the master controller of the optical switch 220 and hence can not acquire precise time-locking. Relaxed time-locking can, however, be realized by association with other precisely time-locked channels. Thus, a guard time at least equal to the difference in propagation delay between any two wavelengths may be applied between successive changes of the channel-switching pattern at the optical switch 220. For example, link 210 in FIG. 20 carries two channels, referenced as 2012, that lead to burst-mode input ports of optical switches 220A and two channels, referenced as 2014, to optical switches 220B. The output ports of a source node 120A from which link 210 emanates can be precisely time locked to optical switches 220A. If it is estimated that the maximum differential propagation delay of the channels within link 210 is 2 microseconds, for example, then an adaptive reconfiguration of any of optical switches 220B requires an idle period of only 2 microseconds. Thus, this associative time-locking can significantly reduce the idle period between successive reconfigurations.

Periodic Burst-Schedule Generation

Applicant's U.S. patent application Ser. No. 09/750,071, filed on Dec. 29, 2000, and titled "Burst Switching in a High-Capacity Network", describes a burst-switching network wherein source nodes request connections to be established through an optical switch and, at a master controller of the optical switch, the requests are compared to other such requests so that a schedule may be established for access to the optical switch. The schedule is then sent to the source nodes as well as to a slave controller of the optical switch. Data bursts are received at the optical switch at a precisely determined instant of time that ensures that the optical switch has already reconfigured to provide requested paths for the individual bursts. The scheduling is pipelined and performed in a manner that attempts to reduce mismatch intervals of the occupancy states of input and output ports of the optical switch. The method thus allows efficient utilization of the data network resources while ensuring virtually no data loss.

In the aforementioned method, the computation of a burst-transfer schedule takes place after the bursts are received at their source nodes and their descriptors are communicated to the master controller of the optical switch. In a network of wide geographic coverage, the bursts may have to wait for a significant period of time at their respective source nodes. Thus, large buffers would be needed at the edge nodes and the resulting delay may be excessive. Furthermore, the speed of computing the burst-transfer schedule must be sufficiently high to handle the combined rate of receiving data bursts at the optical switch from all source nodes connecting to the optical switch. This requirement reduces the scalability of the network. The method of computing the burst-transfer schedule according to the present invention improves the above method and significantly increases the scheduling capacity.

The core-node controller 240A of a core node 140 receives upstream control bursts 1020 (FIG. 10) from each source node 120A. The upstream control bursts contain bitrate-allocation requests (record 1310 of FIG. 13) from the source nodes 120A. The bitrate-allocation requests received at the core-node controller 240A from the input ports of the optical switch 220 are allocated to individual space switches 220 in a way that ensures that none of the output ports (384) $B_x$, $1 \leq x \leq N$, is overbooked, i.e., the combined bitrate allocation for each sink node reached via an output port Bx of a space switch 220 does not exceed the capacity of the downstream channel from the output port Bx to said sink node. If the sum of bitrate allocations for a given output port (384) $B_x$ exceeds its capacity, some requests must be reassigned to a different space switch 220. Bitrate-allocation requests may be modified or even rejected.

Figure 23:
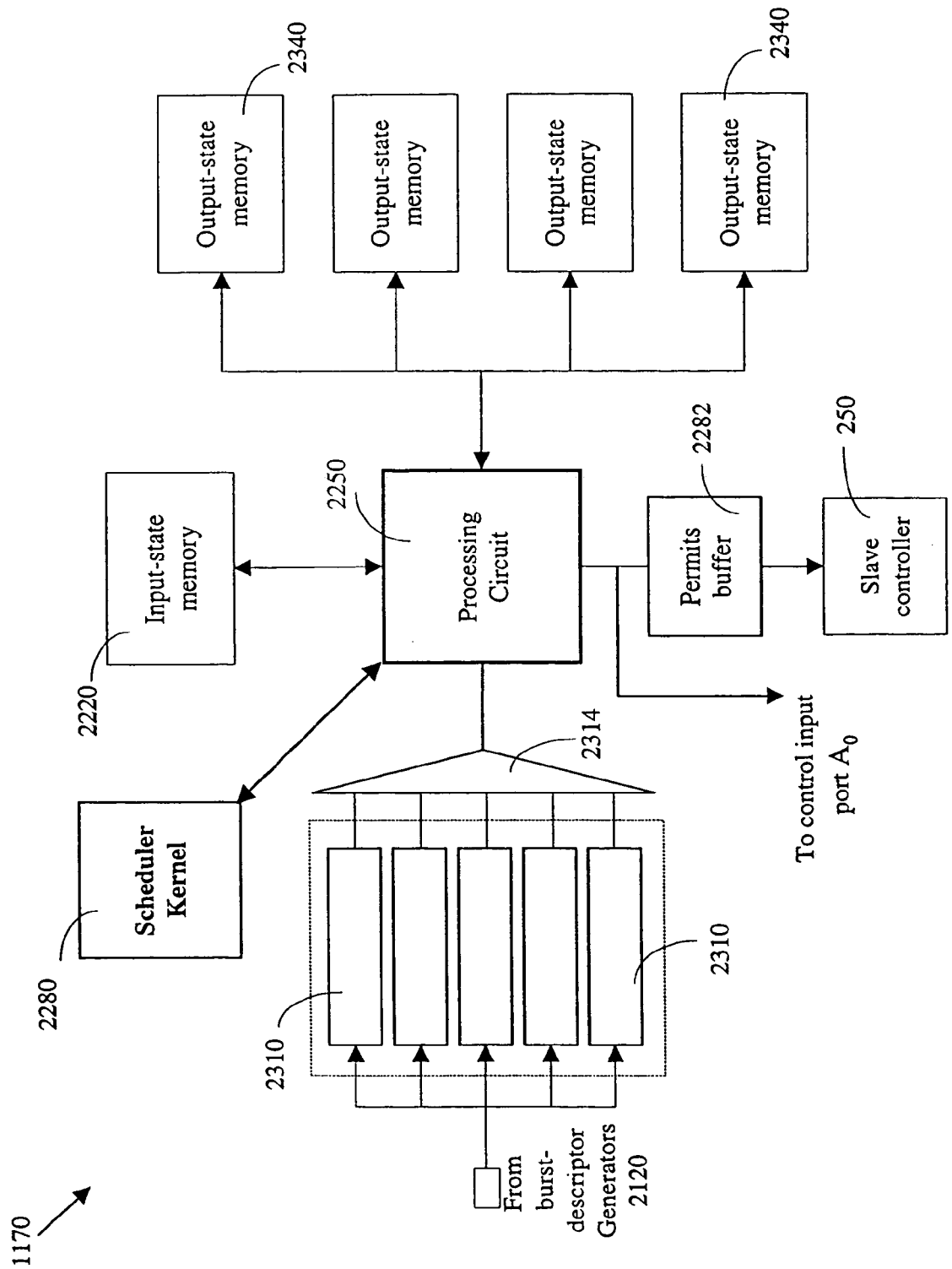
FIG. 23 illustrates an enhanced master burst scheduler where several burst-descriptor memories and several output-state memories are used to speed-up the scheduling process, according to an embodiment of the present invention.
Figure 24:
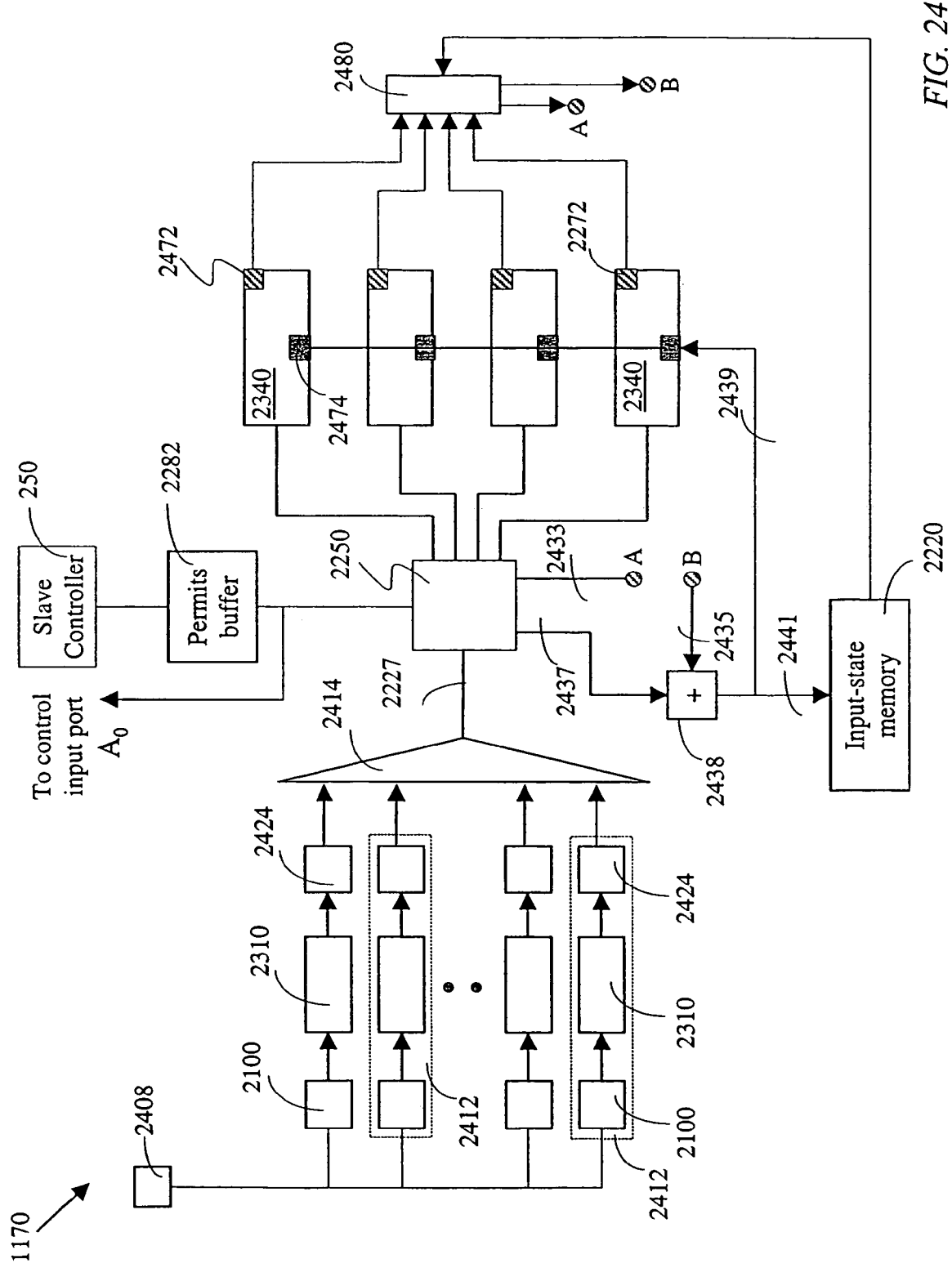
FIG. 24 illustrates further details of the enhanced master burst scheduler of FIG. 23, according to an embodiment of the present invention.

In one embodiment, descriptors of bursts already waiting at edge nodes are sent to a core-node controller 240A of a core node 140 which assigns the bursts to different space switches 220 of the core node 140 and distributes the bursts to corresponding burst-descriptor memories 2210 (FIGS. 23 and 24).

In another embodiment, the core-node controller 240A of a core node 140 assigns burst streams, each having an allocated bitrate, to individual burst controllers 240 of the space switches 220 of the core node 140, and each master controller 240 generates burst descriptors based on said bitrates. The bitrate-allocation requests are directed to corresponding burst-stream generators within the master controller 240. Each burst-stream generator generates an unconstrained schedule of tentative burst-transfer permits on the basis of the required bitrate and the corresponding burst size as described earlier with reference to FIG. 8. An unconstrained schedule applies to a sequence of burst descriptors corresponding to a single source node without coordination, for access to output ports $B_x$, with burst sequences generated by the remaining source nodes. The generated burst descriptors are then directed to respective burst-descriptor memories 2210. The function of the master burst scheduler 1170 is to modify the burst timing so that output-port contention at the optical switch 220 is avoided.

Figure 21:
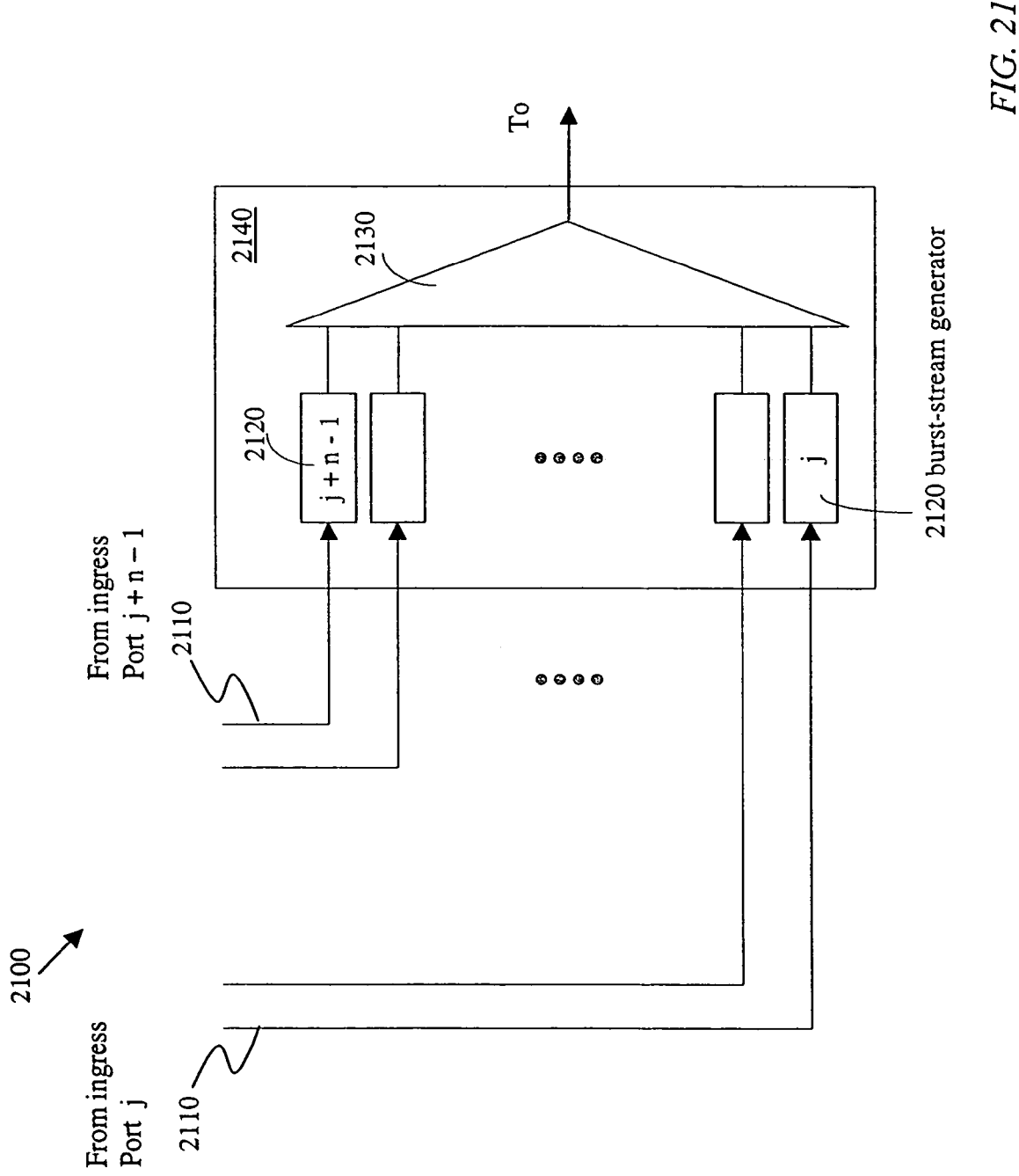
FIG. 21 illustrates a device for generating burst descriptors of bitrate-regulated burst streams associated with a plurality of source nodes for use with an embodiment of the present invention.

FIG. 21 illustrates a burst-generator-bank 2100 having multiple burst-stream generators 2120 for generating burst descriptors of bitrate-regulated burst streams associated with a plurality of source nodes. Each source node 120A connecting to a core node 140 sends the core-node controller 240A of said core node a vector of burst-stream descriptors, each burst stream being associated with a destination sink node 120B. A burst-stream descriptor includes a destination sink node, a bitrate allocation, and a class of service in fields 1322, 1324, and 1326, respectively (FIG. 13). Burst-stream generator 2120 determines a burst-descriptor for each burst in a burst-stream based on the method described above with reference to FIG. 8. In addition, burst-stream generator 2120 generates a tentative time table for switching bursts corresponding to said burst descriptors. The tentative time table is based on the bitrate allocation for the burst stream. The method of generating the tentative time table is described below with reference to FIGS. 35 and 36. The tentative time tables received from the plurality of burst-stream generators 2120 are multiplexed by multiplexer 2130 and placed in a burst-descriptor memory 2210 for use by a master burst scheduler 1170. The burst-descriptor memory 2210 may be a single memory or a bank of memories, as will be described with reference to FIGS. 22, 23, and 24.

Figure 22:
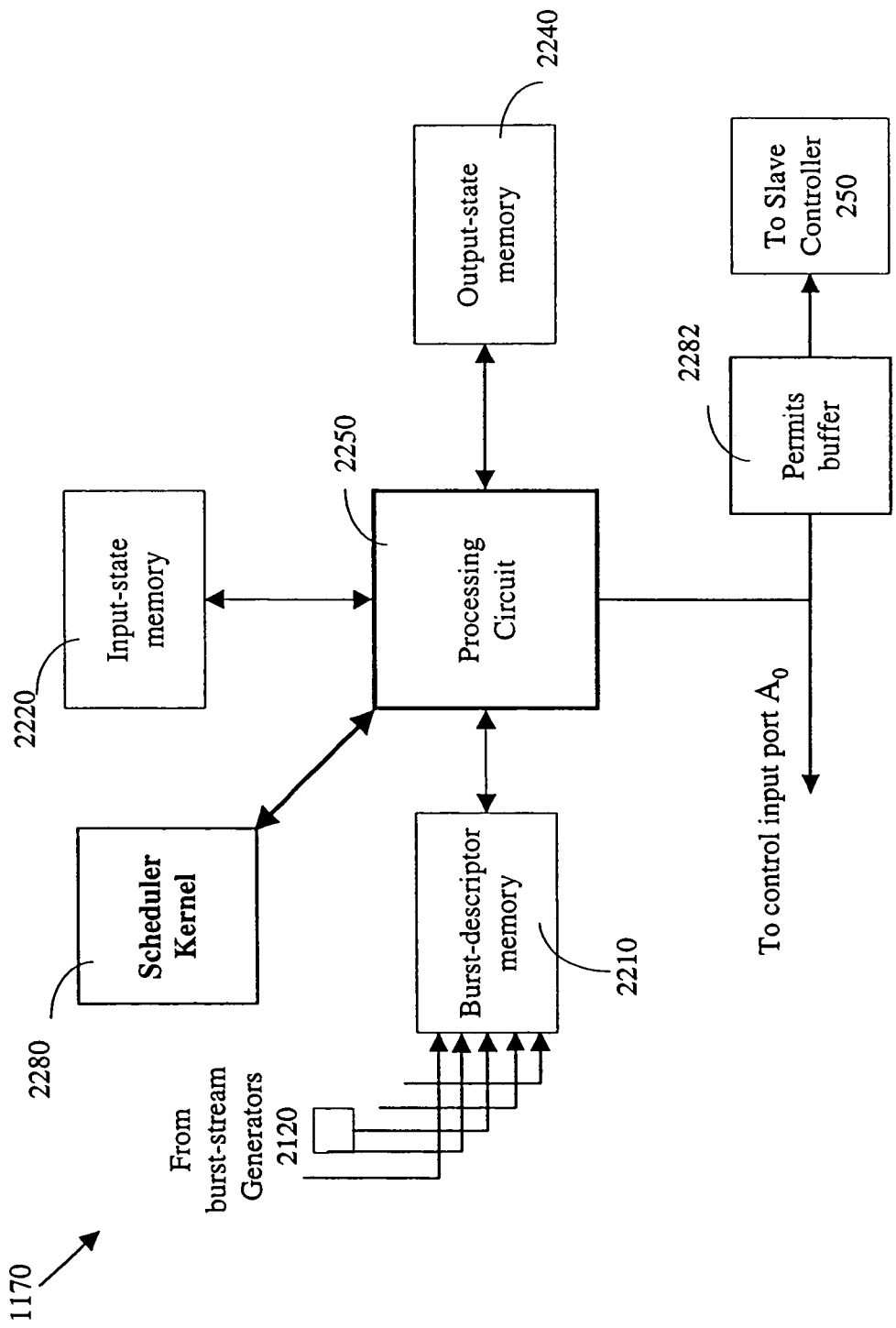
FIG. 22 illustrates a master burst scheduler, including a burst-scheduling kernel, a burst-descriptor memory, an input-state memory, an output-state memory, and a permits buffer, according to an embodiment of the present invention.

The outputs of N burst-stream generators 2120, each associated with an input port 314, are multiplexed and presented to the burst-descriptor memory 2210 of FIG. 22. The burst-stream generators for different ports 314 (hence different source nodes 120A) function independently and they need not be time coordinated.

FIG. 22 is a block diagram of an apparatus for burst-schedule generation. In general, the apparatus may be used either to schedule bursts based on burst-descriptors received from source nodes 120A or to generate burst-transfer permits based on burst descriptors generated at the master controller 240 of an optical switch 220. In the latter case, rather than forming the bursts at the source nodes 120A then scheduling their transfer to an optical switch 220, the process is reversed where burst-transfer permits are generated at a controller of an optical switch 220 and distributed to a plurality of edge nodes 120. The generation of burst-transfer permits would be based on burst stream descriptors generated by the edge nodes 120, such descriptors may include parameters such as bitrate allocations and class of service but do not include individual burst descriptors.

Burst-descriptors are generated for each burst stream where each burst stream is allocated a bitrate. The generated burst descriptors are stored in a burst-descriptor memory 2210. An input-state memory 2220 holds an input-state array having N records, each record corresponding to an input port 314 of the optical switch 220 indicates the time at which each input port will become free. Similarly, an output-state memory 2240 holds an output-state array having N records, each record corresponds to an output port 384 of the optical switch 220 and indicates the time at which each output port 384 will be free. Under control of the processing circuit 2250, a scheduling kernel 2280 determines the switching time for each burst represented by a burst-descriptor waiting in the burst-descriptor memory 2210. Each burst descriptor specifies an input port 314 and an output port 384, and the burst switching time is determined as the larger of the time at which the input port becomes free, as read from the input-state memory 2220, and the time at which the output port becomes free, as read from the output-state memory 2240.

In order to maximize the utilization of the optical switch 220, and hence the utilization of upstream optical channel 214 and downstream optical channel 224 (FIG. 2), the absolute value of the difference between the free time of the input port 314 and the free time of the corresponding output port 384 should be minimized. The scheduling kernel 2280 can reduce the absolute value of this difference by examining several burst descriptors belonging to the same input port and selecting a burst descriptor according to a prescribed criterion, such as the minimum absolute difference.

In order to implement multiple-burst-descriptor processing without slowing down the scheduling process, the burst-descriptor memory 2210 is implemented as several independent memories 2310, as illustrated in FIG. 23, each of which storing burst descriptors related to a subset of input ports 314 of the optical switch 220. FIG. 23 illustrates the use of five burst-descriptor memories 2310, each holding burst-descriptors associated with a subset of input ports 314, corresponding to a subset of source nodes 120A. Each of the burst-descriptor memories 2310 of FIG. 23 has an associated register (not illustrated) that can hold several burst descriptors, four for example. The five registers are visited cyclically. Thus, the use of separate memories 2310 allows the scheduling kernel 2280 to select several burst descriptors from each memory and place them in a register so that they can be read in parallel when a register is sampled by processing circuit 2250. The output-state memory 2240 may also be implemented in several memories 2340, as indicated in FIG. 23, all having identical data. This allows simultaneous computation of the absolute free-time differences as described above. When a burst-descriptor is selected, and its switching time determined, a burst-transfer permit is generated and placed in a permits buffer 2282. The burst descriptor is dequeued from the respective burst-descriptor memory 2310 and the switching time is entered in a corresponding record in input-state memory 2220 and in a corresponding record in each of the output-state memories 2340. The output-state memories 2340 generally have different read addresses but the same write address.

An input-state memory 2220 holds an input-state array 2520 (FIG. 25) having N records, N being the number of input ports 314, and each record contains an indication of the instant of time at which an input port 314 of a optical switch 220 would be available to transmit a burst to an output port 384 of the optical switch 220. An output-state memory 2340 holds an output-state array 2540 (FIG. 25) having N records, each record indicating the instant of time at which the output port of the optical switch 220 would be available to start receiving a burst from one of the input ports 314. In order to reduce the time required to schedule a burst, several output-state memories 2340 may be used for parallel reading as described above with reference to FIG. 23. The parallel output-state memories 2340 are identical, each containing the same timing data.

The burst-transfer permits placed in the permits buffer 2282 are communicated to respective edge nodes 120 via control port $A_0$, the optical switch 220, and output ports $B_1$ to $B_N$ (FIG. 3). The edge nodes 120 receive burst-transfer permits from the master controllers 240 of several optical switches 220 belonging to several core nodes 140, form data bursts according to the permits they receive, and transmit the formulated data bursts to selected optical switches 220 of a selected core node 140 according to the timing indicated in the permits. The scheduling kernel 2280 generates a connection timetable corresponding to the permits and, after a calculated period of time, submits the timetable to the slave controller 250 (FIG. 2) which establishes a connection from an input port 314 to an output port 384 of a space switch 220 for each data burst precisely at the time of arrival of the data burst. The applied delay (the calculated period of time) at the slave controller 250 must exceed the round-trip delay between the core node and the edge node.

Figure 25:
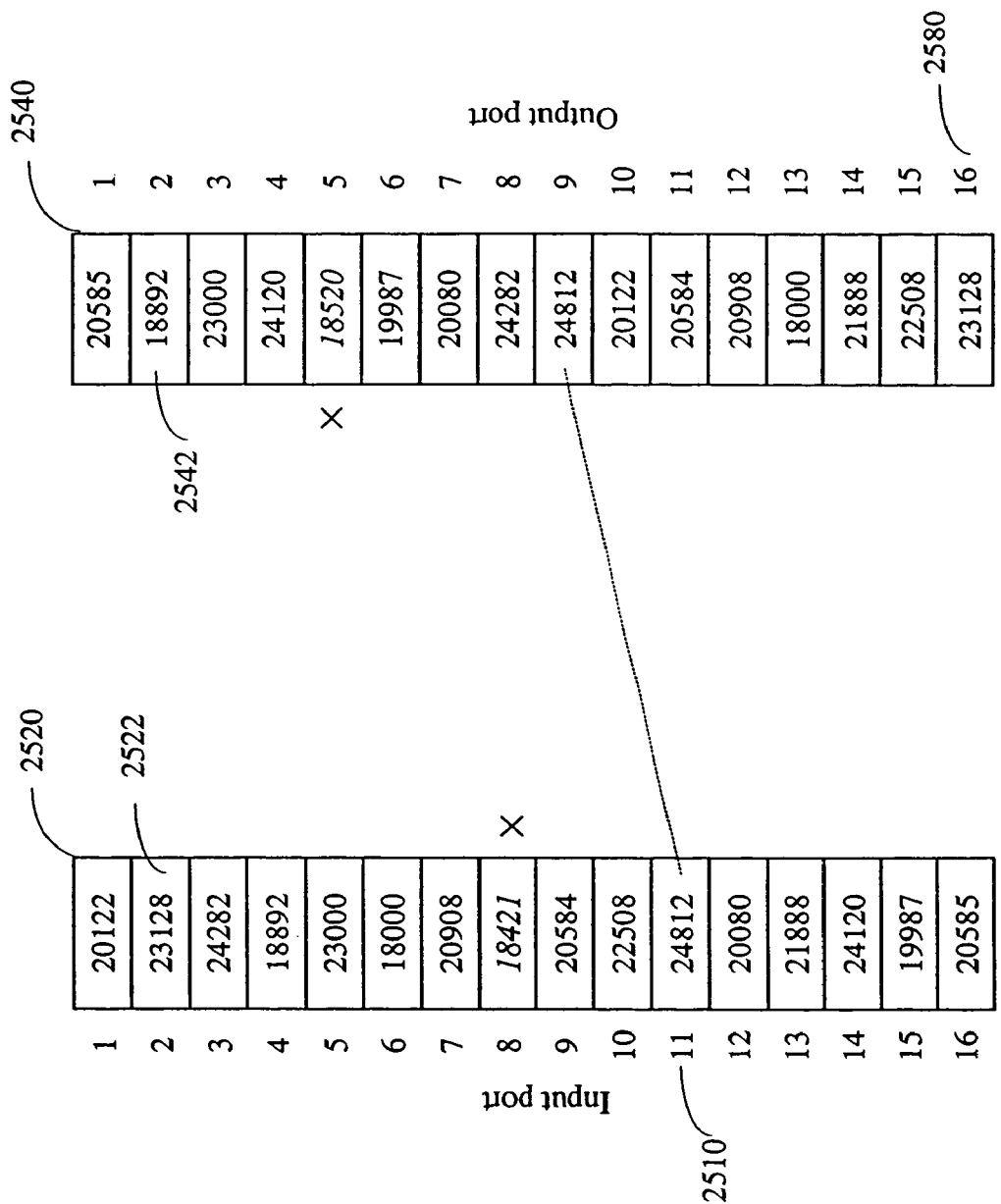
FIG. 25 illustrates input-state and output-state arrays for use with an embodiment of the present invention.

The bursts generated by a burst-stream generator 2120 are grouped into burst sets, where each burst set occupies a schedule period 1230 (FIG. 12). The burst scheduling Kernel 2280 performs the main scheduling task where the bursts of the generated burst-sets are scheduled for switching from their input ports 314 to the designated output ports 384. Contention avoidance is realized with the help of the input-state array 2520 and output-state array 2540 (FIG. 25). The function of the burst-scheduling Kernel 2280 will be described with reference to FIG. 24.

FIG. 24 illustrates a slightly different implementation of the scheduling apparatus of FIG. 23. Each input port 314 operating in burst mode directs upstream control bursts 1020 to master controller 240 through output port $B_0$. After optical to electrical (O/E) conversion, the control data are received in an electrical form at interface 2408. The burst-scheduling device includes a bank of independent burst-descriptor generators 2412. Each burst-descriptor generator 2412 includes a burst-generator bank 2100, each of which is associated with a burst-descriptors memory 2310. A register 2424 that can hold a predefined number, Q, of burst descriptors is associated with each memory 2310. Each of the burst-generator banks 2100 is associated with a number of input ports of the optical switch 220. A burst—generator bank 2100 receives bitrate allocations related to a plurality of source nodes 120A and generates a sequence of burst-descriptors as described earlier with reference to FIG. 21. The bitrate allocations are distributed by the core-node controller 240A to all other master controllers 240 of the same core node 140. Recall that a core-node controller 240A is one of the master controllers 240 selected to perform the added function of distributing the burst scheduling task among the master controllers 240 of a core node 140. As described above, the burst-descriptors may be determined by the source nodes 120A and placed directly in respective burst-descriptor memories 2210/2310.

The Q burst descriptors are read sequentially from a burst-descriptor memory 2310 and placed in a register 2424 that can hold the Q descriptors for further parallel processing. This process takes place concurrently in all burst-descriptor generators 2412. In an optical switch 220 that has a small number, N, of input ports, 32 for example, only one burst-descriptor generator 2412 would be required. With a large number, N, of input ports, 256 for example, the use of parallel burst-descriptor generators, each handling a subset of the N input ports allows concurrent placement of burst descriptors in registers 2424. Burst scheduling is performed by circuit 2250.

A comparator 2480 receives the time at which an input port 314 is free, as read from the input-state memory 2220, and the times at which candidate output ports 384 are free, as read from the parallel output-state memories 2340. The comparator 2480 then selects one of the output ports 384 of the optical switch 220 and returns an identifier of the selected port, as well as the transfer time of the corresponding burst, to processing circuit 2250 and adder 2438, as indicated by the symbols 'A' and 'B' in FIG. 24, corresponding to reference numerals 2433 and 2435, respectively. It is possible that two or more of the candidate bursts be destined for the same output port.

The upstream control bursts 1020 include, amongst other information, requests for modifying bitrate allocations from each edge node 120 connecting to a port operating in the burst mode. As mentioned above, there is a burst-stream generator 2120 associated with each input port 314 that operates in the burst mode. The bitrate-allocations received at interface 2408 are directed to respective burst-stream generators 2120 within burst-generator bank 2100. Each burst-stream generator 2120 independently generates descriptors of bursts destined to output ports of the optical switch and forms queues of the burst descriptors in an associated memory 2310. Q>1 of burst descriptors are dequeued from the head of each queue in a memory 2310 and placed in a register bank 2424, and the Q burst descriptors can be read in parallel from each register bank 2424. A preferred value of Q is 4. A large value of Q improves utilization at the expense of circuit complexity. A cyclic selector 2414 visits each register-bank 2424 during a specified interval of time and directs the Q burst descriptors to processing circuit 2250 which determines the read address in an output-state memory 2340 for each of the Q burst-descriptors. The instant of time at which each of Q output ports identified in the Q burst descriptors is free to receive data is read from a respective memory 2340 and compared in the comparator circuit 2480.

Comparator circuit 2480 selects the output port for which the absolute value of the difference between the input-port availability time T1 and the output-port availability time T2 is the lowest. This selection increases the scheduler efficiency. For example, if T1=12000, and four output ports corresponding to four burst descriptors read from a register 2424 have availability times of 11200, 12700, 12284, and 10020, then the deviations from the input availability times are −800, 700, 284, and −1980. The minimum absolute deviation is 284 (not −1980) and the corresponding output port is selected. Thus the burst would be scheduled for transfer at time 12284 (the larger of 12284 and 12000). If, in the above example, the time T1=11500, then the deviations are −300, 1200, 784, and −1480, and the minimum absolute deviation is −300. Thus, the burst would be scheduled for transfer at time 11500 (the larger of 11500 and 11200).

When one of the candidate burst descriptors is selected, the time at which both the input port and output port specified in the selected burst descriptor will be available next is computed and is used to overwrite corresponding current values in the input-state memory 2220 and the parallel output-state memories 2340. This calculation is done as follows. The comparator circuit 2480 determines the candidate output port corresponding to the minimum absolute deviation and the burst transfer time as described above. Comparator circuit 2480 then reports the selected output to processing circuit 2250 and the corresponding burst transfer time to adder 2438. Processing circuit 2250 has the burst duration for each of the Q candidate burst descriptors and it inputs the duration of the selected burst to adder 2438. The output of adder 2438 is the nearest availability time of both the input port and output port for the selected burst. This is used to update corresponding entries in input-state memory 2220 and output-state memory 2340 of FIG. 24. The descriptor of the selected burst is then removed from the corresponding burst-descriptor memory 2310.

FIG. 25 illustrates the input-state and the output-state arrays 2520 and 2540, respectively, at some intermediate instant in the schedule period. As mentioned earlier, input-state array 2520 is stored in input-state memory 2220 (FIGS. 23, and 24) and output-state array 2540 is stored in each output-state memory 2340 (FIGS. 23, and 24). When a burst is scheduled, its termination time is shown at respective entries in the input-state array 2520 and the output-state array 2540, as illustrated in FIG. 25. Upon burst termination, the corresponding entries in the input-state array 2520 and output-state array 2540 are available for other bursts, generally with different connections. Thus, it is possible that an entry in the input-state array 2520 does not appear simultaneously in the output-state array 2540.

In overview, methods of scheduling the transfer of data bursts among edge nodes, having buffering facilities, through bufferless core nodes are devised to reduce processing effort and increase overall network efficiency. At each core node, each of several burst-schedulers determines, using parallel comparisons, the proximity of available times of selected input ports and selected output ports indicated in a set of candidate burst descriptors and schedules a data burst according to said proximity. In a preferred mode of operation of a burst-switched network, rather than sending requests to schedule data bursts after they are received at a respective source node, each source node determines the bitrate requirements for paths to each sink node and sends bitrate-allocation requests to a selected core-node controller which computes burst-transfer permits and sends the permits to corresponding edge nodes. This reduces the scheduling delay while avoiding data loss at the core node.

Routing

As described earlier, a burst stream is defined by its source node, sink node, and a path from the source node to the sink node. In the network of FIG. 1, there are several paths from each source node to each sink node through different core nodes 140, and there are several paths within each core node 140, each path being defined by an input port 314 and an output port 384 of a space switch 220. The capacity of a single path equals a channel capacity, typically 10 Gigabits/second (Gb/s).

The data to be transferred from a source node to a sink node may have to be allocated to several paths if the required capacity exceeds the capacity of a single path. Even when the required capacity is less than the capacity of a single paths, the data from a source node to a sink node may still be transported through several paths due to contention.

Reducing the number of paths used by each node pair (source node to sink node) results in increasing the mean burst size and, hence, reducing the mean burst rate. The transport capacity of a burst switch, i.e., the total bitrate received at input and released at output, is curtailed by the processing capacity of its burst scheduler. A given burst scheduler can schedule a given number of bursts per second that is virtually independent of the burst sizes. Thus, increasing the mean burst size, as described above, increases the transport capacity of a burst scheduler. To illustrate, consider a core node 140 having 8 space switches 220, each having N input ports 314, connecting to N upstream channels, and N output ports 384 connecting to N downstream channels, with a payload capacity, excluding control overhead, of R=9.8 Gb/s for each input or output port. The total transport capacity of the node is then 8×N×R. In this example, the core node 140 transfers node-pair data of equal bitrate allocations of 200 Mb/s each. With a burst-formation period $D_0$ of 1 millisecond (as described with reference to FIG. 8), the burst length is 200 kilobits and the burst rate per upstream channel is 49 kilo-bursts per second, which is the rate R=9.8 Gb/s divided by the burst length of 200 kilobits. The total burst rate per space switch is then 49×N kilo-bursts per second. If each bitrate allocation of 200 Mb/s is transferred evenly over the 8 space switches of the core node, the mean burst size would drop to 25 kilobits and the burst rate per space switch increases to 392×N kilo-bursts per second. If the burst scheduler in the master controller 240 of each space switch 220 can only schedule 10,000,000 bursts per second, then the number N of input ports (of output ports) would be about 200 in the first case and 25 in the second case. It is preferable, therefore, that the core-node controller 240A attempt to assign the data of each node pair (source node to sink node) to the smallest number of space switches 220 within the core node 140.

As described above, a core node 140 has a plurality of parallel space switches (optical switches) 220, each having N input ports and N output ports, and connects at most N upstream multi-channel (multi-wavelength) upstream links to at most N multi-channel (multi-wavelength) downstream links. In order to confine connections from each upstream link to each downstream link to a small number of space switches, the core-node controller 240A sorts the bitrate requirements associated with each upstream link in a descending order according to bitrate value then implements a cyclic allocation of said requirements to corresponding paths of the space switches in a manner that attempts to equalize the burst rate per space switch. In a case where the remaining unassigned capacity in a path is insufficient to accommodate a bitrate requirement, a part of the requirement may be assigned and the remainder of unassigned bitrate is retained for a subsequent path. The process may be applied iteratively, with the bitrate allocations per iteration used as a progress indicator, until all bitrate-allocation requirements are met or further progress can not be made.

The scalability of the core node 140 is determined, in part, by the speed of the burst scheduling function. The scheduling method described above requires that all registers 2424 be visited during a period not exceeding the mean burst duration. In each visit to a burst-descriptor memory 2210/2310, a single burst is scheduled. Thus, in a optical switch of 256×256 capacity, with all ports operating in a burst-switching mode, and with a mean burst duration of 8 microseconds for example, a burst must be scheduled within 8/256 microseconds, i.e., about 30 nanoseconds. Note that a single scheduler in each master controller 240 of an optical switch 220 handles bursts from all the 256 input ports of the optical switch 220. In order to allow more computation time per burst, the time allocated for computing a burst-transfer schedule can be extended to be an integer multiple m of the designated schedule period. In the above example, if the designated period is 16 milliseconds, and the value of m is chosen to be 8, then about 240 nanoseconds would be available to schedule a burst. Thus, the time of computing a schedule exceeds the real-time period covered by the schedule by a factor of m. The schedule computation period is then 128 milliseconds with m=8, and bitrate updates would be processed every 128 milliseconds, i.e., the reconfiguration period 1220 is 128 milliseconds.

Figure 26:
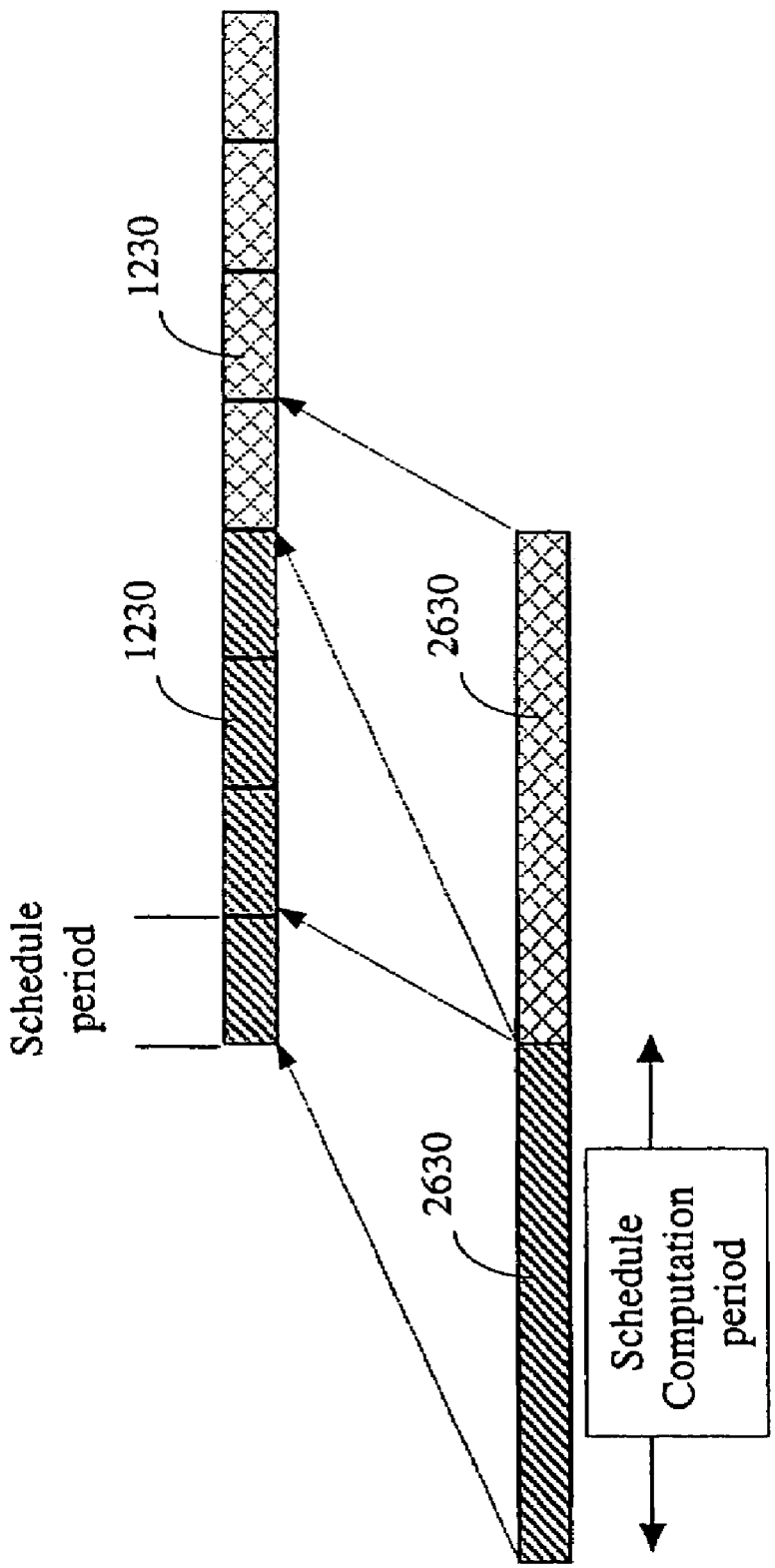
FIG. 26 illustrates a method for scaling a burst scheduler, in accordance with an embodiment of the present invention.

In accordance with the present invention, two methods can be used to increase the scheduler capacity. In the first method, a schedule is computed, for a succession of bursts generated over a schedule period T, every m schedule periods, where the value of the integer m exceeds the ratio of the time required to compute said schedule and said designated schedule period T. As described earlier, the succession of bursts may be generated according to bitrate allocations for each burst stream to be switched from a burst-mode input port 314 to an output port 384. The bitrate allocations are then refreshed periodically every m×T interval. FIG. 26 illustrates the generation of a schedule for switching data bursts, over a designated schedule period T, from a burst-mode input port to an output ports. The schedule for switching data bursts is used repetitively during m consecutive period, m being an integer greater than zero and each of said consecutive periods is equal to said designated schedule period T. FIG. 26 illustrates the correspondence of a schedule periods 1230 and corresponding computation period 2630. Referring to FIGS. 12 and 26, the reconfiguration period 1220 is at least equal to the schedule-computation period 2630.

Figure 27:
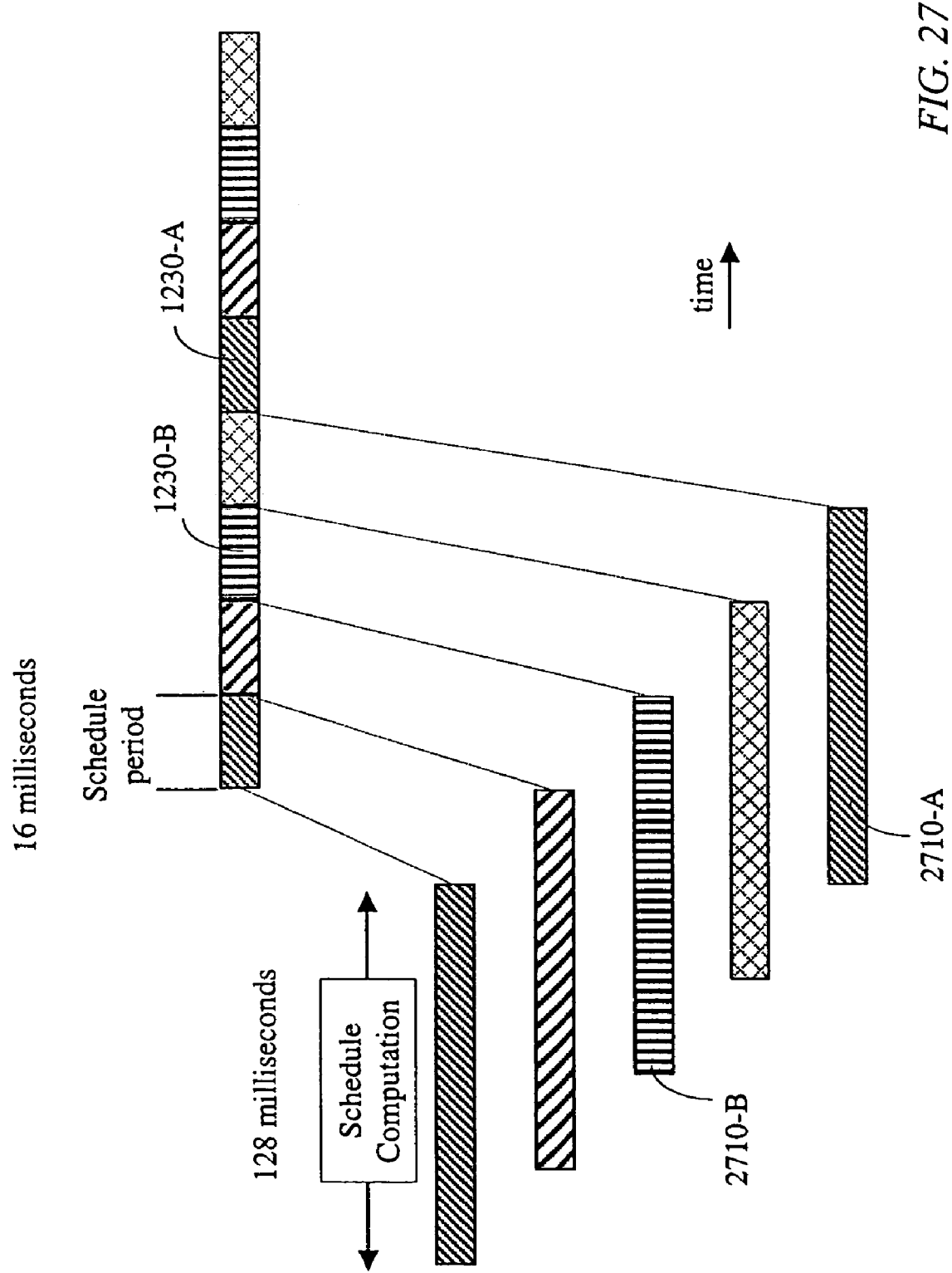
FIG. 27 illustrates an alternative method for scaling a burst scheduler, in accordance with an embodiment of the present invention.

In the second method, illustrated in FIG. 27, the computation period for each of said successive time intervals is an integer multiple m of the interval T and m successive schedules are computed concurrently using at least m scheduling devices 1170 (FIG. 11 and FIGS. 22 to 24). The value of m exceeds the time required to compute said schedule for each time interval T divided by the designated time interval T. The schedule may be computed for burst descriptors generated according to bitrate allocations for each pair of burst-mode input port 314 and output port 384, and the bitrate allocations are refreshed every interval T. As illustrated in FIG. 27, the time separation of successive schedule periods equals T. FIG. 27 illustrates schedule periods 1230-A, 1230-B, etc., and corresponding computation periods 2710-A, 2710-B, etc. Referring to FIGS. 12 and 27, the reconfiguration period 1220 is at least equal to any of the computation periods 2710-A, 2700-B, etc., which correspond to schedule period 1230-A, 1230-B, etc.

If m=1, the two methods become equivalent and input-state arrays 2520 and output-state arrays 2540 should not then be zero-initialized since scheduling takes place continually in the time domain. For m>1, in both the first method and second method above, each input-state array 2520 and each output-state array 2540 must be zero-initialized because of the discontinuity of the scheduling process. This discontinuity requires that the termination time of each burst be confined within the schedule period.

Figure 28:
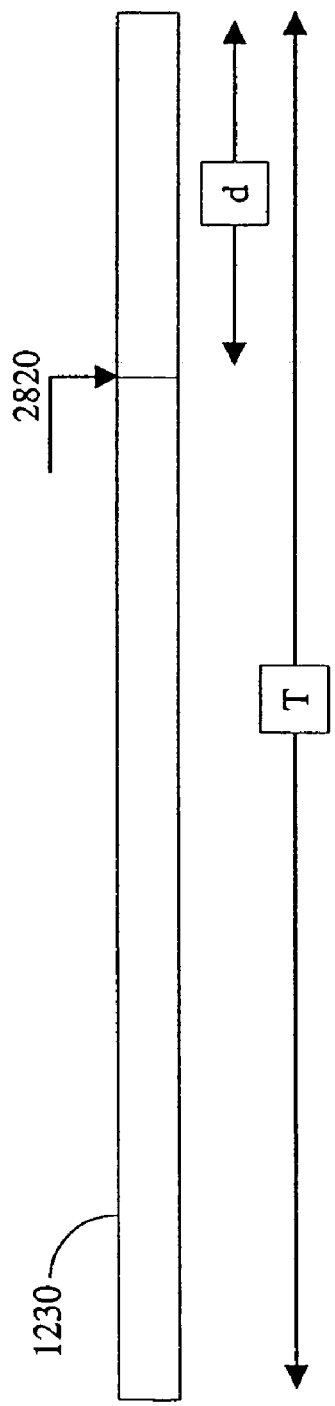
FIG. 28 illustrates front-end burst scheduling (FIG. 28a) and trailing-end burst scheduling (FIG. 28b) in a time-slotted frame for use with an embodiment of the present invention.

To enable repetitive use of the same schedule over successive designated schedule periods, according to one embodiment, front-end burst scheduling is used where no bursts are scheduled for switching during the interval between T-d and T, where T is the length of designated schedule period 1230 (FIG. 12 and FIG. 26 and FIG. 27), and d is the maximum packet duration (32 microseconds for example). The value of T is 16 milliseconds in the above example. A burst that is switched at time (T-d) or earlier, would then be completely transferred from an input port 314 to an output port 384 of the optical switch 220 before the end of the designated schedule period. The possible waste due to a partially used interval between (T-d) and T would typically be insignificant. In the above example, the relative waste is less that 32/16000, i.e., less than 0.002. According to another embodiment, trailing-end burst scheduling is used where the comparator 2480 computes the termination time of a burst and ensures that it is within the designated schedule period. Thus, a burst may be scheduled after the instant (T-d) if its duration is less than d. FIG. 28 illustrates front-end burst scheduling (FIG. 28a) and trailing-end burst scheduling (FIG. 28b) over a scheduling period T, as described above. FIG. 28a illustrates the instant of time 2820, relative to the start of a schedule period 1230 (FIG. 12) beyond which no bursts are scheduled. FIG. 28b illustrates trailing-edge scheduling where a burst can be scheduled anywhere within the schedule period 1230 as long as its termination time does not exceed the end 2830 of the schedule period 1230.

It is noted that, if the number of ports 314/384 per space switch 220 is sufficiently small, and/or if the capacity per port 314/384 is low, the core-node controller 240A of a core node 140 may divide the task of scheduling the space switches 220 of the core node among a subset of the master controllers. As described earlier, the master controllers 240 in a core node 140 are interconnected and, hence, can exchange computed schedules.

Adaptive Burst Formation

In Applicant's U.S. patent application Ser. No. 09/735,471 filed on Dec. 14, 2000 and titled "Compact Segmentation of variable-size-packets streams," a method is described for segmenting a data stream comprising variable-size packets, a data stream being defined by its source node, sink node, assigned network route, and other attributes. The segments are of equal size and the method concatenates the packets in successive segments in a manner that attempts to minimize segmentation waste without undue buffering delay. The method facilitates the construction of efficient networks while respecting service-quality specifications. Herein, the method is adapted to enable efficient formation of variable-size data bursts at an edge node 120.

Figure 29:
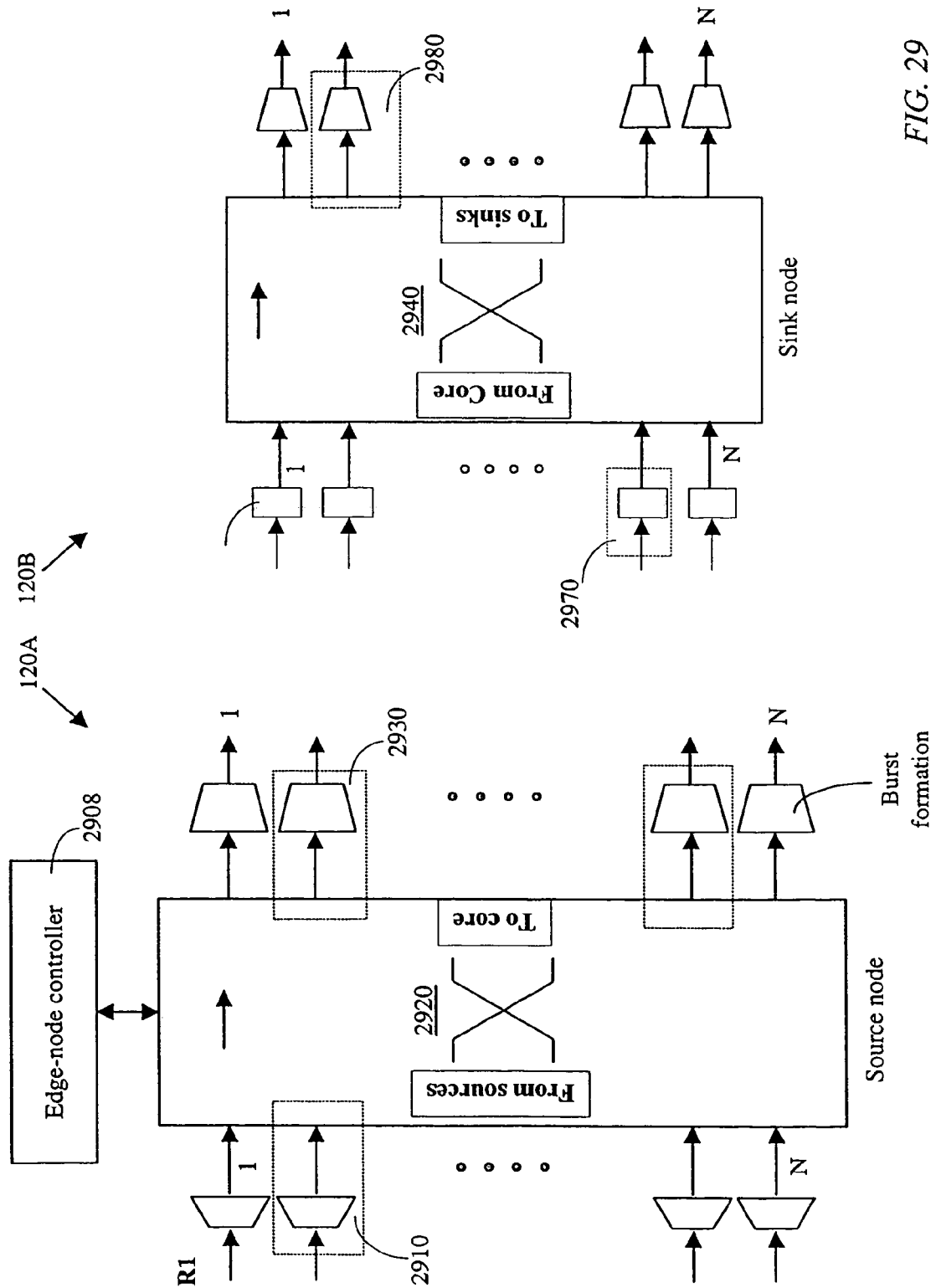
FIG. 29 illustrates a source node and a sink node for use with an embodiment of the present invention.

FIG. 29 illustrates a source node 120A and a sink node 120B of an edge node 120. Traffic sources (not illustrated) send data packets of arbitrary sizes, within the restrictions of respective protocols, such as IP4 or IP6, to the ingress ports 2910 of the source node. The data packets may be switched through a switching fabric 2920 of the source node to output ports 2930 interfacing with the network core nodes 140. An incoming data packet may be transferred to an output port 2930 across the switching fabric 2920 of the source node in the same format in which the packet is received at an ingress port. Alternatively, the data packet may be segmented into data blocks of equal size to simplify the design of the switching fabric 2920. This process may result in partially-filled data segments. A partially-filled data segment is also called an incomplete segment. The data packets received at an output port 2930 are sorted into output queues according to destination sink node 120B. The output queues (not illustrated), each corresponding to a destination sink node 120B, preferably share a common memory within port 2930. Regardless of the method of internal packet switching within the source node 120A, the data packets in an output queue are aggregated into data bursts, as will be detailed below with reference to FIG. 31 and FIG. 32. Typically, a data burst would include a large number of individual data packets.

Each output queue, an output queue of a source node 120A being associated with a single destination, a destination being a sink node 120B in any edge node 120, is allocated a bitrate at which the queue is served. The allocated bitrate for each queue is determined by an admission controller. The bitrate allocations for the output queues of a given output port 2930 may vary significantly. For example, one queue may be allocated a bitrate of 10 Mb/s (Megabits per second) while another queue in the same output port is allocated 5 Gb/s (Gigabits per second). Burst formation takes place at each output port 2930 of the source node 120A. The selection of a burst size has a significant effect on the burst-transfer processing effort and the efficiency of links connecting the edge nodes to the core nodes. At a given bitrate allocation, large bursts result in a reduced burst-generation rate, hence less relative header overhead and higher transport efficiency. A low burst rate reduces the processing effort at the controllers of the output ports 2930 of the source node 120A and, most importantly, at the core-node master controllers 240 as described with reference to FIG. 24.

A sink node 120B receives data bursts at input ports 2970 and switches them in segmented format through switching fabric 2940 to egress ports 2980.

Data bursts are switched to the input ports 2970 of sink nodes 120B through the optical core nodes 140. The bursts received at the input ports 2970 of each sink node may be of substantially different sizes. At each input port 2970 of a sink node, each received burst must be parsed into its constituent individual packets and the individual packets are switched to egress ports 2980, through the internal fabric 2940 of the sink node, to be delivered to their intended data sinks.

Figure 30:
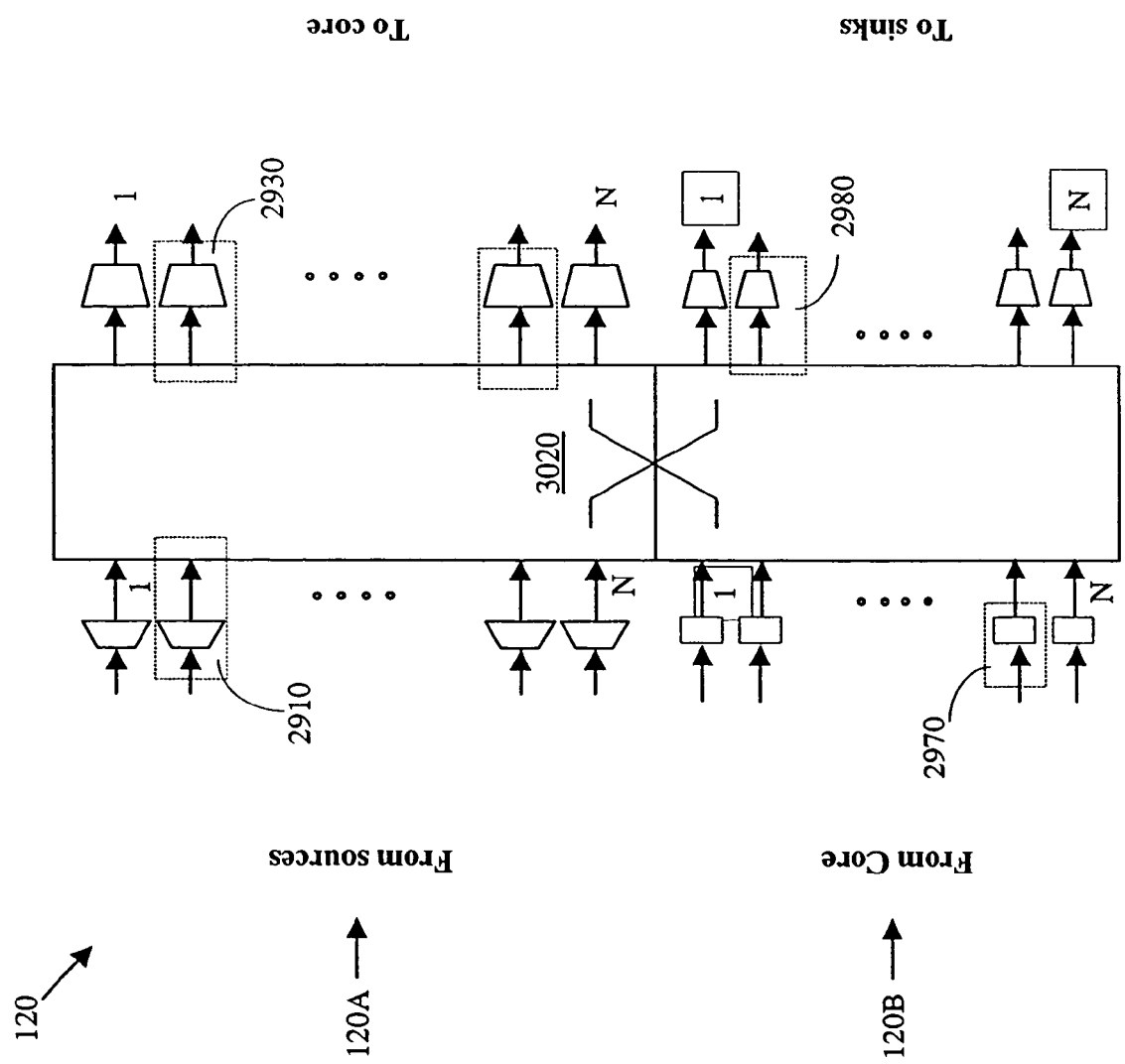
FIG. 30 illustrates an edge node comprising a source node and a sink node that share a common switching fabric for use with an embodiment of the present invention.

As illustrated in FIG. 30, each source node 120A may be paired with a sink node 120B, with which it shares a switching fabric 3020 and a controller (not illustrated), to form an edge node 120. The integration of a source node with a sink node facilitates intra-edge-node switching and closed-loop control and management communications with the network core. Closed-loop paths are needed to exchange certain control data between an edge node 120 and a core node 140.

As described earlier, each output port 2930 has a time counter to enable time locking the output port to a core node. An output port 2930 may have a bank of time counters, one associated with each core node 140.

Figure 31:
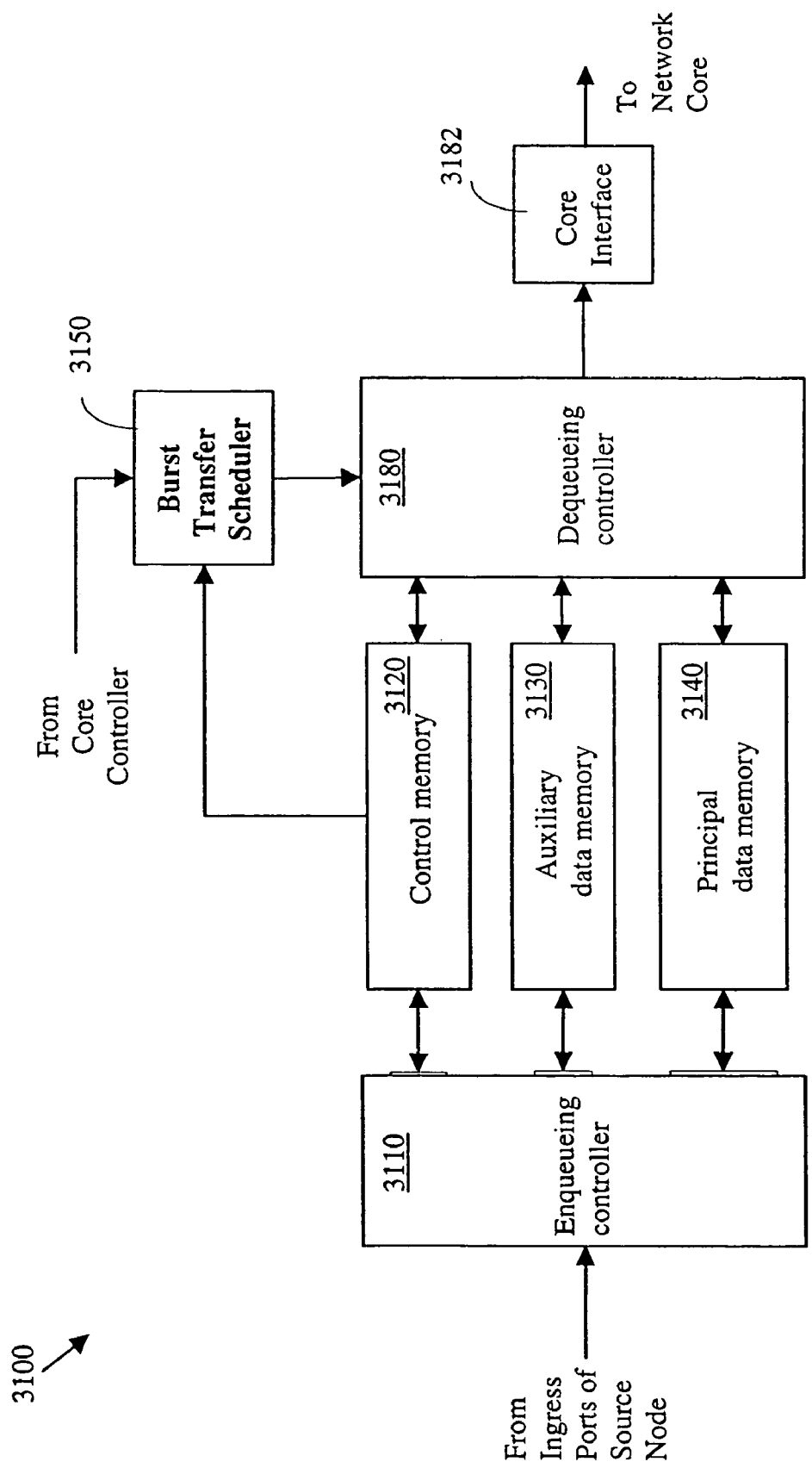
FIG. 31 illustrates an apparatus for burst formation, including an enqueueing controller, a dequeueing controller, memory devices, and a burst-transfer scheduler for use with an embodiment of the present invention.

FIG. 31 illustrates a device 3100 for packets aggregation into bursts. The device includes an enqueueing controller 3110, a dequeueing controller 3180, a burst-transfer scheduler 3150, a control memory 3120, an auxiliary data memory 3130, and a principal data memory 3140. One device 3100 is provided at each output port of a source node 120A.

To facilitate switching within the source-node fabric 2920 (or common fabric 3020), packets received at the ingress ports 2910 are segmented in a conventional manner and the segments are switched through the switching fabric 2920 (or 3020) of the electronic source node 120A. The data received at each ingress port 2910 is formatted into equal-size data segments of a predetermined size G; G=128 bytes for example. A data segment may be complete or null-padded. However, the null padding is removed in the process of burst formation at the output ports 2930 as will be described below.

Figure 32:
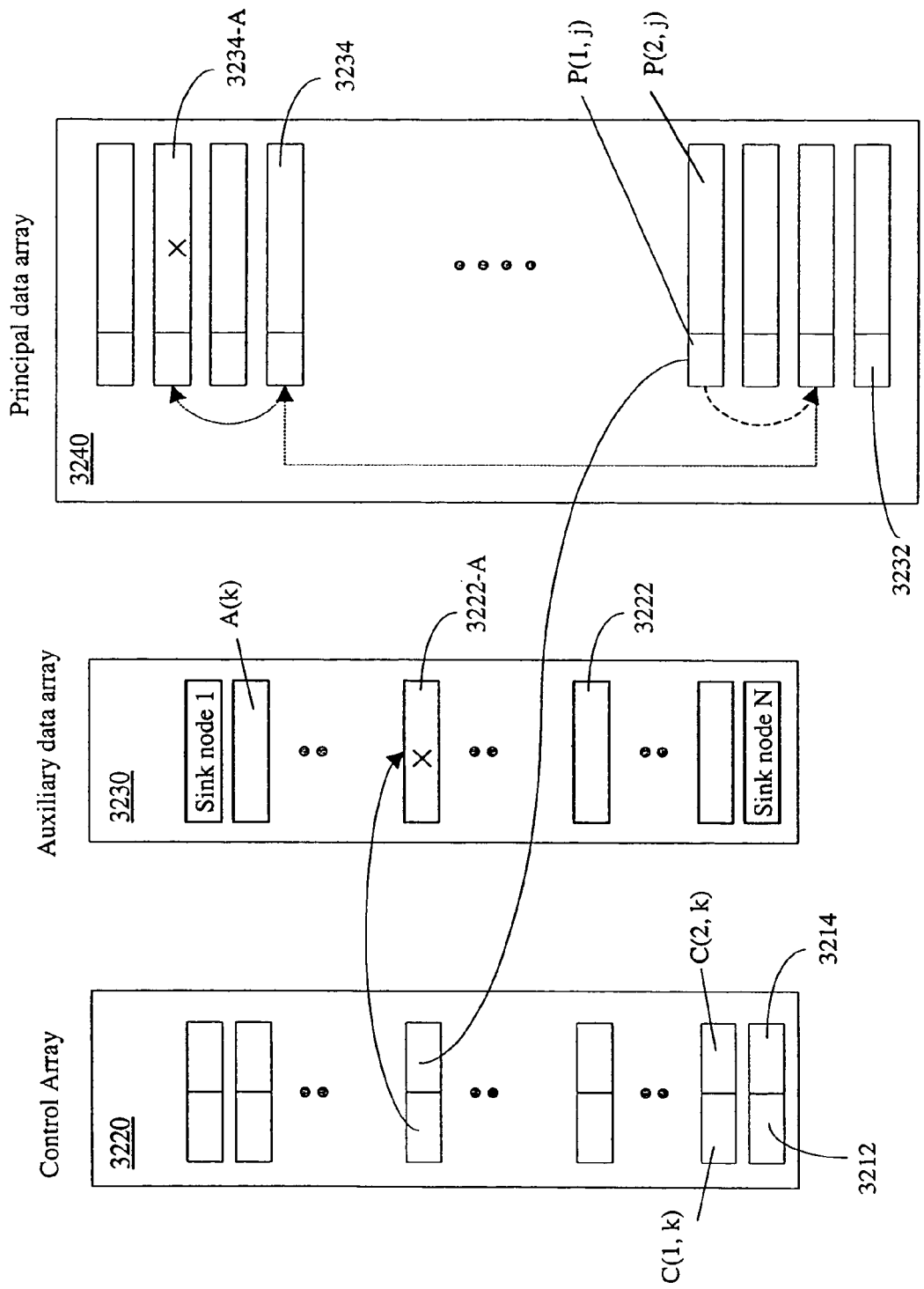
FIG. 32 illustrates the organization of the memory devices of FIG. 31.

FIG. 32 illustrates the organization of the control memory 3120, the auxiliary data memory 3130, and the principal data memory 3140 of FIG. 31. Array 3230, stored in auxiliary data memory 3130, has N records, N being the number of sink nodes, each record storing an incomplete segment destined to sink node j, $0 \leq j < N$. Array 3240, stored in the principal data memory 3140, has a sufficient number of records to store all data ready for transferring to the plurality of sink nodes. Each record has two fields. A first field, P(1, j) contains an identifier of the record in which a new data segment destined to sink node j, $0 \leq j < N$, is to be written. The second field P(2, j) contains a complete data segment.

There are N records in array 3220 stored in control memory 3120, each record having two fields 3212 and 3214. The first field 3212, contains a value C(1, k) indicating the number A(k) of data bytes in an incomplete segment waiting in record k of the auxiliary array 3230, the record corresponding to destination sink node k. The second field 3214, contains a pointer C(2, k) to a record in the principal array 3240 in which the first segment of a burst to be transferred to destination sink node k is stored. It is noted that there can be only one incomplete segment waiting in memory 3130 for a given destination sink node 120B. Therefore, the number of records in array 3230 need not exceed N, N being the number of destination sink nodes as described earlier.

A complete data segment is directed to the principal data memory 3140, to be placed in array 3240, if the corresponding record in auxiliary array 3230 is vacant. Otherwise, the complete data segment is merged with the incomplete segment stored in a corresponding record in auxiliary array 3230. This process may result in adding a complete segment, if any, in the principal memory and storing the remainder, if any, in a corresponding entry in the auxiliary memory. An incomplete new segment is always merged with the content of the auxiliary memory, and the merged data is divided into a complete segment, if the size of merged data exceeds a segment size, to be directed to the principal data memory 3140, and an incomplete segment, of u bytes, to be stored in the auxiliary memory if u>0. To simplify the design, the burst sizes (burst lengths) are restricted to be integer multiples of a basic unit, which may be selected to be a data segment. A burst may occupy several records in the principal data memory 3140.

Figure 33:
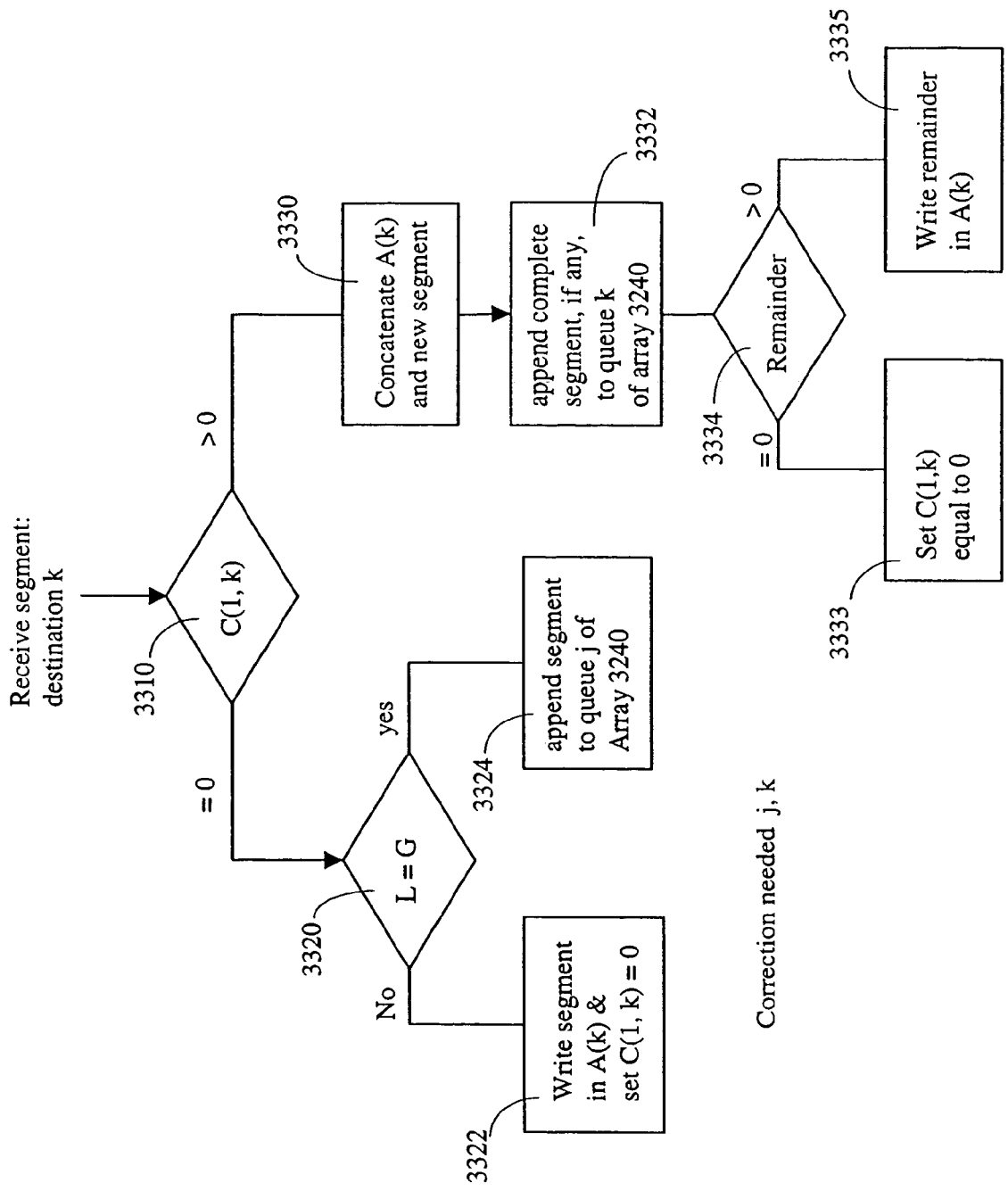
FIG. 33 is a flow chart describing the functional steps of packet concatenation at an output port of a source node to form data bursts for use with an embodiment of the present invention.

FIG. 33 illustrates the process of storing a new packet received at an ingress port 2910 of a source node 120A. The packet is first associated with one of predefined burst streams. A burst stream may be defined according to destination and a selected path through a core node. For the purpose of burst formation, all burst data from a source node to a sink node are treated as a single burst stream. When a packet is received, it is segmented into segments in a conventional manner at the ingress port 2910. Data segments received at an output port 2930 of a source node includes both complete and incomplete segments. An incomplete segment has less data than the defined segment size and is null padded. The segments are processed individually. The stream identifier, k, and the payload length, L, of the segment (which excludes any null padding) are determined. The two fields C(1, k) and C(2, k), corresponding to entries in the auxiliary and principal data memories of FIG. 31, are read simultaneously from the control memory 3120. A value C(1, k) of 0 indicates that there is no fractional segment belonging to stream k and waiting in the auxiliary memory 3130. Thus, in step 3310, if C(1, k) is determined to be zero, control is transferred to step 3320, otherwise, control is transferred to step 3330. In step 3320, if the length L is determined to be equal to the predefined segment length G (G=128 bytes for example), the segment is stored directly in principal data array 3240 which is organized as interleaved link lists (step 3324). In effect, the principal data array 3240 constitutes a number of interleaved queues. (Interleaved linked lists are well known in the art and are not described here. Basically, they allow dynamic sharing of a memory by X>1 data streams using X insertion pointers and X removal pointers.) Otherwise, if in step 3320 the value of L is determined to be less than a full-segment length G, the fractional segment is placed in position k in auxiliary array 3230 (step 3322). Note that, at this point, the position k in auxiliary array 3230 is vacant because step 3320 is reached only when C(1, k) is determined to be zero. The fractional segment will remain in auxiliary array 3230 until it is either concatenated with a forthcoming segment of the same stream k, or is dequeued by the burst-transfer scheduler 3150, whichever occurs first. If, on the other hand, the entry C(1, k) is found in step 3310 to be greater than zero, the enqueueing controller 3110 concludes that there is a waiting fractional segment belonging to stream k. The arriving segment, whether complete or fractional, is then concatenated with the existing fractional segment (step 3330). In step 3332, if the result equals or exceeds a full segment, a full segment is appended directly to a corresponding queue in principal array 3240 which can hold several interleaved queues, each corresponding to a sink node. If the remainder of concatenation is greater than zero, the remainder is placed back in position k in auxiliary array 3230 (step 3335). If the remainder is zero, corresponding entry C(1,k) in array 3220 is set equal to zero (step 3333) to indicate to a future arriving segment that there is no waiting fractional segment belonging to stream k. It is noted that the interleaved linked lists are addressed independently but they share the same memory device 3140.

Figure 34:
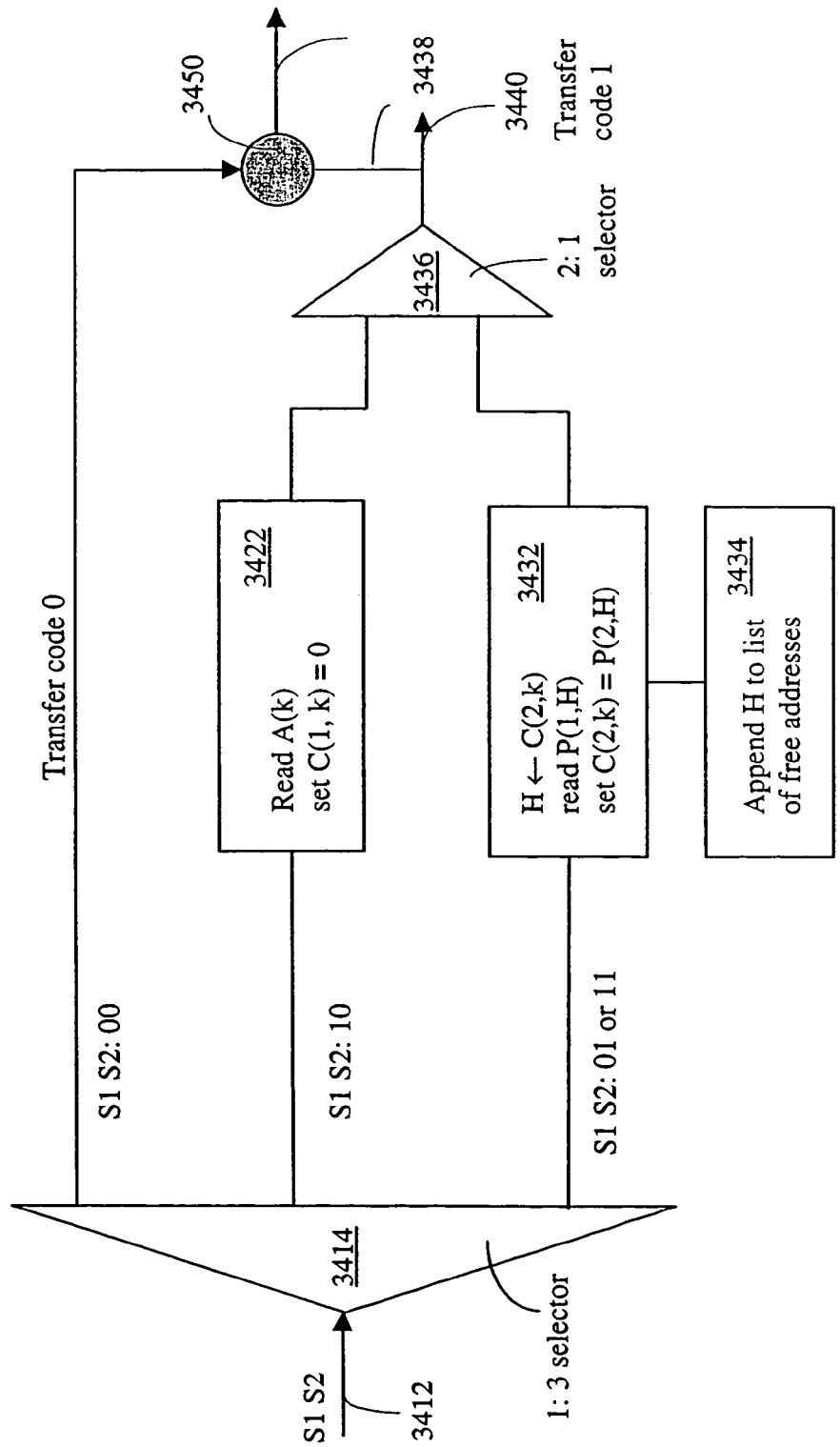
FIG. 34 is a flow chart showing the steps leading to the transfer of bursts from a source node for use with an embodiment of the present invention.

FIG. 34 is a flow chart showing the dequeueing of segments to form bursts under rate control. Note that the enqueueing process of FIG. 33 is triggered by a packet arrival at an output port 2930 while the dequeueing process of FIG. 34 is triggered by a burst-transfer scheduler 3150 which indicates the service eligibility for each burst stream. When the burst-transfer scheduler 3150 indicates that a stream k is eligible for burst transfer, the corresponding burst length for stream k is determined. The burst length, Y, is determined as an integer multiple of a segment length. The selection of the burst length was described with reference to FIGS. 8 and 9. A counter is set equal to Y and decreased in steps of unity as segments are dequeued from principal data array 3220 and/or auxiliary data array 3230. When the counter reaches zero, the dequeueing of the burst is complete.

To dequeue a segment, two single-bit numbers S1 and S2 are determined (3412) by a simple logic circuit (not illustrated). S1 equals 0, if C(1,k)=0, and equals 1 otherwise. S2 equals 0, if C(2, k)=0, and equals 1 otherwise. Selector 3414 selects one of three branches based on the value of {S1, S2} as illustrated in FIG. 34. If the 2-bit number {S1, S2} is "00", the dequeueing controller 3180 (FIG. 31) concludes that there are no segments belonging to stream k waiting in either auxiliary array 3230 or principal data array 3240. It then returns a code "0" to the burst-transfer scheduler 3150 (FIG. 31). The burst-transfer scheduler 3150 may use the return code to terminate burst dequeueing from memories 3130 and 3140 when the number of dequeued segments, which may include a fractional segment, is less than the number of segments specified by a master controller 240. The burst-transfer scheduler 3150 may also use the return code to perform other functions specific to its internal operation. If the number {S1, S2} is "10", the dequeueing controller 3180 concludes that there is a fractional segment in auxiliary data array 3230 but no segments in principal data array 3240 belonging to stream k. In step 3422 the entry C(1,k) is reset to zero and the fractional packet waiting in auxiliary data memory 3130 at entry k is transferred to the network through selector 3436 and outgoing link 3440.

If the number {S1, S2} is either "01," or "11", the dequeueing controller 3180 concludes that there is a complete segment belonging to stream k waiting in principal data memory 3140 (principal data array 3240). Control is then transferred to step 3432. The existence, or otherwise, of a waiting fractional segment belonging to stream k in auxiliary data memory 3130 is irrelevant. The complete segment is then transferred from principal data memory 3140, as indicated in step 3432, through selector 3436 and outgoing link 3440. Normal book keeping functions, such as the return of the address H=C(2,k) to the pool of free addresses in memory 3140, are performed in step 3434.

The embodiments of the invention described above are intended to be exemplary only. Other modifications will be apparent to those skilled in the art and, therefore, the invention is defined in the claims.

What is claimed is:

1. In an edge node having ingress ports, output ports, a switching fabric, a controller, and a time counter at each of said output ports, a method of data burst formulation comprising steps of:
   receiving burst-transfer permits at said controller, each of the burst transfer permits specifying a burst size;
   sorting said burst-transfer permits according to destination;
   distributing said burst-transfer permits to respective output ports;
   receiving data packets of variable sizes at said ingress ports;
   segmenting each of said data packets into segments of a predefined size to produce a segmented packet, wherein a last segment that is smaller than said predefined size is null padded;
   switching each of said segments to a corresponding output port;
   concatenating, at said corresponding output port, segments of a common destination to form data bursts according to respective burst-transfer permits;
   modulating an optical carrier by said data bursts to produce a modulated optical carrier; and
   transmitting said modulated optical carrier to a core node.

2. The method of claim 1 wherein said concatenating step includes the further step of removing any null-padding from each segmented packet.

3. The method of claim 2 including the further step of extending the size of a data burst by null-padding to be an integer multiple of a prescribed data-size.

4. The method of claim 3 including the further step of transmitting said data burst at a time based at least in part on a reading of said time counter.

* * * * *